United States Patent [19]

Tatsumi et al.

[11] Patent Number: 5,757,788
[45] Date of Patent: May 26, 1998

[54] DIGITAL RADIO COMMUNICATION SYSTEM WITH EFFICIENT AUDIO AND NON-AUDIO DATA TRANSMISSION

[75] Inventors: Akinori Tatsumi, Yokohama; Mitsuhiro Suzuki, Moriguchi; Mikio Shimazu, Iizuka; Seiji Horii, Kashihara, all of Japan

[73] Assignee: Matsushita Electric Ind., Osaka, Japan

[21] Appl. No.: 585,181

[22] Filed: Jan. 11, 1996

[51] Int. Cl.⁶ .................................................. H04J 3/12
[52] U.S. Cl. ..................... 370/336; 370/337; 370/347; 370/522
[58] Field of Search ..................... 370/336, 337, 370/321, 349, 345, 347, 350, 271, 442, 522, 524, 464, 493; 455/507, 517, 524, 73, 74, 575; 379/442, 93.09

[56] References Cited

U.S. PATENT DOCUMENTS

| | | |
|---|---|---|
| 3,660,606 | 5/1972 | De Witt ........................... 370/377 |
| 4,476,559 | 10/1984 | Brolin et al. |
| 4,510,596 | 4/1985 | Hartmann et al. |
| 5,446,739 | 8/1995 | Nakano et al. ........................ 370/337 |
| 5,515,379 | 5/1996 | Crisler et al. ........................ 370/347 |
| 5,553,079 | 9/1996 | Niki et al. ........................ 370/522 |

*Primary Examiner*—Wellington Chin
*Assistant Examiner*—Steven Nguyen
*Attorney, Agent, or Firm*—Price, Gess & Ubell

[57] ABSTRACT

In a radio communication system for performing digital radio communications by using time-division multiplexed time slots, a first personal station receives its user's speech through the microphone, converts it into audio data, and transmits them on time slots to a second personal station. On the other hand, the first personal station receives non-audio data from the data processor connected with the second personal station and stores. When the audio data amount inputted to the first personal station in a unit time period is lower than a threshold and the communications between the first personal station and the second personal station are put in a silence condition, the first personal station transmits non-audio data on times slots to the second personal station. When the communications return to a sound condition, audio data transmission is restored. Whether each time slot carries audio data or non-audio data is designated by an identifier which is written in a predetermined field of each time slot.

23 Claims, 41 Drawing Sheets transmitter personal station receiver personal station

| carrier numbers | frequency bands(MHz) | usage |
|---|---|---|
| 1 | 1895.150 | |
| 2 | 450 | |
| 3 | 750 | |
| 4 | 1896.050 | private use, |
| 5 | 350 | direct communication |
| 6 | 650 | between sub units use, |
| 7 | 950 | public use |
| 8 | 1897.250 | |
| 9 | 550 | |
| 10 | 850 | |
| 11 | 1898.150 | private use, public use |

FIG. 5

CI Cording Regulation for up time slots

| Bits  | 4 | 3 | 2 | 1 |
|-------|---|---|---|---|
| TCH   | 0 | 0 | 0 | 0 |
| FACCH | 0 | 0 | 0 | 1 |
| Tch-D | 0 | 1 | 0 | 1 |

← audio data transmitter personal station

FIG. 14

| data | contents | priority levels |
|---|---|---|
| map | graphics<br>hatching data<br>character string data | 1 |
| drag | (111,123),(134,165),(178,167),<br>(305,145),(151,134) · · · · · | 2 |
| FAX | bit map patterns | 4 |
| hand-written memo | (111,123),(134,165),(178,167),<br>(305,145),(151,134) · · · · · | 6 |
| digital still camera | still picture data | 3 |
| electric mails | text codes | 5 |

FIG. 16

Handy Navigation System

Please select a desired area with the pen.

① Osaka city south area    ③ Osaka city port area
② Osaka city north area    ④ Osaka city suburb A area audio data : non-audio data = 5 : 3 audio data : non-audio data = 7 : 1 audio data : non-audio data = 6 : 2

FIG. 27

| the numbers of free time slots | assignment ratios |
|---|---|
| 0~1 | 7 : 1 |
| 2~3 | 6 : 2 |
| 4~6 | 5 : 3 |
| 7~8 | 4 : 4 |

↑ ↑
audio data non-audio data

DIGITAL RADIO COMMUNICATION SYSTEM WITH EFFICIENT AUDIO AND NON-AUDIO DATA TRANSMISSION

BACKGROUND OF THE INVENTION

(1) Field of the Invention

The present invention relates to a digital radio communication system in which digital radio transmission is performed between a transmitter personal station and a receiver personal station.

(2) Description of the Related Art

There have been great advancements in information technologies in recent years, with Personal Handy-phone Systems (PHS) or Second Generation Cordless Telephone System being put into practical use. Also, "Handy Navigation System" is proceeding toward practical utilization by using Time Division Multiple Access/Time Division Duplex (TDMA/TDD) based radio communication.

FIGS. 1A and 1B respectively show the appearance of a transmitter personal station and a receiver personal station of a Handy Navigation System. Each station is composed of a PHS and an electric notebook with a pen and a liquid crystal display. The liquid crystal display displays lines which follow the movement of the pen across its surface. As can be seen from the drawings, the portable size of the station enables a user to hold the unit in one hand whilst using the pen.

The Handy Navigation System is characterized in that tele-mapping and tele-pointing are performed on PHS. Here, tele-mapping refers to a transmitter personal station and a receiver personal station transmitting map data on their display to each other while their users are talking on the phone, and the tele-pointing refers to the personal stations transmitting drag data drawn on their display with a pointing device such as a mouse or pen to each other while the users are talking on the phone.

The map data and the drag data of the transmitter personal station shown in FIG. 1A are transmitted to the receiver personal station shown in FIG. 1B through the tele-mapping and the tele-pointing, and as a result, the receiver personal station displays the same map data and the drag data. The use of the tele-mapping and the tele-pointing allows users to inform each other of their locations or to give a guidance with a pen drag, which would be difficult to explain verbally.

The Handy Navigation System can also provide a sightseeing guide which gives locations of noted places, historic spots, hotels, and other such information to the users.

The following is a description on how the Handy Navigation System is realized on PHS.

In order to realize this system, personal stations must transmit both audio data and non-audio data. U.S. Pat. No. 4,510,596 and U.S. Pat. No. 4,476,559 disclose such audio data and non-audio data transmission.

U.S. Pat. No. 4,510,596 transmits audio data and non-audio data concurrently by assigning two radio channels to the two types of data. This art is suitable to a radio picturephone which requires the transmission of motion picture data with large transmission load as non-audio data together with audio data.

U.S. Pat. No. 4,476,559, on the other hand, transmits audio data and non-audio data concurrently in a single radio channel by halving the transmission amount of these data. This art is suitable to transmit a small amount of non-audio data such as notes which have been handwritten with a pen, together with audio data.

A drawback of U.S. Pat. No. 4,510,596 is that one personal station uses two radio channels in order to transmit only a small amount of drag data. The use of two radio channels doubles the phone bills of PHS, reducing its potential market.

Another drawback is that if a large number of personal stations each uses two channels, it may cause a channel overflow in areas where there is not efficient number of cell stations.

A drawback of U.S. Pat. No. 4,476,559, on the other hand, is that half of the audio data inputted in units of 5 msec is abondaned to transmit non-audio data with the audio data in the same time slot, which leads to a reduction in the quality of audio data. While the half rate encoding can handle the amount of pen drag data in the tele-pointing, it cannot cope with map data in the tele-mapping. Since it takes twice as much time to complete the transmission of the entire map data from a transmitter personal station, display by the receiver personal station is delayed.

Although it is possible to make a user determine the timing of the transmission of non-audio data, this is not desirable in a case where a large amount of non-audio data are to be transmitted. When such non-audio data are transmitted over the radio channel for a long period of time, it prevents these personal stations from receiving an emergent call from other personal stations. Such delays lead to a breakdown in the real-time nature of PHS personal stations.

Since the purpose of PHS personal stations is to simplify communication between users, it is desirable for such systems to be as use-friendly as possible. From this angle, it can be seen that requiring users to designate the timing of transmission of non-audio data leads to the reduction of the value of the Handy Navigation System.

SUMMARY OF THE INVENTION

In view of these drawbacks, a first object of the present invention is to provide a digital radio communication system which allows both audio data and non-audio data to be transmitted efficiently between a transmitter personal station and a receiver personal station, without spoiling the real-time nature of audio communication.

A second object of the present invention is to provide a digital radio communication system which allows both audio data and non-audio data to be transmitted efficiently between a transmitter personal station and a receiver personal station, without forcing users to select between audio data transmission and non-audio data transmission.

A third object of the present invention is to provide a digital radio communication system which realizes a Handy Navigation System which allows both audio data and non-audio data to be transmitted efficiently between a transmitter personal station and a receiver personal station.

A fourth object of the present invention is to provide a digital radio communication system which allows both audio data and non-audio data to be transmitted efficiently between a transmitter personal station and a receiver personal station, without few personal stations monopolizing communication resources.

A fifth object of the present invention is to provide a digital radio communication system which allows both audio data and non-audio data to be transmitted efficiently between a transmitter personal station and a receiver personal station, with reasonable phone bill.

A sixth object of the present invention is to provide a digital radio communication system which allows both audio data and non-audio data to be transmitted efficiently between a transmitter personal station and a receiver personal station, without deteriorating audio data quality.

A seventh object of the present invention is to provide a digital radio communication system which semiautomatically selects between audio data transmission and non-audio data transmission without deteriorating their transmission efficiency.

The first to seventh objects can be achieved by a radio communication system for transmitting audio data and non-audio data between a transmitter personal station and a receiver personal station, the audio data and the non-audio data being transmitted on time slots which have been time-division multiplexed. Each of the transmitter personal station and the receiver personal station comprising the following units:

- a transmission/reception unit for transmitting and receiving the time slots to and from other personal station, each of the time slots including a data field in which one of the audio data and the non-audio data are written, a control field in which control information is written, and an identifier field in which one of a first identifier for the audio data and a second identifier for the non-audio data is written;
- an audio data conversion unit provided with a microphone for receiving speech through the microphone and converting the speech into audio data;
- a non-audio data holding unit provided with an input terminal connected with an output terminal of a data processor, the non-audio data holding unit receiving non-audio data from the data processor, and holding the non-audio data received;
- an audio data amount detection unit for detecting whether an amount of audio data to be produced per unit time by the audio data conversion unit is lower or higher than a predetermined threshold;
- a write unit for, when the amount of the audio data has been detected to be lower than the threshold, fetching a predetermined amount of non-audio data from the non-audio data holding unit, writing the non-audio data fetched to the data field of a first time slot, further writing the second identifier to the identifier field of the first time slot, and making the transmission/reception unit transmit the first time slot to the other personal station, and when the amount of the audio data has been determined to be higher than the threshold, writing the audio data produced in the audio data conversion unit to the data field of a second time slot, further writing the first identifier to the identifier field of the second time slot, and making the transmission/reception unit transmit the second time slot to the other personal station;
- a speech restoration unit provided with a speaker for restoring speech from audio data;
- an identifier detection unit for detecting whether the identifier field of a third time slot that the transmission/reception unit has received from the other personal station has the first identifier or the second identifier; and
- a distribution unit provided with an output terminal connected with an input terminal of the data processor for, when the identifier detection unit has detected that the identifier field of the third time slot has the first identifier, fetching audio data from the data field of the third time slot, and outputting the audio data fetched to the speech restoration unit, and when the identifier detection unit has detected that the identifier field of the third time slot has the second identifier, fetching non-audio data from the data field of the third time slot, and outputting the non-audio data fetched to the data processor.

In the above-explained construction, each personal station makes use of a slight pause in conversation to transmit a small amount of drag data in the same channel as the audio data. Consequently, the operational cost is not higher than the normal telephone, so that it is prevented to reduce its potential market.

In addition, even if a large number of PHSs are used in an area where there is not efficient number of cell stations, no channel overflow is caused.

Each of the transmitter personal station and the receiver personal station may further comprise a transmission control procedure application unit for applying a transmission control procedure when the flag has been set at on, and suspending the transmission control procedure when the flag has been set at off, the transmission control procedure including a transmission error detection and correction control and a time slot re-transmission control.

In the above-explained construction, transmission errors are overcome by the error correction function and the data re-transmission function. Since garbled non-audio data cannot be restored at a receiver side, data link is established in response to the detection of a silence condition to transmit non-audio data on the data link, thereby avoiding data garbling. Consequently, the transmission of non-audio data including map data, still picture data, and picture data such as MPEG and JPEG can be reliable.

The first to seventh objects can be also achieved by a radio communication system for transmitting audio data and non-audio data between a transmitter personal station and a receiver personal station. The time slots are divided into a first group and a second group which follows the first group, the first group being assigned to the audio data and the second group being assigned to the non-audio data, and the ratio of the number of time slots in the first group to the number of time slots in the second group are changed depending on the amount of the audio data to be transmitted. Each of the transmitter personal station and the receiver personal station comprises the following units:

- a free time slot counting unit for monitoring time slots to be transmitted by the transmission/reception unit in the unit time, and counting as free time slots a number of time slots whose data fields include data of less than a predetermined amount of threshold;
- an assignment information determination unit for determining an assignment information which indicates a number of a final time slot in the first group, based on the number of time slots counted in the free time slot counting unit;
- an assignment information report unit for writing the assignment information to the control field of a first time slot and making the transmission/reception unit transmit the first time slot to the other personal station;
- an assigning unit for assigning the time slots in the first group to the audio data and the time slots in the second group to the non-audio data;
- an assignment information acquisition unit for acquiring the assignment information from the control field of a time slot received by the transmission/reception unit;
- a distribution unit provided with an output terminal connected with an input terminal of a data processor for fetching audio data from the data fields of the time slots in the first group, fetching non-audio data from the data fields of the time slots in the second group, and outputting the audio data fetched to the speech restoration unit and the non-audio data fetched to the data processor.

In the above-explained construction, the amount of non-audio data to be transmitted with audio data are changed in every unit time depending on the number of free time slots. As a result, non-audio data are transmitted in every unit time to the other personal station without fail although audio data are given priority in transmission. Consequently, the real-time nature of audio communications are secured and both audio data and non-audio data are transmitted efficiently.

BRIEF DESCRIPTION OF THE DRAWINGS

These and other objects, advantages and features of the invention will become apparent from the flowing description thereof taken in conjunction with the accompanying drawings which illustrate a specific embodiment of the invention. In the drawings:

FIG. 3 shows carrier numbers, frequency bands to be assigned to the carrier numbers, and their usage in the PHS.

FIG. 5 shows the bit configuration of the CI field.

FIG. 14 shows the types of data to be used in the electronic notebook 231 stored in the storage unit 107.

FIG. 16 shows an example of a menu displayed on the tablet 101.

FIG. 27 shows a table stored in the assignment ratio determination unit 42.

DESCRIPTION OF THE PREFERRED EMBODIMENTS

\<Embodiment 1\>

Figure 1A:
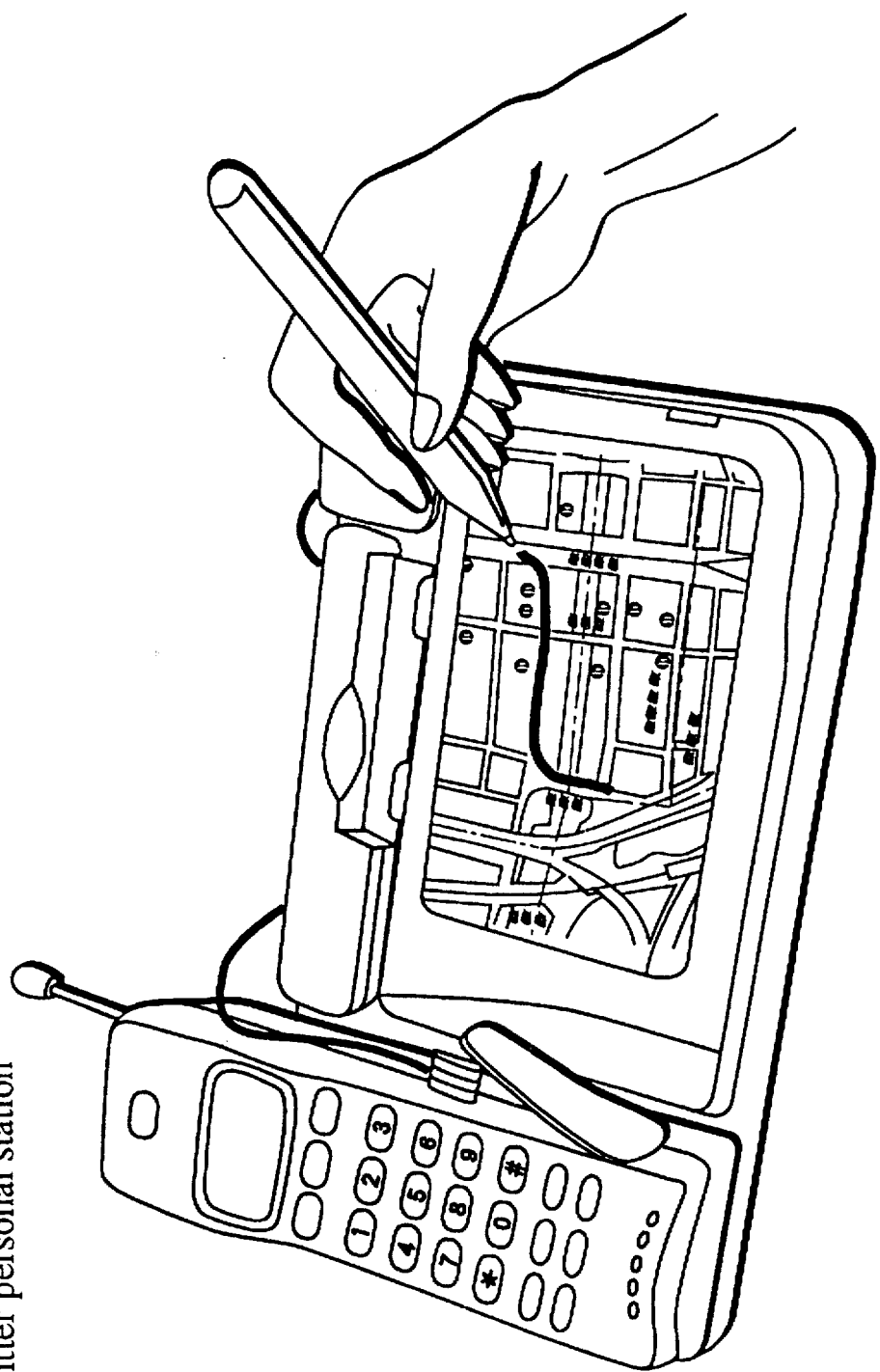
FIGS. 1A and 1B respectively show the appearance of a transmitter personal station and a receiver personal station of a Handy Navigation System.
Figure 1B:
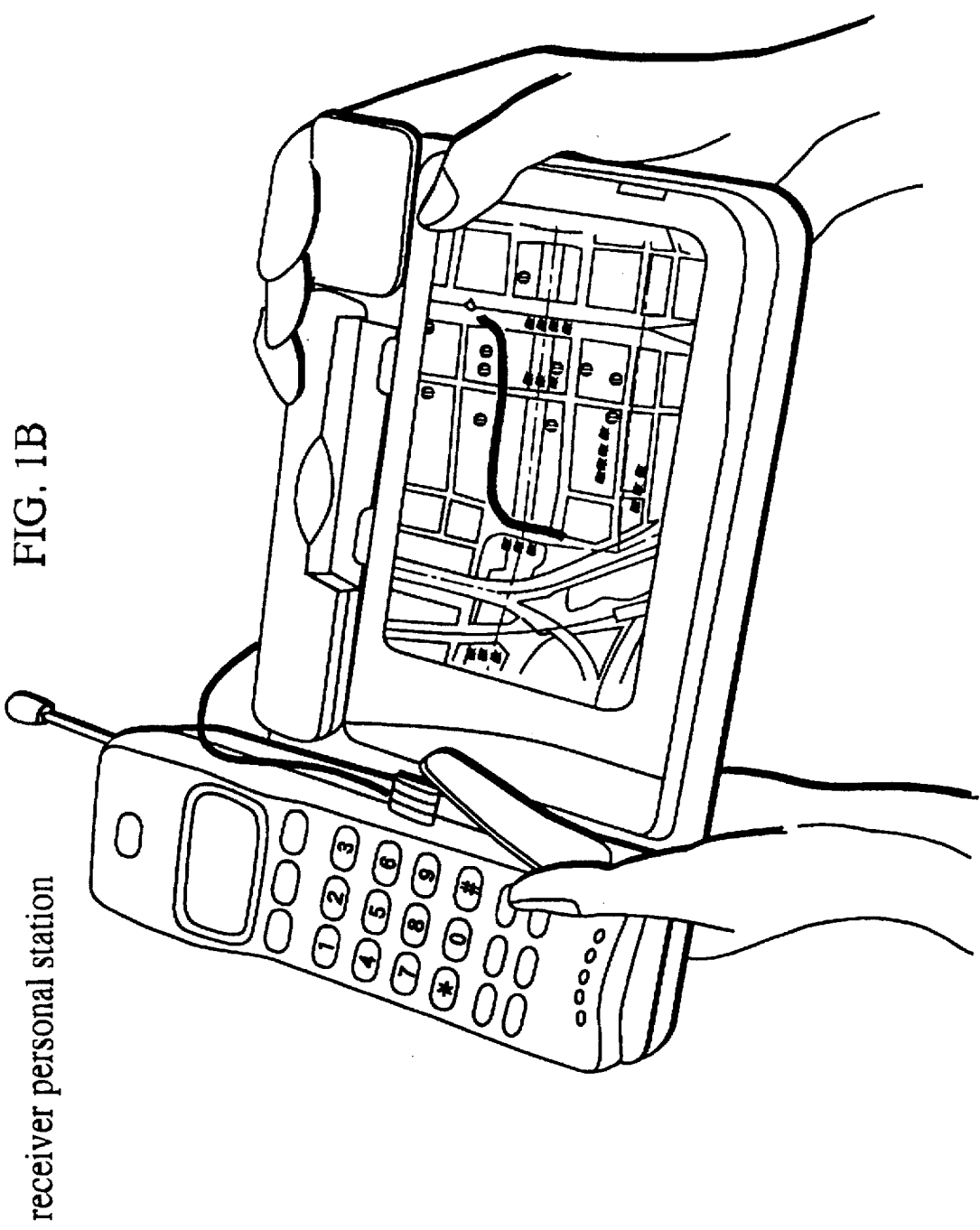
Figure 2:
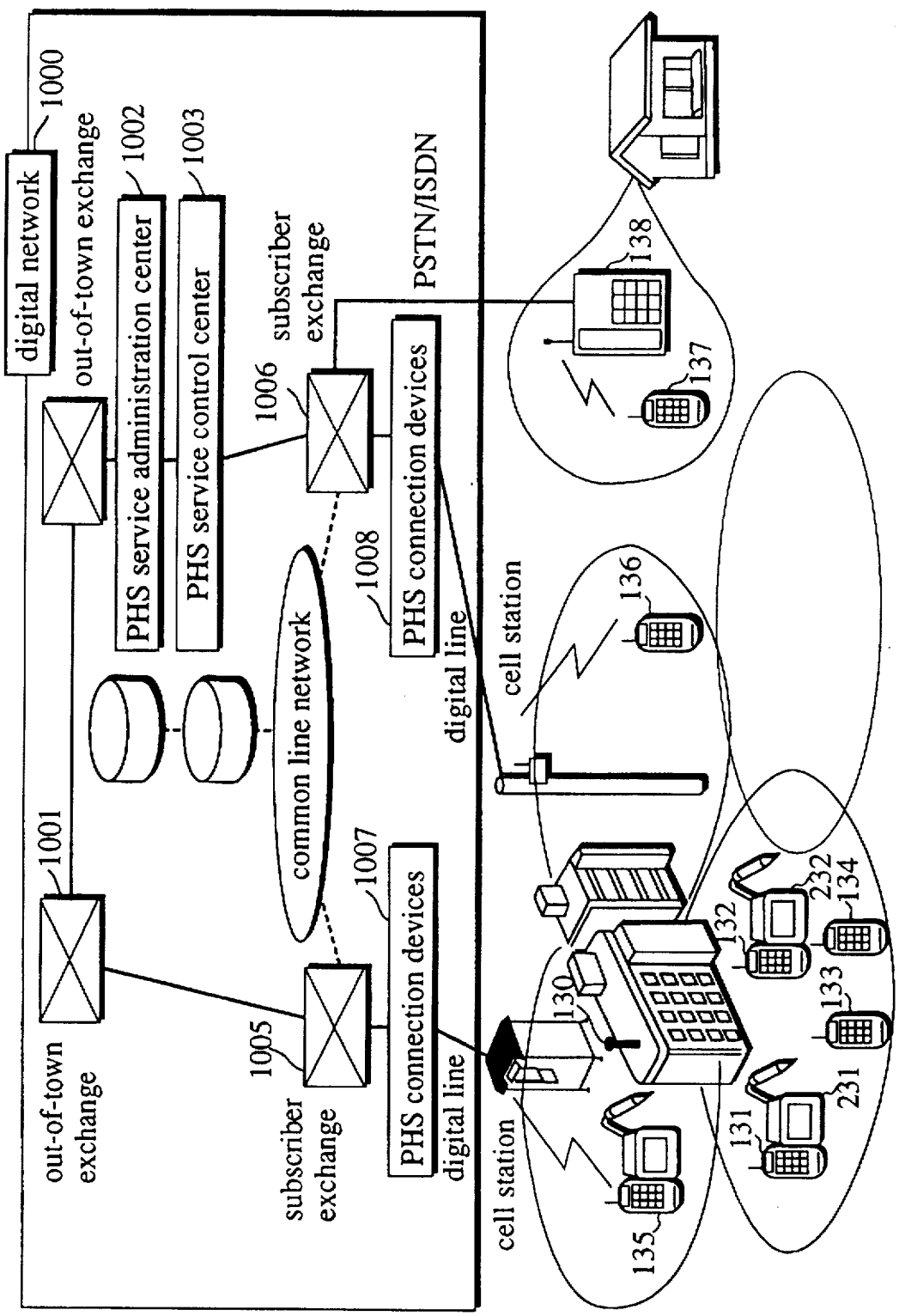
FIG. 2 shows the construction of the digital radio communication system of the present invention, which is formed by PHS.

FIG. 2 shows the construction of the digital radio communication system of the present embodiment, which is formed by PHS.

In the digital radio communication system, cell stations for public use are installed on building rooftops, telephone poles, and public phone booths in large cities. Each of the public cell stations are 200 to 300 meter apart and has its own radio zone. In addition to these public cell stations, stay-at-home telephones have individual radio zones as private cell stations.

FIG. 2 shows portable phone type personal stations 131–136. The personal stations 131–134 are in the radio zone of the cell station 130 which is installed on the rooftop of a building. The personal stations 131 and 132 form PHS with the electronic notebooks 231 and 232, respectively.

A user of a personal station can communicate with a user of another personal station via a cell station in its radio zone.

The public cell stations are connected to a digital network 1000 which integrates the PHS via digital lines. The digital network 1000 is composed of an out-of-town exchange 1001, a PHS service administration center 1002 which adjusts phone bills for subscribers, a PHS service control center 1003, a common line network 1004, subscriber exchanges 1005 and 1006, and PHS connection devices 1007 and 1008.

Every time a personal station enters a radio zone, it registers its own telephone number (PS number) to the cell station when it is powered on. The registration is done to ask the cell station for radio relay.

Being carried into another radio zone, the personal station selects an appropriate cell station and registers its PS number, thereby continuing the radio communication. This is called hand-over.

Figures 3A, 3B:
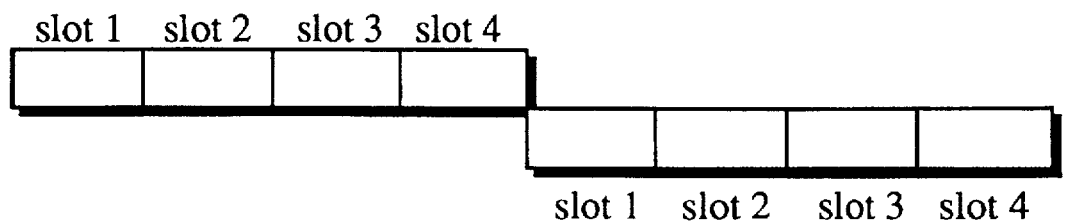
FIG. 3B shows time slots 1-4 which are assigned to each carrier.

The radio channels will be described as follows with reference to FIGS. 3A and 3B.

The PHS utilizes the TDMA/TDD. In TDMA/TDD, a radio channel refers to a physical channel to be specified by carriers and time slots. FIG. 3A shows carrier numbers, frequency bands to be assigned to the carrier numbers, and their usage in the PHS. FIG. 3B shows up time slots 1–4 and down time slots 1–4 which are assigned to each carrier.

The radio channels may be classified by function into control channels and traffic channels. The control channels are used to transmit control signals such as PS numbers, while the traffic channels are used to transit information signals such as audio data and non-audio data.

Figure 4:
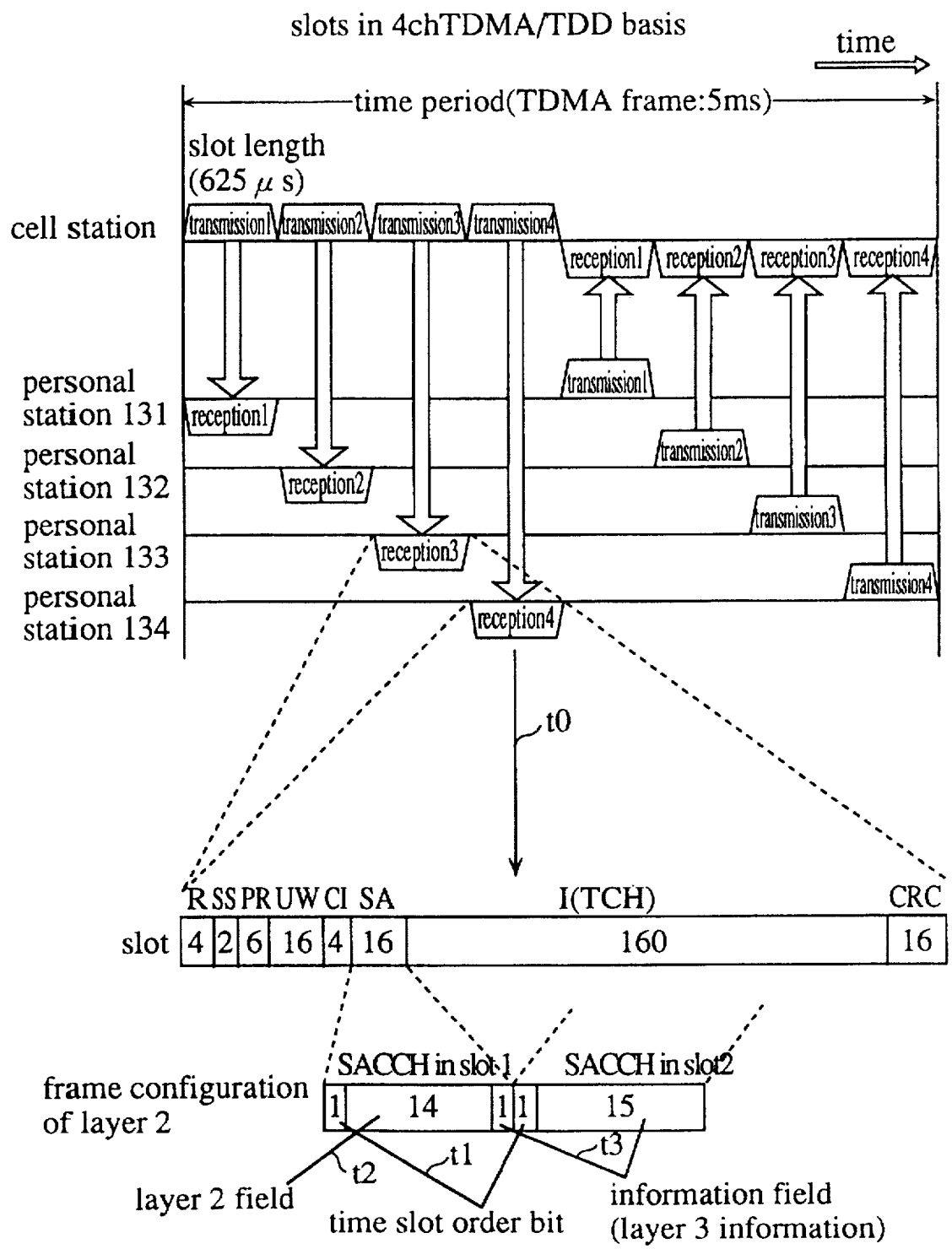
FIG. 4 shows the relationship between the traffic channels, TDMA frames, and the up time slots 1-4 and the down time slots 1-4, which form the TDMA frames.

FIG. 4 shows the relationship between the traffic channels and TDMA frames, and the relationship between the TDMA frames and the up time slots 1–4 and the down time slots 1–4.

The personal stations 131–134 are assigned the up time slot 1 and the down time slot 1, the up time slot 2 and the down time slot 2, the up time slot 3 and the down time slot 3, the up time slot 4 and the down time slot 4, respectively. These up and down time slots 1–4 are traffic channels to realize four independent communications in the PHS.

The personal stations 131–134 transmit audio data at the rate of 32 kbps through the up and down times slots 1–4. The number of time slots to be used by one user is referred to as a connection, which is determined by an initial setup from a transmitting personal station. In the PHS, each time slot has a length of 625 μsec and each TDMA frame has a period of 5 msec, so that each user is assigned 200 time slots per minute. The amount of information to be transmitted in one time slot corresponds to 240 bits, which consist of 160-bit user information for audio data transmission and 80-bit control data.

The following is a description on the traffic channels with reference to FIG. 4.

The traffic channels are time-division multiplexed into the same number of times slots as predetermined control channels, which are referred to as Slow Added Control CHannels (SACCHs) and used to set up.

As being indicated by the arrow t0, each time slot in the Second Generation Cordless Telephone System is divided into a ramp time (R), a start symbol (SS), a preamble (PR), a unique word (UW), a channel identifier (CI), an SA, an I(TCH), and a cyclic redundancy check (CRC).

The ramp time (R) is a field to smooth the excessive rise or fall of burst signals.

The start symbol (SS) is a field to indicate that the transmission of a burst information is started by a personal station.

The preamble (PR) is a field to time to a base station.

The unique word (UW) is a field to establish synchronization between a personal station and a base station per frame.

The channel identifier (CI) is a field to indicate whether the radio channel includes audio data or non-audio data. The assignment of channel identifiers is shown in the table of FIG. 5. As shown in the table, the 4-bit channel identifier "0000" indicates that a time slot is set on a traffic channel for audio data transmission. The channel identifier "0001" indicates that a time slot is set on the FACCH for control channel transmission (FACCH will be explained below). The channel identifier "0101" indicates that a time slot is set on a traffic channel Tch-D for non-audio transmission. The format of the I field of a time slot in the case of "0101" is basically the same as a time slot in the case of "0001".

In the SACCH, one frame consists of two time slots. The layer 2 frame of the SACCH is composed of a time slot order bit t1, a layer 2 field t2, and an information field (a layer 3 field) t3. The layer 3 field t3 carries call connection/disconnection messages between a cell station and a personal station.

To transmit control data, audio data, and non-audio data, a personal station writes these data in memory, and transmits them on a π/4-shiftQPSK modulation basis.

Hereinafter, writing various control data, audio data, and non-audio data in fields of a time slot refers to transmitting these data to other personal stations.

The internal construction of the personal stations 131–134 is explained hereinafter with reference to FIG. 6 which shows its appearance including the electronic notebook 231 and to FIG. 7 which shows its internal construction.

The personal stations include an audio data process unit 10, a TDMA process unit 11, a sound/silence flag 12, a modulation/demodulation unit 13, an RF/IF unit 14, a non-audio data holding unit 15, and an I/O port 113 with a socket 112 into which a cable 111 extending from the electronic notebook 231 is inserted. The other elements such as a keyboard and a display are not shown to simplify the explanation.

The audio data process unit 10, which includes an A/D conversion unit 16 and a silence detection unit 17, receives analog audio signals through a microphone, converts them into audio data, and outputs them to the TDMA process unit 11. The audio data process unit 10 on the other hand receives audio data from the TDMA process unit 11, converts them into analog audio signals, and outputs them to the speaker. The internal construction of the audio data process unit 10 is more detailed in FIG. 8.

The TDMA process unit 11 performs a TDMA process. The internal structure of the TDMA process unit 11 is detailed below with reference to FIG. 10.

The sound/silence flag 12 is on when the silence detection unit 17 has detected a silent condition in communications between personal stations, and is off when the silence detection unit 17 has detected a sound condition.

The modulation/demodulation unit 13 performs modulation and demodulation, based on π/4 shift QPSK within the frequency band which is used for the cell station. The modulation/demodulation unit 13 starts and suspends its output at a predetermined timing.

The RF/IF unit 14 amplifies the electric waves at a 1.9 GHz frequency band, and converts them into an intermediate frequency band of 10.8 MHz. Under the TDD system, the RF/IF unit 14 alternates the amplification and the conversion of frequency bands at a predetermined time interval for data transmission and data reception.

The non-audio data holding unit 15 is connected with a electronic notebook, and holds various non-audio data which have been outputted from the electronic notebook on a first-in, first-out basis.

The I/O port 113 is an interface between the personal station and the electronic notebook.

Figure 8:
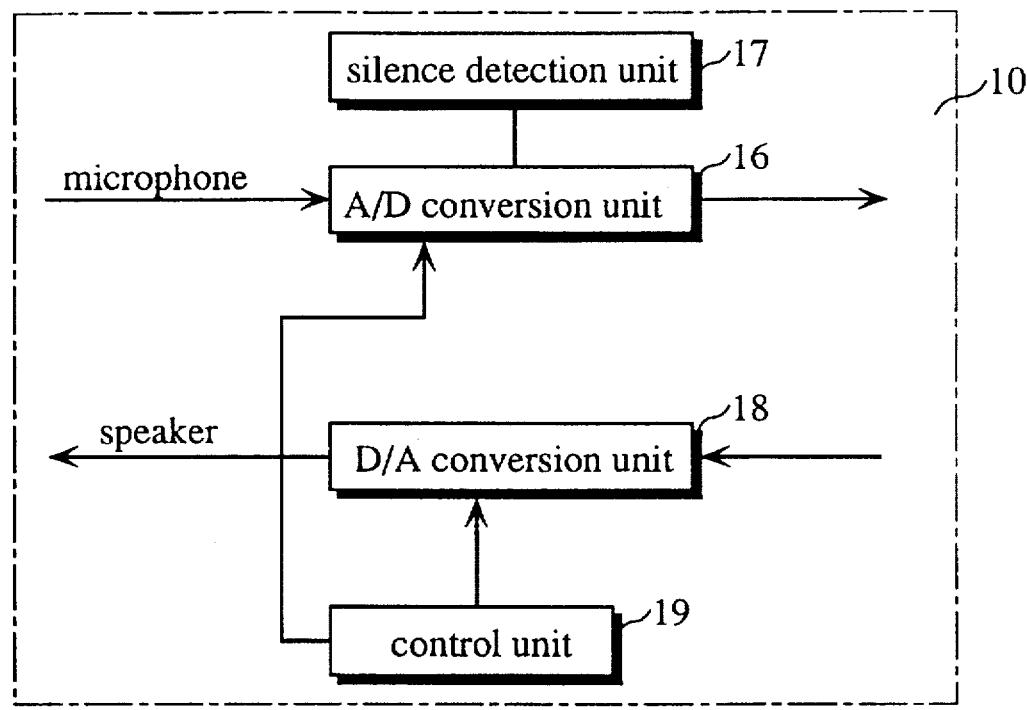
FIG. 8 shows a detailed construction of the audio data process unit 10.

FIG. 8 shows the more detailed construction of the audio data process unit 10 which further includes a D/A conversion unit 18 and a control unit 19, in addition to the above-mentioned A/D conversion unit 16 and the silence detection unit 17, all of which are integrated into one chip.

The A/D conversion unit 16 digitalizes the audio signals received from the microphone on an Adaptive Differential Pulse Code Modulation (ADPCM) basis. Under the ADPCM, the amount of data to be digitalized is reduced by outputting only the difference between the current sampling output and the preceding sampling output, thereby reducing transmission load in the radio transmission.

The silence detection unit 17 monitors the amount of the input to the A/D conversion unit 16, determines whether the communication is in a silence condition or not, and switches the sound/silence flag 12 depending on the determination.

The D/A conversion unit 18 D/A converts audio data which have been outputted from a data distribution unit 3 into audio signals on the ADPCM/PCM basis, and outputs the audio signals to the speaker. The data distribution unit 3 will be detailed later.

The control unit 19 controls the bell ring and line connection.

Figure 9:
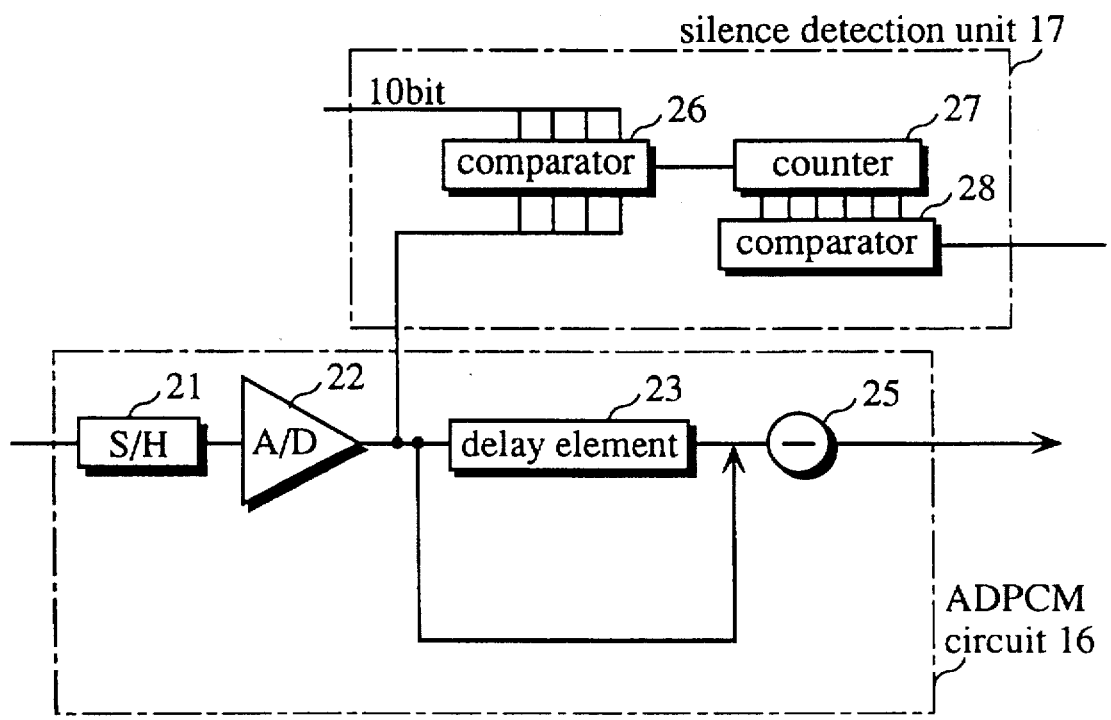
FIG. 9 shows the construction of the A/D conversion unit 16 and the silence detection unit 17.

The construction of the A/D conversion unit 16 and the silence detection unit 17 will be described with reference to FIG. 9. In order to output the sample data difference, the A/D conversion unit 16 is composed of a sample/hold circuit 21 which samples and holds audio signals which have been transmitted from the microphone in a sampling frequency of 8 kHz, an A/D conversion circuit 22 which A/D converts the audio signals in the sample/hold circuit 21 into audio data, a delay element 23 which causes the output values of the A/D conversion circuit 22 to delay one clock, and a differential circuit 25 which calculates the difference between the output values from the A/D conversion circuit 22 and the values which have been delayed by the delay element 23, and sequentially outputs the differential values calculated.

The construction of the silence detection unit 17 will be described as follows.

The silence detection unit 17 totals the amount of audio data obtained in the A/D conversion circuit 22 in a unit time equivalent to the transmission time period of a time slot.

In the time period of 5 msec, which corresponds to the TDMA frame length, the sample/hold circuit 21 performs 5 msec×8 kHz (sampling frequency band)=40 samplings. Therefore, if digital values whose sound pressure levels are 10 bits or lower are outputted 30 times in 40 samplings, then the silence detection unit 17 determines the presence of a silent condition.

For this, the silence detection unit 17 includes a comparator 26 which checks whether the values of the A/D conversion circuit 22 are larger than a threshold of 10 bits, a counter 27 which is reset every 5 msec and counts up when the values are larger than the threshold, and a comparator 28 which checks whether the count value of the counter 27 is over 30 times, sets the sound/silence flag 12 at off when the count value is over 30 times, and otherwise sets it at on. Thus, whether the communications between personal stations are in a silence condition or a sound condition is checked every 5 msec, which corresponds to the transmission period of the time slots. Consequently, a silence condition in a very shot time period is detected and increases the chances of transmitting non-audio data. The threshold can be other than 10 bits, and the sound/silence flag 12 may be set at off when the count value is over other than 30 times.

Figure 10:
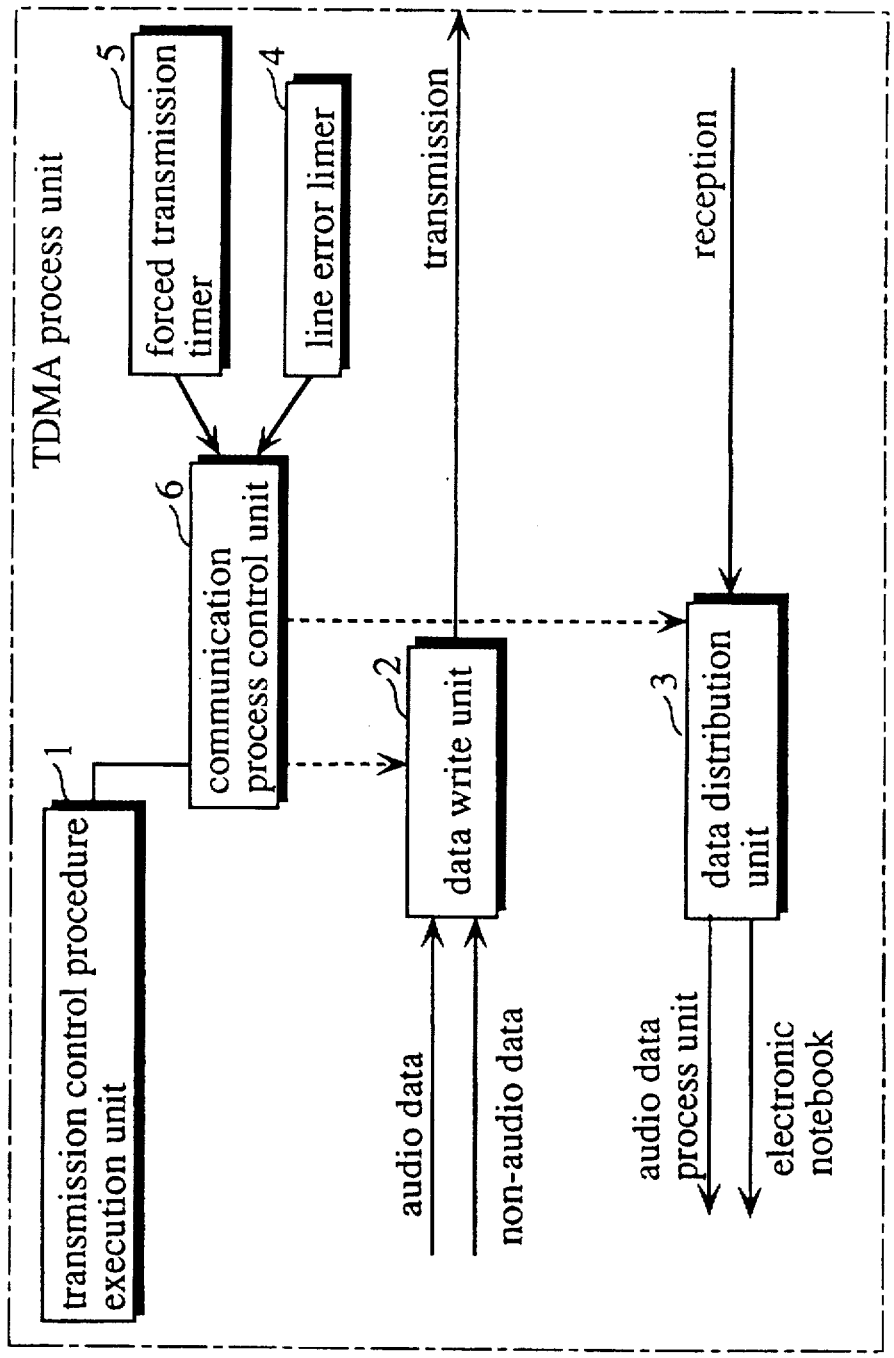
FIG. 10 shows the internal structure of the TDMA process unit 11.

FIG. 10 shows the detailed construction of the TDMA process unit 11, which is composed of a transmission control procedure execution unit 1, a data write unit 2, the above-mentioned data distribution unit 3, a circuit error timer 4, a forced transmission timer 5, and a communication process control unit 6. The full lines indicate routes for audio data and non-audio data, and the broken lines indicate that the data write unit 2 and the data distribution unit 3 are started by the communication process control unit 6.

The transmission control procedure execution unit 1 executes a transmission control procedure called Link Access Procedure for Digital Cordless (LAPDC) when non-audio data are transmitted to/from the modulation/demodulation unit 13 and the RF/IF unit 14. The LAPDC is a communication protocol corresponding to the layer 2 in Open System Interconnection (OSI) and utilizes a sub set of High-Level Data Link Control Procedure (HDLC). The use of LAPDC and HDLC overcomes transmission errors by its error correction function and data re-transmission control function, thereby enhancing the reliability of non-audio data transmission.

The error correction function refers to a transmitter personal station transmitting time slots equipped with Frame Check Sequence (FCS), and a receiver personal station checking transmission errors by checking the FCS. The data re-transmission control function refers to transmitter and receiver personal stations collating their sequence numbers assigned to the time slots and checking the sequence of the time slots. If necessary, the receiver personal station asks the transmitter personal station to transmit a time slot again by indicating its sequence number.

The LAPDC is utilized for non-audio data transmission because of the following reasons.

When a personal station is used in poor radio conditions such as an area where the radio zones of several cell stations interfere with each other or where direct waves and reflected indirect waves interfere with each other, radio transmission systems have a much higher chance of error occurrence than wired transmission systems. In the case of audio data transmission, men hardly recognize the occurrence of audio data garbling; however, if it happens in non-audio data transmission, a receiver personal station cannot restore the data. Since non-audio data transmission is greatly affected by the data garbling, the LAPDC is applied as soon as the non-audio data transmission is started. When audio data are transmitted, the LAPDC is discharged to avoid transmission delay, thereby ensuring the real-time nature of the audio data transmission.

To be more specific, the LAPDC is composed of three phases: data link establishment, data transmission, and data link release.

In the data link establishment phase, a transmitter personal station transmits a frame to a receiver personal station to request data link establishment, and the receiver personal station transmits an UA command to the transmitter personal station, and as a result, a data link is established.

In the data transmission phase, the transmitter personal station transmits an information frame to the receiver personal station, and the receiver personal station transmits a confirmation frame to the transmitter personal station, and as a result, non-audio data are transmitted.

In the data link release phase, the data link is released when all the data have been transmitted or an error has happened.

Figure 11:
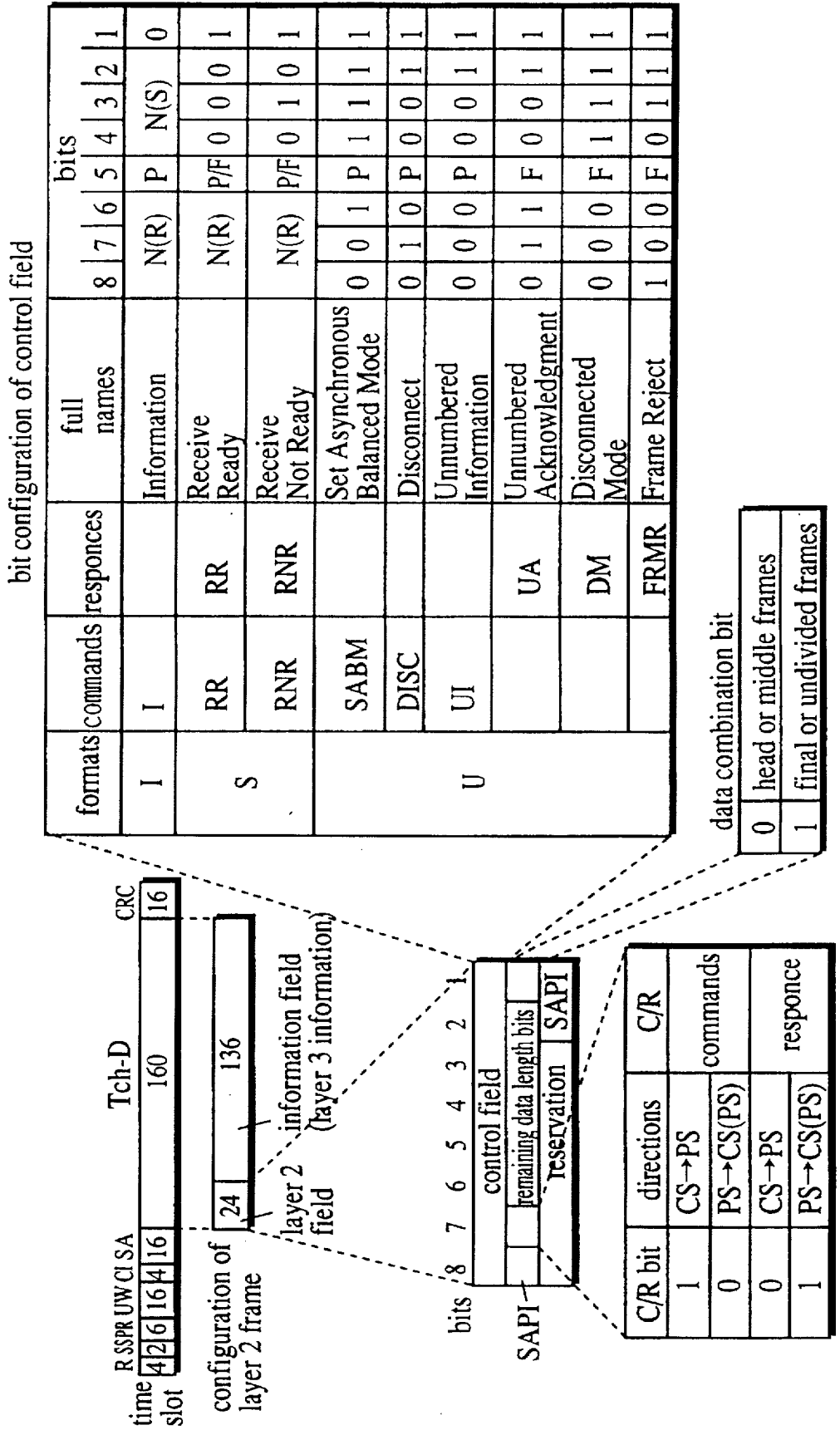
FIG. 11 shows the time slot format in the Fast Associated Control Channel (FACCH).

Since non-audio data are transmitted along with the LAPDC, the time slots used in the Tch-D has the format shown in FIG. 11. The format is based on the FACCH format in the PHS.

The I field forms a layer 2 frame which consists of a layer 2 field and an information field. Data in a layer higher than the layer 2 can be written in the information field; however, non-audio data are written therein in the present embodiment. As compared with the traffic channel which offers the entire 160-bit I field for audio data, the Tch-D can offer only 136 bits for non-audio data.

In the I field, the 24-bit layer 2 field is composed of a control field, a C/R bit, remaining data length bits, a data combination bit, and Service Access Point Identifier (SAPI) bits.

When the information combination bit field has a "zero", it indicates that the time slot is a head frame or an intermediate frame, and a "one" indicates that the time slot is the final frame.

The control field can be an I format, an S format, or a U format, in which commands to be used in the LAPDC are written.

The I format is provided for data transmission. The S format is provided to monitor a data link and to set an RR command and a Receive Not Ready (RNR) command. The U format is provided to additionally control a data link and to set a Set Asynchronous Balanced Mode (SABM) command, a Disconnect (DISC) command, an Unnumbered Acknowledgement (UA), an Unnumbered Information (UI) command, an Disconnected Mode (DM) command, and a Frame Reject (FRMR) command. The information field and the control field can be used at the same time: when non-audio data are written in the information field, these commands in the I, S, and U formats may be written in the control field and transmitted together with the non-audio data. Thus, both audio data and the commands can be transmitted to the receiver personal station in one time slot transmission.

As shown in the I command bit configuration in FIG. 11, the sixth to eighth bits are assigned to a field for N(R), and the fifth bit is assigned to P bit. The second to fourth bits are assigned to a field for N(S).

In the RR command bit configuration, the sixth to eighth bits are assigned to a field for N(R), and the fifth bit is assigned to P/F bit.

In the RNR command bit configuration, the sixth to eighth bits are assigned to a field for N(R), and the fifth bit is assigned to P/F bit.

The N(S) refers to transmission sequence numbers and is used to indicate the number of the frame which is being currently transmitted. Since three bits are assigned to the N(S), frames to be transmitted can be assigned consecutive numbers 0 to 7. When non-audio data are transmitted in sequence, among non-audio data in a queue, 136-bit least-latest stored non-audio data are written in the information field of the time slot to be transmitted first. In the first time slot, the sequence numbers "000" are written in its N(S).

In the second time slot, the sequence numbers "001" are written in its N(S). In the third and fourth time slots, the sequence numbers "010" and "011" are written in the same manner, respectively. The initial sequence numbers "000" are again assigned to the ninth time slot.

The sequence numbers are also used to check whether the non-audio data have been transmitted to a receiver personal station in the correct order. For example, if the sixth time slot with the sequence numbers "101" has failed to reach the receiver personal station due to an transmission error, and the seventh time slot with the sequence numbers "110" has reached the receiver personal station before the sixth time slot, the receiver personal station must ask for the sixth time slot to be re-transmitted. Otherwise, the receiver personal station cannot restore the non-audio data in the sixth time slot. To cope with such a transmission error, the LAPDC allows receiver personal stations to check the transmission sequence of non-audio data.

The transmission control procedure execution unit 1 stores non-audio data transmitted in association with their respective sequence numbers as transmission reserve so that non-audio data can be re-transmitted on a request from a receiver personal station.

In the LAPDC, a transmitter personal station must confirm the safe receipt of time slots it has transmitted to a receiver personal station, and the receiver personal station must inform the transmitter personal station of the safe receipt of the time slots on its request, by using the above-mentioned RR command and RNR command. To be more specific, the receiver personal station transmits the RR command to the transmitter personal station when it has successfully received a time slot, or the RNR command when the reception is unsuccessful.

In the RR command and the RNR command, the sequence numbers are written in the field for N(R). The N(R) has the same function as the N(S): in the first time slot, the sequence numbers "000" are written in its N(R). In the second time slot, the sequence numbers "001" are written in the N(R). In the third and fourth time slots, the sequence numbers "010" and "011" are written, respectively in the same manner.

When the RNR command indicates a request for a re-transmission, the transmission control procedure execution unit 1 fetches the non-audio data corresponding to the sequence numbers in the N(R) from the transmission reserve, and writes them in the information field, and re-transmits the time slot to the transmitter personal station.

Since the control field of the I format includes the fields for N(S) and N(R), a receiver personal station can transmit N(R) of the non-audio data which have been received from the transmitter personal station, together with other non-audio data and N(S) for them.

An RR command may be transmitted so as to accompany each transmission of non-audio data. However, in order to reduce the transmission load of the system, an RR command is transmitted for eight transmissions of non-audio data in the present embodiment. This is called 8:1 modulo. In the 8:1 modulo, a transmitter personal station must ask the receiver personal station for an RR command in the seventh transmission of non-audio data. The transmitter personal station may further ask for another transmission of an RR command, if necessary, by setting P bit in the U format shown in FIG. 11 at "1". The receiver personal station sets F bit in the U format at "1" to respond to P bit.

FIG. 10 is again referred to here to explain the internal structure of the TDMA process unit 11.

Figure 21:
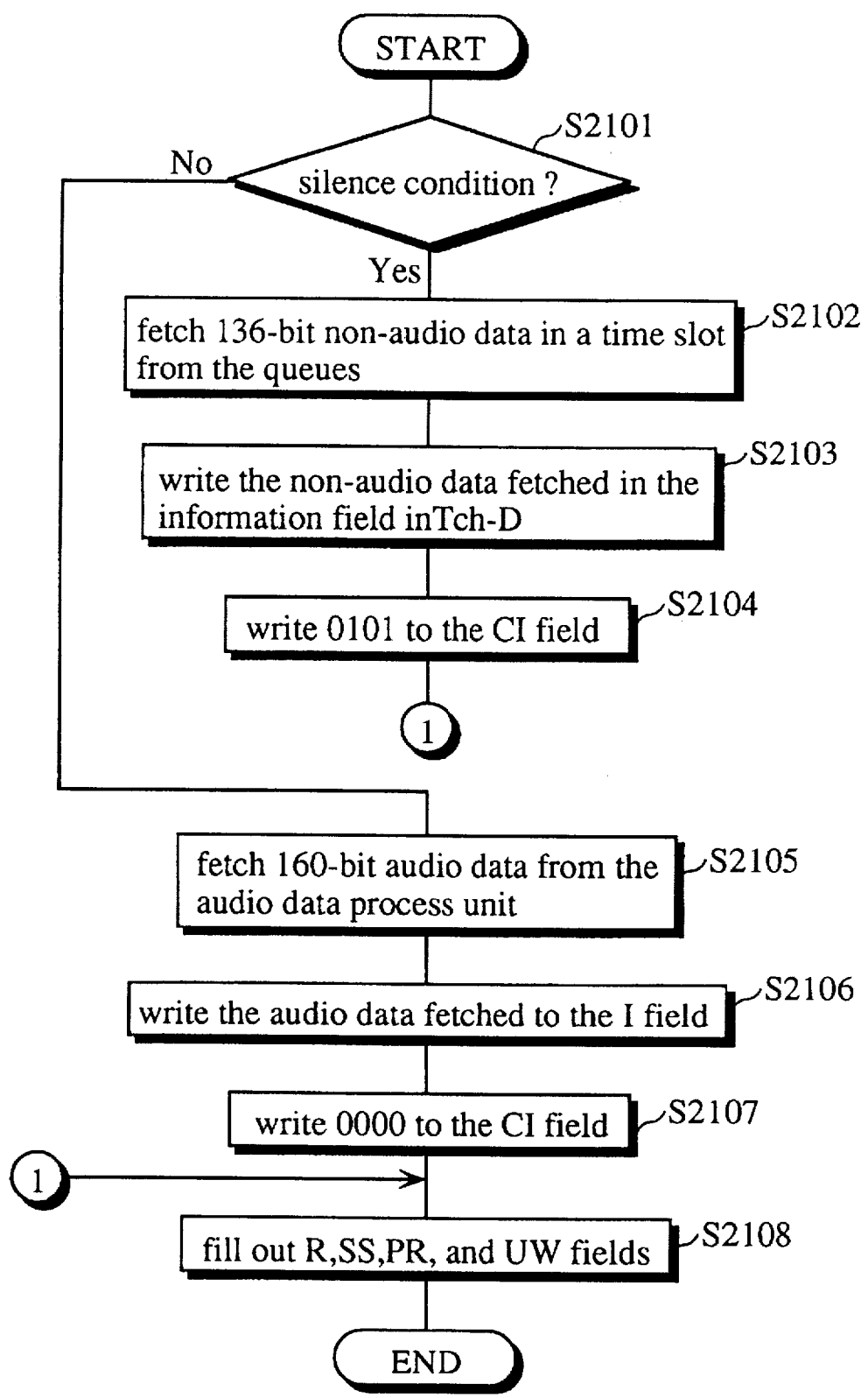
FIG. 21 shows a flowchart which depicts the process of the data write unit 2 in the transmitter personal station 131 of the first embodiment.

The data write unit 2 is started by the communication process unit 6 and performs the process of the flowchart shown in FIG. 21 every time a time slot is transmitted. The data write unit 2 writes 160-bit audio data which have been outputted from the audio data process unit 10 to the I field of the traffic channel, and further writes 136-bit non-audio data stored in the queues to the information field in the Tch-D. The data write unit 2 then outputs the time slot with the non-audio data to the modulation/demodulation unit 13 and makes the modulation/demodulation unit 13 and the RF/IF unit 14 transmit the time slot under the TDMA/TDD basis.

Figure 23:
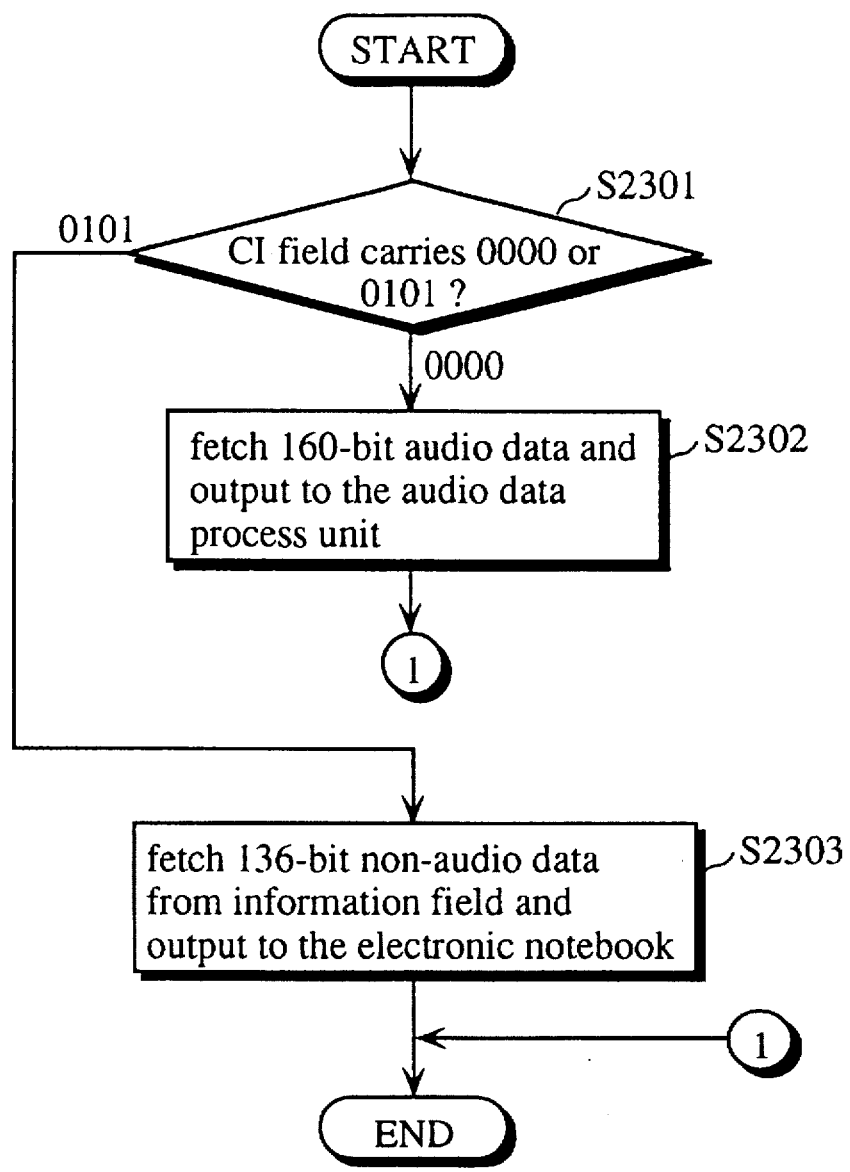
FIG. 23 shows a flowchart which depicts the process of the data distribution unit 3 of the receiver personal station 132 in the first embodiment.

The data distribution unit 3 is also started by the communication process unit 6 and performs the process of the flowchart shown in FIG. 23 every time a time slot is transmitted. The data distribution unit 3 outputs 160-bit audio data written in the I field of the time slot which has been received by the modulation/demodulation unit 13 and the RF/IF unit 14 to the D/A conversion unit 18 in the audio process unit 10, and further outputs 136-bit non-audio data written in the information field of the Tch-D to the electronic notebook.

The circuit error timer 4 counts a line error time-out which indicates an occurrence of a line error. The circuit error timer 4 starts a counting operation when a time slot whose P bit is set at "1" is transmitted and resets the counting operation when a time slot whose F bit is set at "1" is transmitted.

The following is a description of the line error time-out of the circuit error timer 4.

When an error has occurred either on the line or at the receiver personal station, the transmitter personal station receives no answer. As explained above, the transmitter personal station must receive an RR command from the receiver personal station after eight transmissions of non-audio data in the LAPDC, so that the occurrence of the error keeps the transmitter personal station waiting for the RR command. The line error time-out is provided to limit no response time period in order to avoid this problem.

To be more specific, when the transmitter personal station receives no response from the receiver personal station for more than a certain time period after having transmitted a time slot whose P bit is set at "1", the transmitter personal station regards this as an occurrence of an transmission error, and releases the data link.

The forced transmission timer 5 counts a forced transmission time-out to start data transmission forcibly when the communications are in a sound condition. The forced transmission time-out period is set shorter than the line error time-out period. The forced transmission timer 5 starts a counting operation at the same time as the circuit error timer 4.

The communication process control unit 6 controls the TDMA process unit 11, thereby controlling the transmission of time slots.

Figure 12:
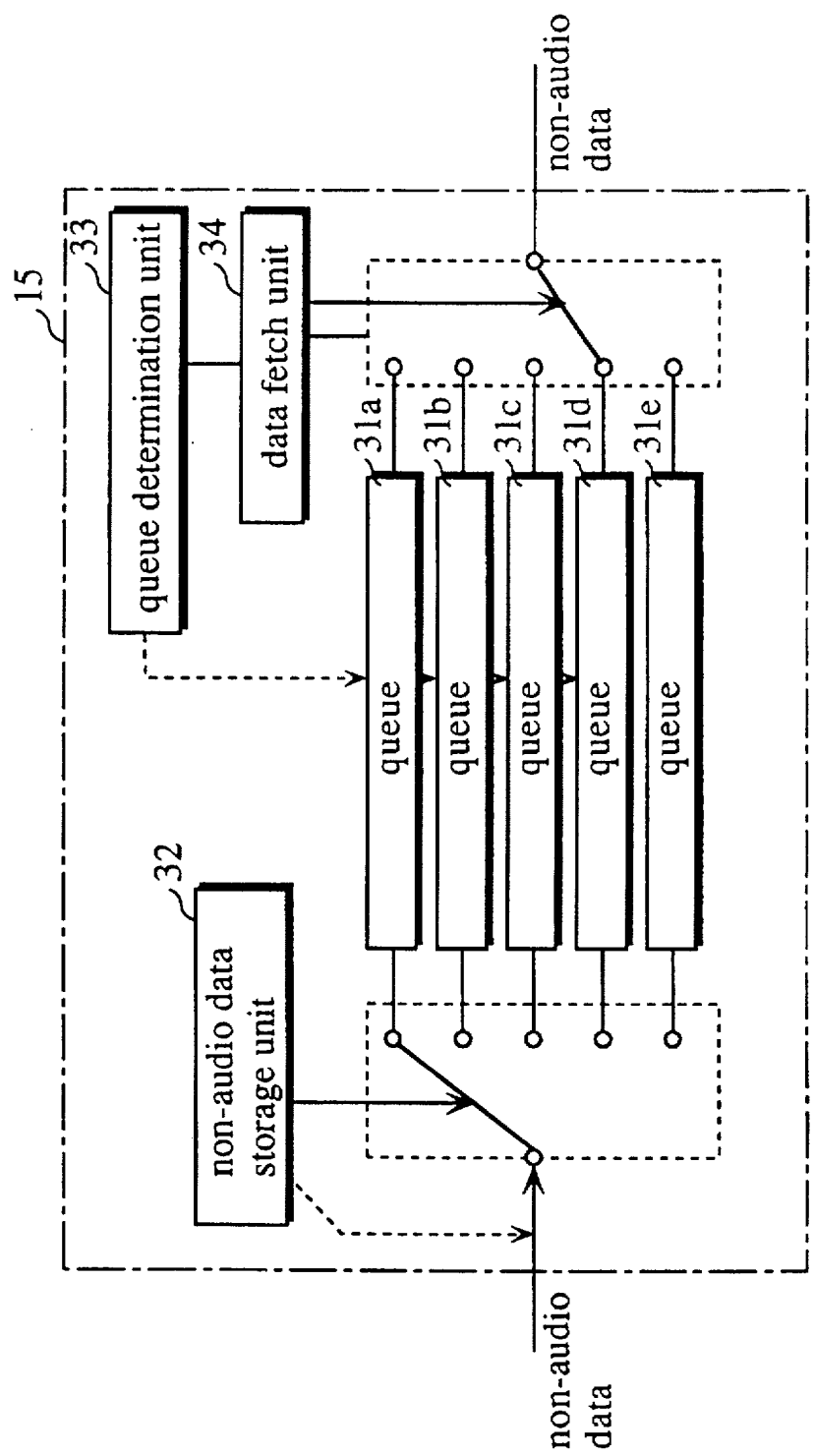
FIG. 12 shows the internal structure of the non-audio data holding unit 15.

FIG. 12 shows the internal structure of the non-audio data holding unit 15.

The non-audio data holding unit 15 is composed of queues 31a–31e, a non-audio data storage unit 32, a queue determination unit 33, and a data fetch unit 34.

The queues 31a–31e are provided to correspond to different types of non-audio data to be outputted from the electronic notebook. In the present embodiment, queues for map data and coordinate data are included in these queues. The different types of non-audio data will be described below.

The non-audio data storage unit 32 detects data type information from non-audio data which have been sent from the electronic notebook, determines the appropriate queue for the data type, and stores the non-audio data in the queue.

The queue determination unit 33 compares the amounts of non-audio data in each of the queues 31a–31e when the sound/silence flag 12 has detected a silence condition, and determines the queue with the largest amount of non-audio data.

The data fetch unit 34 fetches a predetermined amount of least-latest stored non-audio data from the queue with the largest amount of non-audio data, and outputs the non-audio data with an identifier to the data write unit 2.

Figure 6:
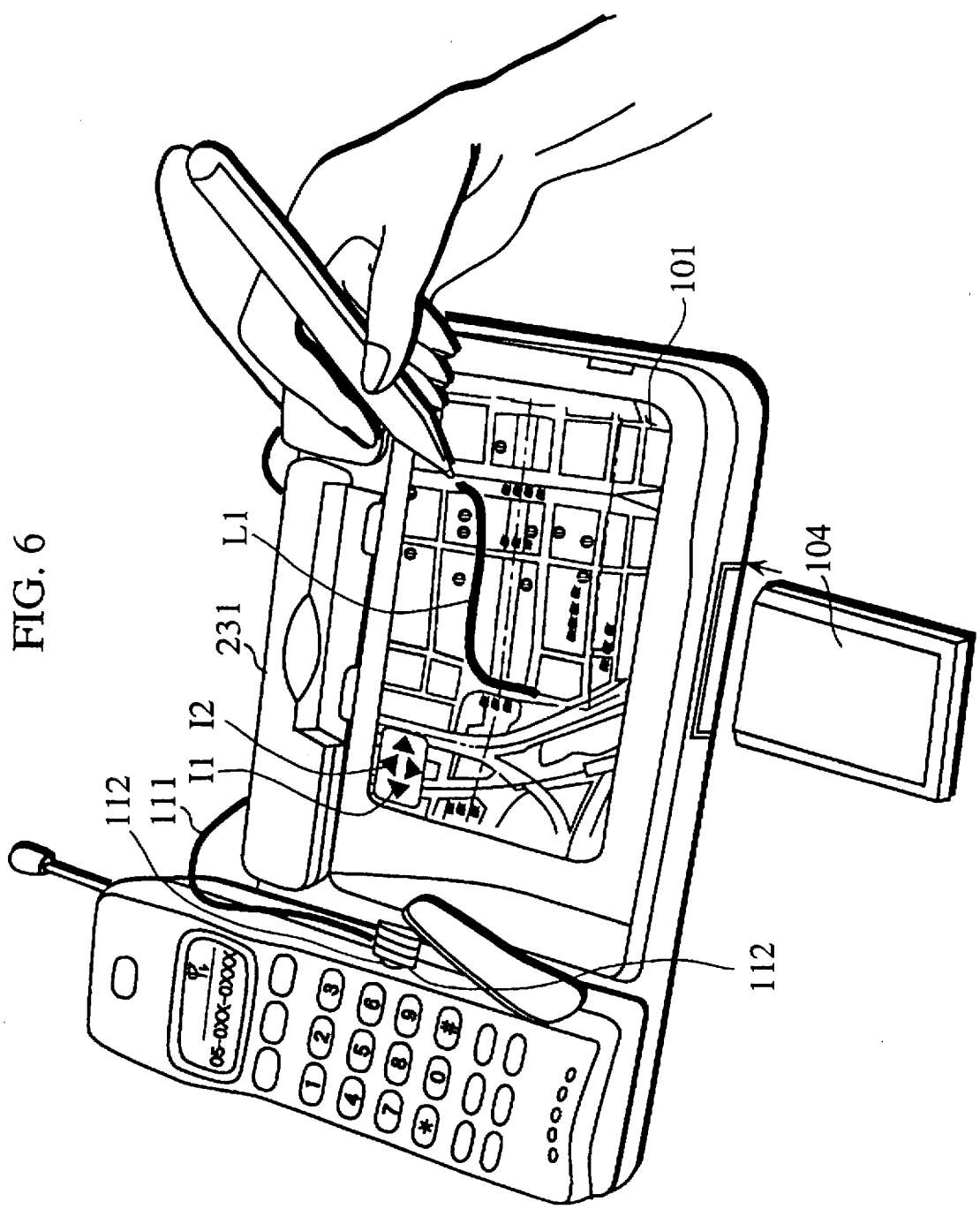
FIG. 6 shows the appearance of a transmitter personal station 131 and a receiver personal station 132 of a Handy Navigation System in the first embodiment.
Figure 7:
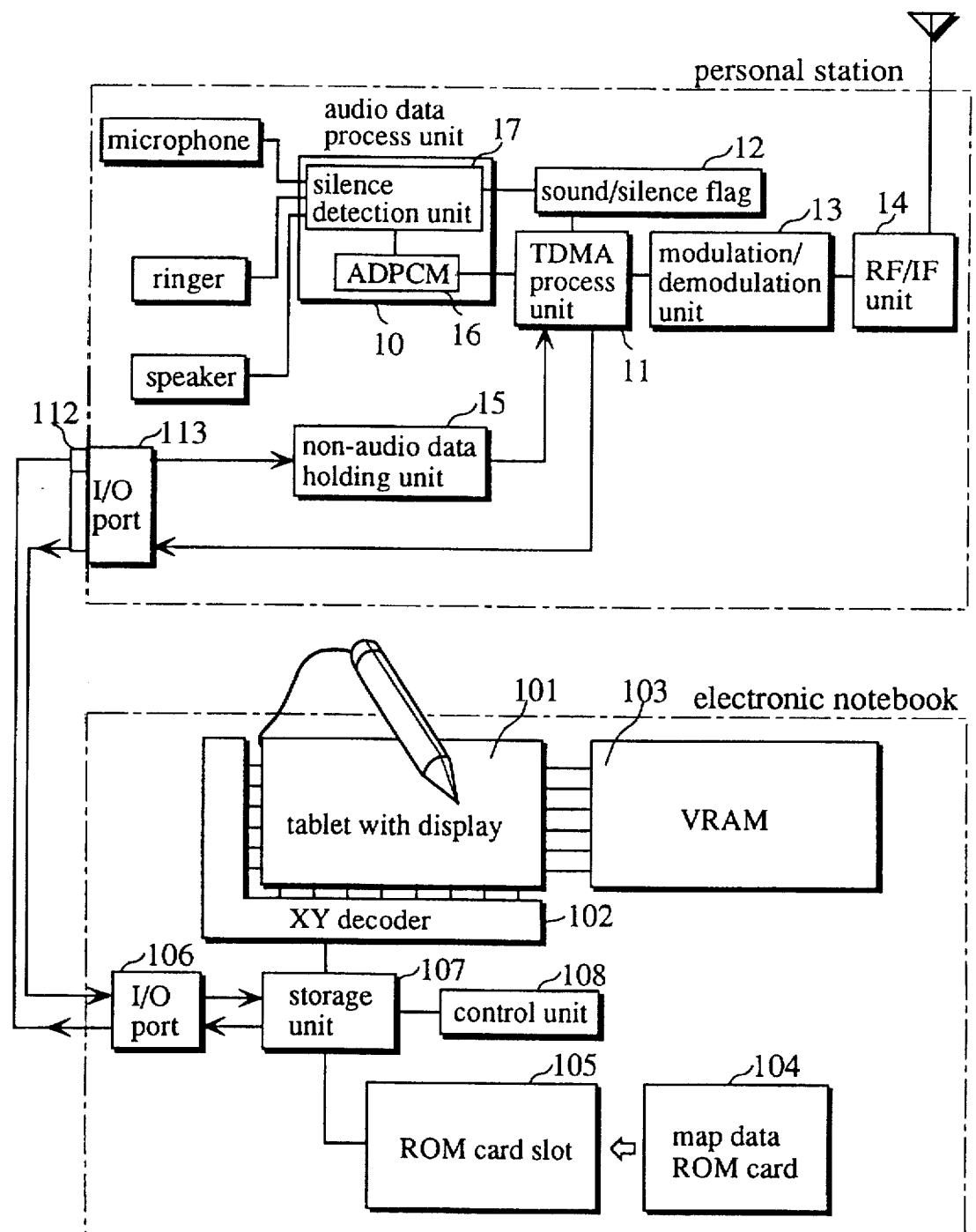
FIG. 7 shows the internal construction of the transmitter personal station 131 and the receiver personal station 132.

The following is a description on the appearance and the internal structure of an electronic notebook of the present invention, with reference to FIGS. 6 and 7.

As shown in FIG. 7, the electronic notebook includes a tablet 101 with display, an XY decoder 102, a VRAM 103, an ROM card slot 105, an I/O port 106, an storage unit 107, and a control unit 108.

As shown in FIG. 6, the display of the tablet 101 is exposed, and an opening is provided from which a map data ROM card 104 is inserted to set into the ROM card slot 105. The ROM card slot 105 stores map data, and the map data for one screen is displayed on the tablet 101.

Figure 13B:
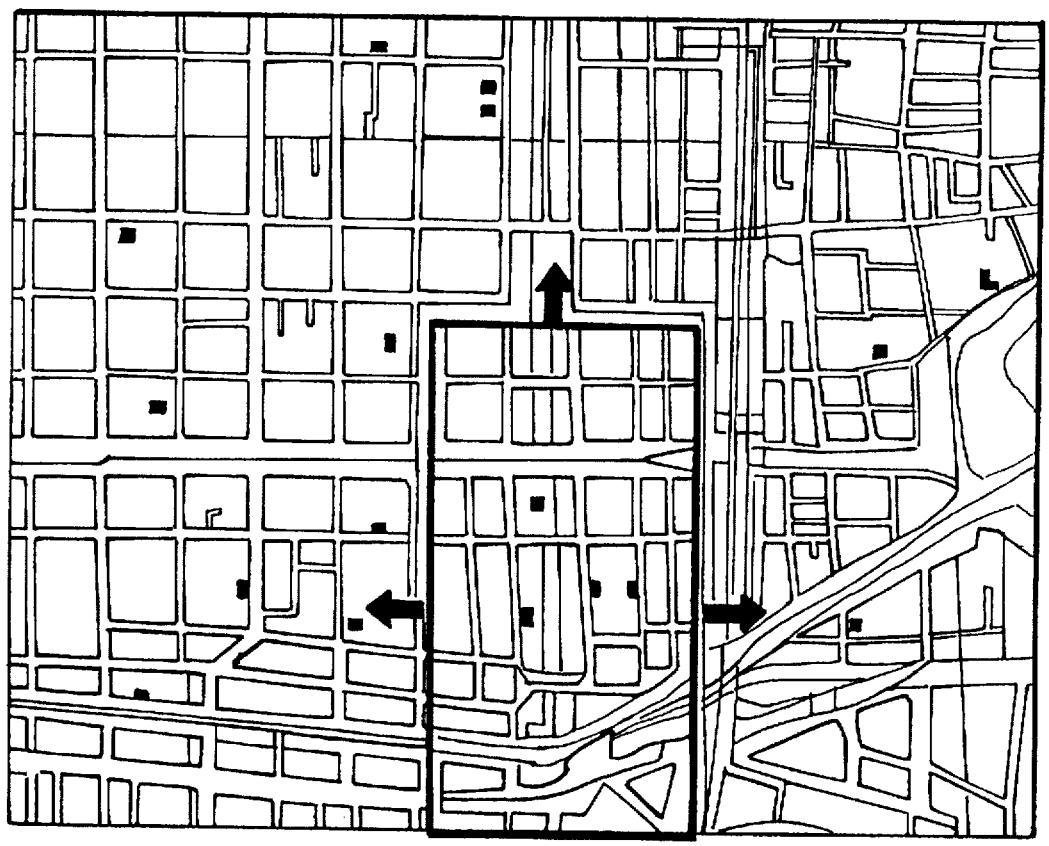
FIGS. 13A and 13B show a part of map shown in the tablet stored in the ROM card 104.
Figure 13A:
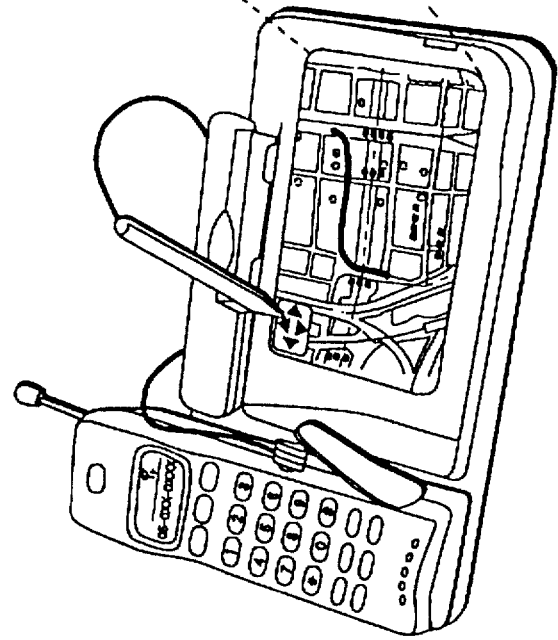

The icons I1 and I2 on the tablet 101 are used for a user to scroll the screen in the horizontal direction and the vertical direction, respectively by touching them with the pen as shown in FIGS. 13A and 13B show.

The tablet 101 with display is composed of a liquid crystal display and a transparent tablet disposed thereon. The transparent tablet includes censors in a matrix to detect pen touches.

The XY decoder 102, which is connected with the censors, detects the current position of the pen point on the display.

The current position is given by an orthogonal coordinate system which is composed of the top side and the left side of the tablet 101 as the X axis and the Y axis, respectively. The orthogonal system is associated with the coordinate on the liquid crystal display. Since the detection is performed by the scanning of the tablet, the movement of the pen across the surface of the display is expressed by discontinuous coordinate values such as (0, 110)(10,150)(20,180)(40,230).

The VRAM 103 stores various kinds of bit map patterns such as maps or pen drags. The contents of the VRAM 103 is continuously read by the data write unit 2 and displayed on the tablet 101.

The storage unit 107 stores various types of data to be used in the electronic notebook as shown in FIG. 14. The various types of data are assigned a priority level. The contents of each data are stored in the storage unit 107 when the icons I1 and I2 on the tablet 101 have been touched with the pen. The data accumulated in the storage unit 107 are transmitted to the non-audio data holding unit 15 through the I/O port 106 and the cable 111. In addition, the non-audio data to be transmitted from the transmitter personal station through the I/O port 106 and the cable 111 are accumulated in the storage unit 107 and transmitted to the non-audio data holding unit 15.

The control unit 108 stores an application program to control tele-pointing and tele-mapping, a facsimile application program to deal with facsimile data, a memo control application program to administrate hand-written memos, an album application program to form still picture data albums from still picture digital data which have been connected with an unillustrated connector, an electronic mail application program with an edit function to form and store electric mails, and a Front End Processor (FEP) to recognize pen drags as letters. The control unit 108 controls the integral process of the electronic notebook by executing these application programs and the FEP.

The ROM card slot 105 is a PCMCIA-compliant card slot for ROM cards, and can deal with memory cards, Ethernet communication cards for LAN, and interface cards for SCSI as long as they are PCMCIA compliant, besides the map data ROM card 104.

Figure 15A:
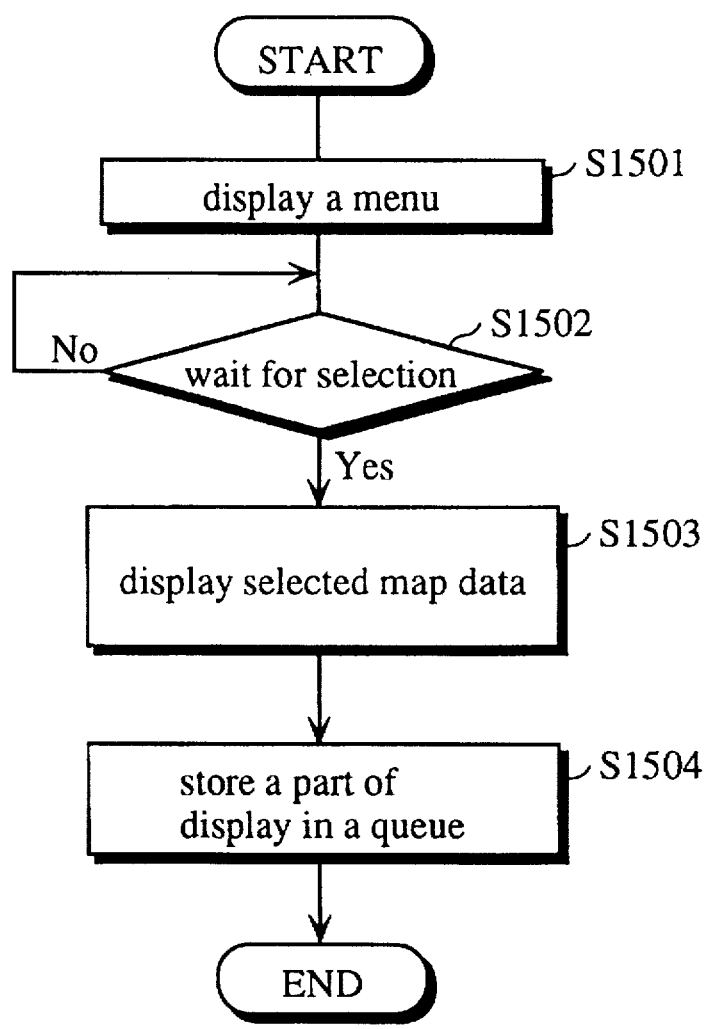
FIG. 15A shows a flowchart which depicts a process of the control unit 108.

The following is a description on the operation of the electronic notebook 231 connected with the personal station 131 in the Handy Navigation system with reference to the flowchart shown in FIG. 15A which depicts the process of the control unit 108. Hereinafter, the personal stations 131 and 132 are referred to as the transmitter personal station 131 and the receiver personal station 132.

At S1501, the control unit 108 makes the tablet 101 display a menu, in response to the start of the electronic notebook 231.

At S1502, the control unit 108 is put in a selection wait state, and the process proceeds to S1503 if there is a pen touch on the menu.

At S1503, a part of map data which has been selected with a pen touch is fetched from the map data ROM card 104 through the ROM card slot 105, and displayed on the tablet 101.

At S1504, the map data displayed are stored in the storage unit 107, sent to the transmitter personal station 131 at the same time through the cable 111, and held in the non-audio data holding unit 15.

Thus, after the execution of S1501–S1504, map data selected on the menu are stored in the storage unit 107 of the electronic notebook 231 and also in a queue in the non-data holding unit 15 of the transmitter personal station 131.

FIG. 16 shows an example of a menu displayed on the tablet 101 at S1501. One of the options 1–4 is selected by a user through a pen touch.

Figure 15B:
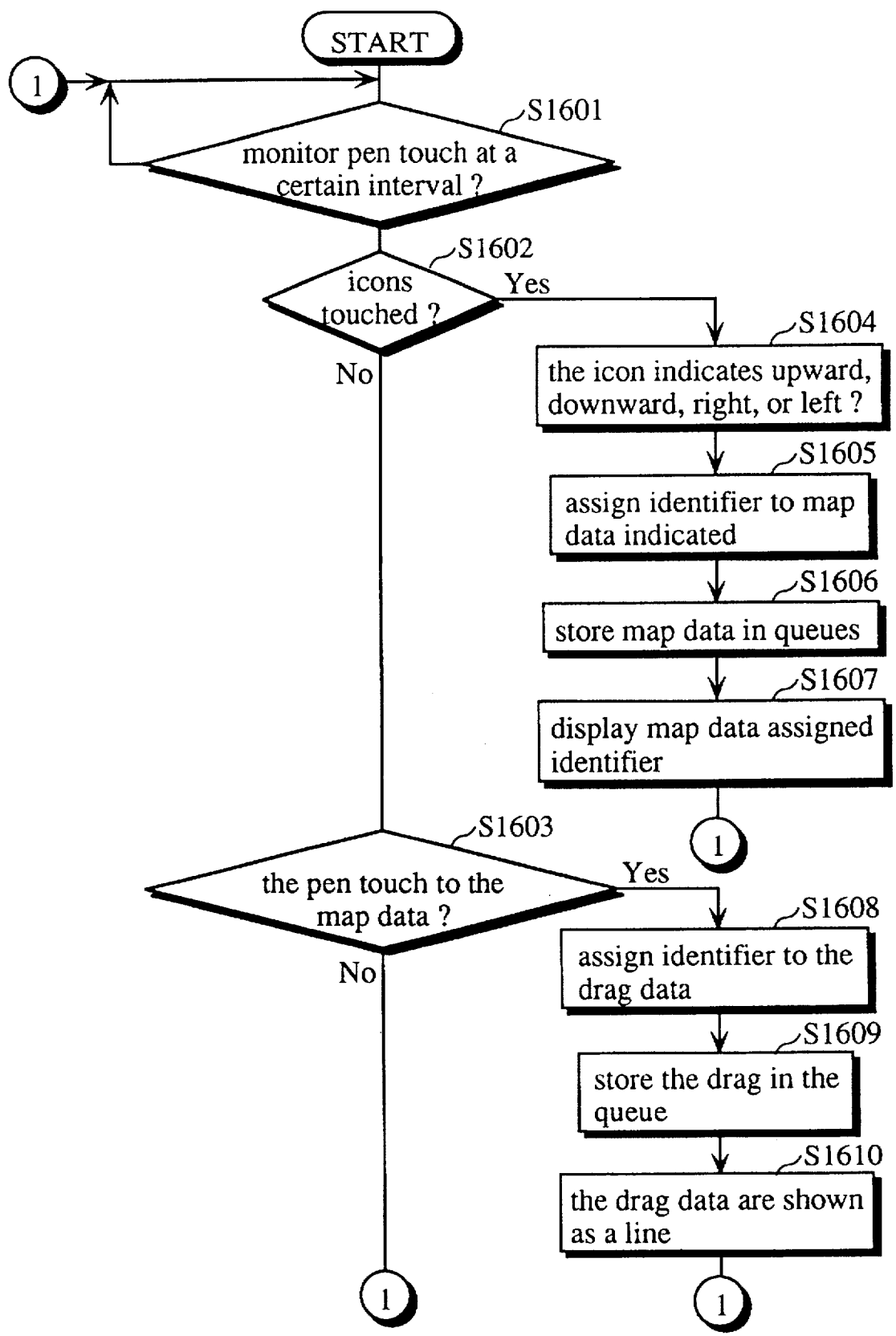
FIG. 15B shows a flowchart which depicts a process of the control unit 108.

FIG. 15B shows the process of the control unit 108 in the case where map data are on display.

At S1601, when a part of map data is displayed on the tablet 101 with the icons I1 and I2 at S1503 of FIG. 15A, the control unit 108 monitors the presence of a pen touch at a certain interval. If there is any pen touch, the process proceeds to S1602, and otherwise the control unit 108 keeps the monitoring operation.

At S1602, whether the pen touch is on one of the icons I1 and I2 is detected. If it is, the process proceeds to S1604, and otherwise proceeds to S1603.

In this case, the process proceeds to S1604 where the direction of the icon is selected from upward, downward, right, and left.

At S1605, an identifier is assigned to the map data indicated by the icon.

At S1606, the map data with the identifier are stored in a queue in the non-audio data holding unit 15 through the storage unit 107, the I/O port 106, and the cable 111.

At S1607, the map data with the identifier are displayed on the tablet 101, and the process returns to S1601.

Thus, a desired area of the map data is displayed on the tablet 101 by a user's pen touching an icon to scroll the map area enclosed with a black frame in the direction indicated by the icon.

In the case where a user has drawn a line across the desired area, the process proceeds from S1602 to S1603.

At S1603, whether the pen touch is on the map data or not is determined. If it is, the process proceeds to S1608, and otherwise returns to S1601.

In this case, the pen touch is on the map data, so that the process proceeds to S1608.

At S1608, drag data which indicate the movement of the pen is assigned an identifier and sent to the storage unit 107.

At S1609, the identifier-assigned drag data are stored in a queue in the non-audio data holding unit 15.

At S1610, the drag data are shown on the map as a line L1 shown in FIG. 6, and the process returns to S1601.

These steps S1608–1610 are executed every time a user drags the pen across the map data. As a result of the repetition of these steps, a line is drawn on the tablet 101 and drag data are accumulated in the queue for drag data.

Figure 17:
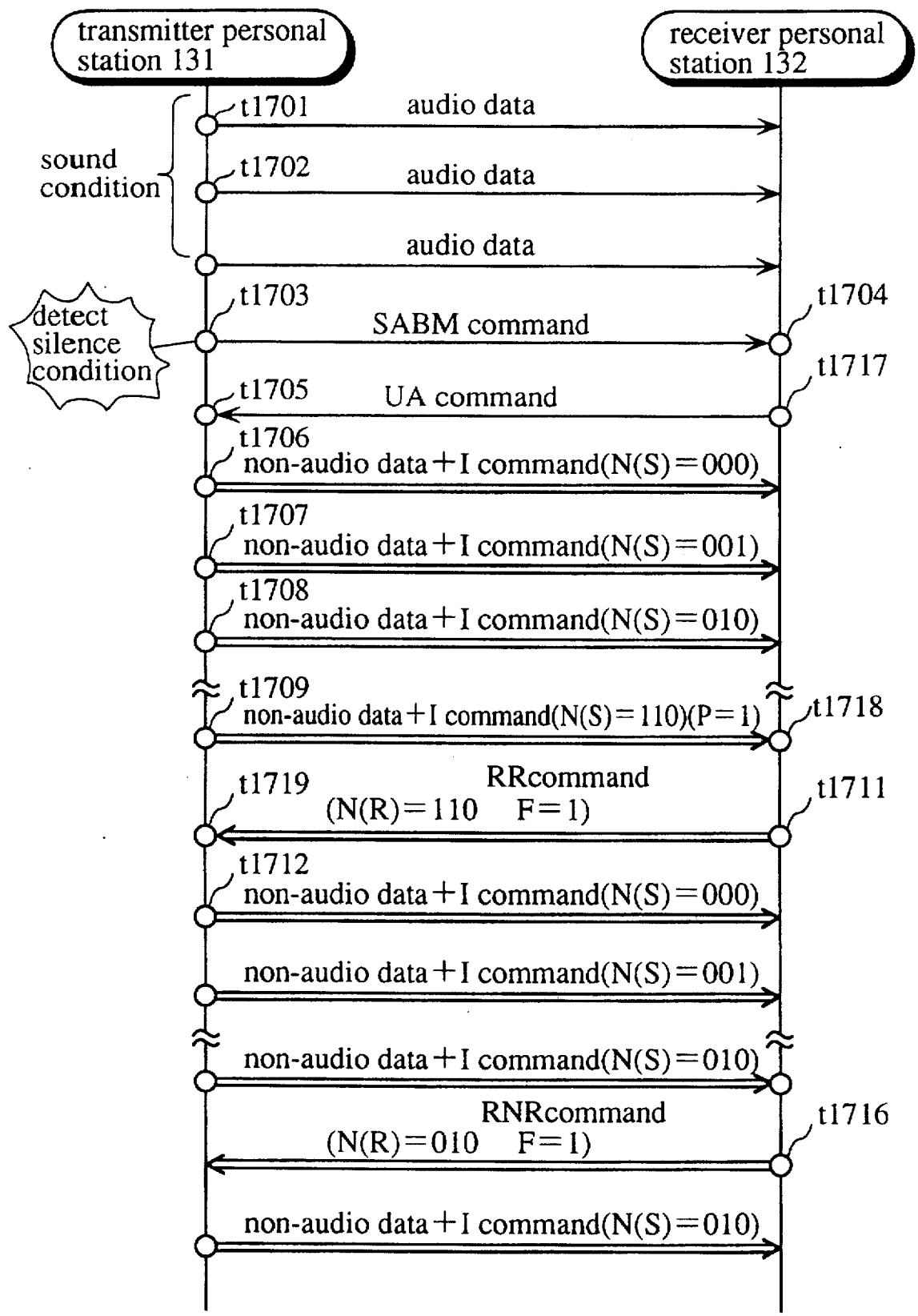
FIG. 17 shows a sequence of audio/non-audio data transmission between the transmitter personal station 131 and the receiver personal station 132.

FIG. 17 shows a data transmission sequence which depicts how the transmitter personal station 131 transmits map data and drag data accumulated in the queues together with audio data through its communication process control unit 6 and transmission control procedure execution unit 1 to the receiver personal station 132.

In the diagram, "silence condition detection", "sound condition detection", and "time-out" feature the present invention, and important transmission timings are marked with circles. In the explanation of this data transmission sequence, operations to be performed by the transmission control procedure execution unit 1, the data write unit 2, the modulation/demodulation unit 13, the RF/IF unit 14 of either the transmitter personal station 131 or the receiver personal station 132 are referred to as operations of the transmitter personal station 131 or the receiver personal station 132, in order to make the explanation simpler. In the following explanation, audio data and non-audio data to be transmitted in time slots are referred to as audio messages and non-audio messages, respectively.

It is assumed that a user of the transmitter personal station 131 with the electronic notebook 231 is talking with a user of the receiver personal station 132 with the electronic notebook 232, and both are away from each other within the city shown in FIG. 2.

The communication process control unit 6 of the transmitter personal station 131 writes "0000" to the CI field while the users are talking, thereby transmitting audio messages sequentially to the receiver personal station 132. The audio messages correspond to a time slot where audio data are written in the I field of the traffic channel.

During the transmission of the audio messages, the communication control procedure execution unit 1 refers to the sound/silence flag 12, fetches non-audio data from an appropriate queue in the non-audio data holding unit 15, and transmits the non-audio data to the modulation/demodulation unit 13. The modulation/demodulation unit 13 performs π/4PSK modulation with a frequency band assigned to the corresponding cell station, transmits time slots with audio data to the receiver personal station 132.

At t1701 and 1702, time slots including audio data in their I fields are transmitted to the receiver personal station 132 because the communications are still in a sound condition.

At t1703, the sound/silence flag 12 detects a silence condition because the user of the transmitter personal station 131 has paused. The communication process control unit 6 is informed of the silence condition from the silence detection unit 17, and writes "0101" in the CI field to designate the Tch-D, thereby transmitting an SABM command to the receiver personal station 132. After the transmission of the SABM command, the communication process control unit 6 waits for the receiver personal station 132 to return a command to inform the safe receipt of the SABM command.

At t1704, the receiver personal station 132 receives the SABM command writes "0101" to the CI field to designate the Tch-D.

At t1717, the receiver personal station 132 transmits a UA command to the transmitter personal station 131, and the communication process control unit 6 of the transmitter personal station 131 is put in a reception wait state.

At t1705, the communication process control unit 6 of the transmitter personal station 131 receives the UA command, and starts the data write unit 2. The data write unit 2 refers to the sound/silence flag 12, fetches non-audio data from a queue in the non-audio data holding unit 15, and outputs the non-audio data to the modulation/demodulation unit 13. Since coordinate data and map data are stored in the queues in this case, a silence condition is still on.

At t1706, the communication process control unit 6 makes the data write unit 2 write "0101" to the CI field to set a format for non-audio data. The transmitter personal station 131 transmits a non-audio data+I command (N(S)=000) message to the receiver personal station 132. After the transmission of this message, the communication process control unit 6 of the transmitter personal station 131 starts the data write unit 2. The data write unit 2 refers to the sound/silence flag 12.

At t1707, since the silence condition is still on, the communication process control unit 6 makes the data write unit 2 write non-audio data to the information field, and transmits a non-audio data+I command (N(S)=001) to the receiver personal station 132.

After the transmission of the non-audio data+I command, the communication process control unit 6 of the transmitter personal station 131 starts the data write unit 2. The data write unit 2 refers to the sound/silence flag 12.

At t1708, since the silence condition is still on, the communication process control unit 6 makes the data write unit 2 write non-audio data to the information field, and transmits a non-audio data+I command (N(S)=010) message to the receiver personal station 132.

Through such iterative data transmissions, the transmission control procedure execution unit 1 transmits non-audio data accumulated in the non-audio data holding unit 15 to the receiver personal station 132 by assigning sequential numbers.

At t1709, the communication process control unit 6 of the transmitter personal station 131 transmits a non-audio data+I command (N(S)=110) message to the receiver personal station 132. After the transmission of this message, the communication process control unit 6 makes the data write unit 2 refer to the sound/silence flag 12. Since the silence condition is still on, the transmitter personal station 131 is supposed to transmit a non-audio data+I command (N(S)=110) message to the receiver personal station 132. However, since this is the seventh transmission, P bit of the message is set at "1" to request the receiver personal station 132 to transmit a confirmation command.

After having transmitted the messages corresponding to (N(S)=000) to (N(S)=110), the communication process control unit 6 enters a wait state for the receiver personal station 132 to transmit an RR command where F bit is set at "1", to confirm the successful receipt of these messages by the receiver personal station 132.

At t1718, the receiver personal station 132 receives the non-audio data+I command (N(S)=110) message.

At t1711, the receiver personal station 132 transmits an RR command where N(R)=110 to the transmitter personal station 131.

At t1719, the transmitter personal station 131 receives the RR command where N(R)=110.

At t1712, the transmitter personal station 131 transmits a non-audio data+I command (N(S)=000) message to the receiver personal station 132. After the transmission of this message, the communication process control unit 6 of the transmitter personal station 131 makes the data write unit 2 refer to the sound/silence flag 12. Since the silence condition is still on, the communication process control unit 6 transmits a non-audio data+I command (N(S)0=001) message to the receiver personal station 132.

The communication process control unit 6 continues such transmission as long as a silence condition lasts. Wherever personal stations are carried by their users, the transmission of non-audio data are maintained by the hand-over process of cell stations. Even if there is a transmission error on a transmitter personal station, the data distribution unit 3 of a receiver personal station restores non-audio data by means of its error correction function. Consequently, there is no interruption of the transmission of non-audio data.

It is assumed that at t1714, the non-audio data+I command (N(S)=010) message from the transmitter personal station 131 has a transmission error, and the receiver personal station 132 cannot restore the non-audio data by checking the FCS.

At t1716, the transmission control procedure execution unit 1 of the receiver personal station 132 refers to the sequence numbers (N(S)=010) assigned to the non-audio data which cannot be restored, and transmits an RNR command where N(R)=010 and F bit is set at "1" to the transmitter personal station 131. The transmission control procedure execution unit 1 of the transmitter personal station 131 re-transmits the non-audio data+I command (N(S)=010) message as requested to the receiver personal station 132.

When a silence condition lasts for a long time period, almost all the non-audio data in the non-audio data holding unit 15 are transmitted to the receiver personal station 132 through the repetition of these transmissions.

The pen drag data accumulated in a queue are also transmitted to the receiver personal station 132 after the map data have been transmitted, so that the tablet 101 of the receiver personal station 132 shows the same pen drag as on the tablet 101 of the receiver personal station 132. In this case, the pen drag indicates the location of the user of the transmitter personal station 131.

Figure 18:
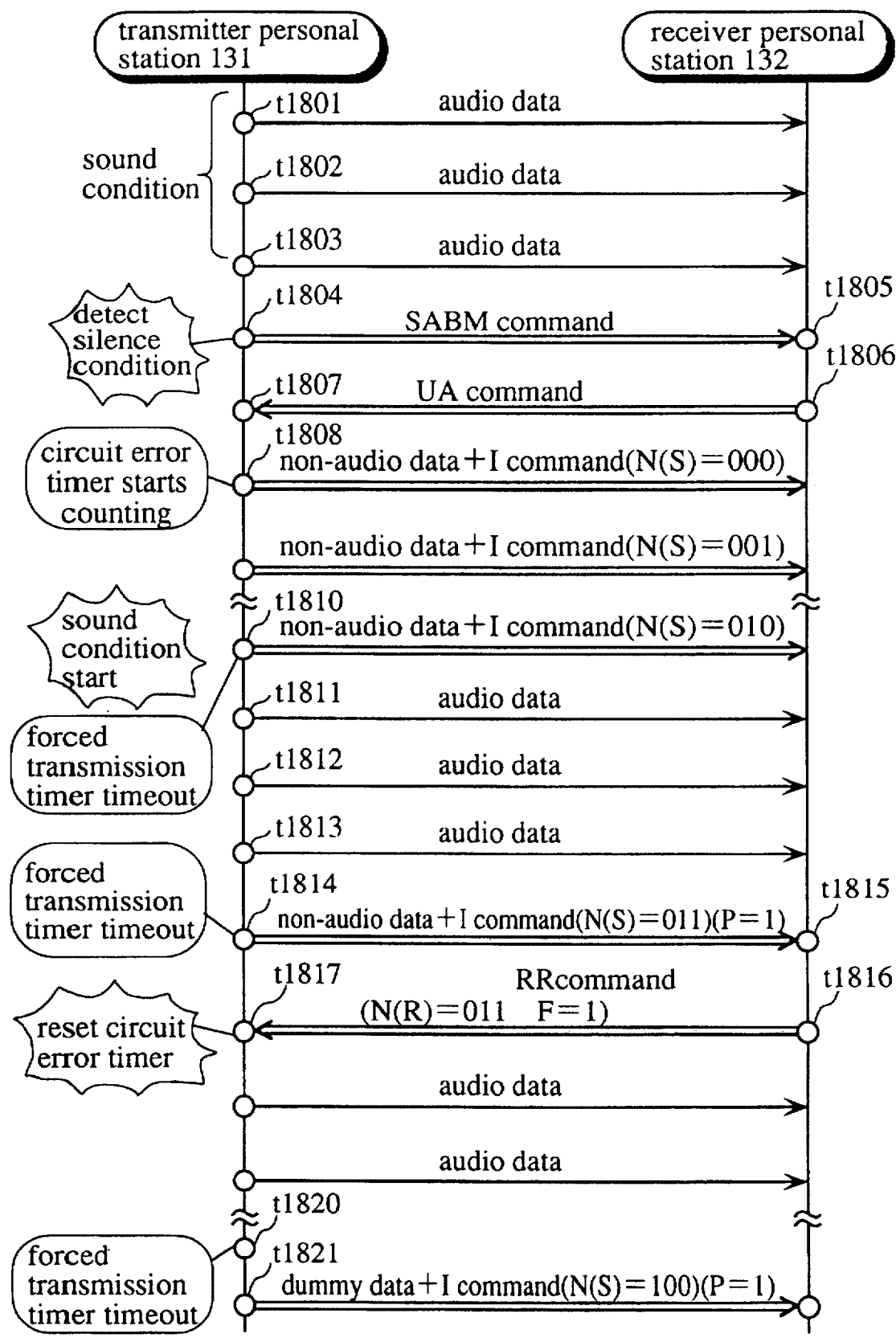
FIG. 18 shows the sequence of the transmission of audio data and non-audio data when the circuit error timer 4 and the forced transmission timer 5 have timed out.

FIG. 18 shows the data transmission sequence which depicts the counting operations of the circuit error timer 4 and the forced transmission timer 5 in the audio and non-audio data transmission between the transmitter personal station 131 and the receiver personal station 132.

It is assumed that the data transmissions in t1701–t1709 shown in FIG. 17 are carried out in t1801–t1809.

At t1808, the circuit error timer 4 starts a counting operation when the time slot where N(S)=000 is transmitted.

At t1810, the communication process control unit 6 of the transmitter personal station 131 transmits a non-audio data+I command (N(S)=010) message to the receiver personal station 132.

At the same time, the data write unit 2 of the transmitter personal station 131 writes "0000" in the CI field to designate the traffic channel, and transmits an audio message to the receiver personal station 132. After the transmission of the message, the data write unit 2 refers to the sound/silence flag 12 to confirm a sound condition. The sound condition indicates that the users at both sides have resumed their conversation since the user of the receiver personal station 132 has been informed of the location of the user of the transmitter personal station 131. The communication process control unit 6 of the transmitter personal station 131 makes the data write unit 2 refer to the sound/silence flag 12, and transmits an audio message to the receiver personal station 132.

At t1810, the forced transmission timer 5 also starts a counting operation, in response to the resumption of the sound condition.

At t1811–t1813, the transmitter personal station 131 continues to transmit audio messages to the receiver personal station 132.

If such audio data transmission is repeated, the receiver personal station 132 cannot receive a time slot where N(S)=011 forever, and the circuit error timer 4 causes time-out, leading to the disconnection of the data link.

However, this problem is prevented by the forced transmission timer 5 with a shorter timeout period timing out earlier than the circuit error timer 4.

At t1814, the forced transmission timer 5 times out. The communication process control unit 6 of the transmitter personal station 131 transmits a non-audio data+I command (N(S)=011) message where P bit is set at "1" to the receiver personal station 132.

At t1816, the communication process control unit 6 of the receiver personal station 132, which has received the time slot where N(S)=011 transmits an RR command where N(R)=011 to the transmitter personal station 131.

At t1817, the transmitter personal station 131 has received the time slot where N(S)=011. Consequently, the transmitter personal station 131 has received the RR command before the timeout of the circuit error timer 4. The circuit error timer 4 of the receiver personal station 132 is reset.

Even if a silence condition is replaced by a sound condition as a result of non-audio data having transmitted in the sound condition, the data link which has been established when the silence condition has been detected is maintained. Therefore, there is no need to establish another data link for another silence condition.

It is assumed that all the non-audio data accumulated in the queues in the non-audio data holding unit 15 of the transmitter personal station 131 have been transmitted by the timeout of the forced transmission timer 5 and no non-audio data are left in the queues.

At t1820, the time-out of the forced transmission timer 5 is detected.

At t1821, the communication process control unit 6 assigns sequence numbers to dummy data and transmits a dummy data+I command (N(S)=011) message where P bit is set at "1" to the receiver personal station 132.

Figure 19:
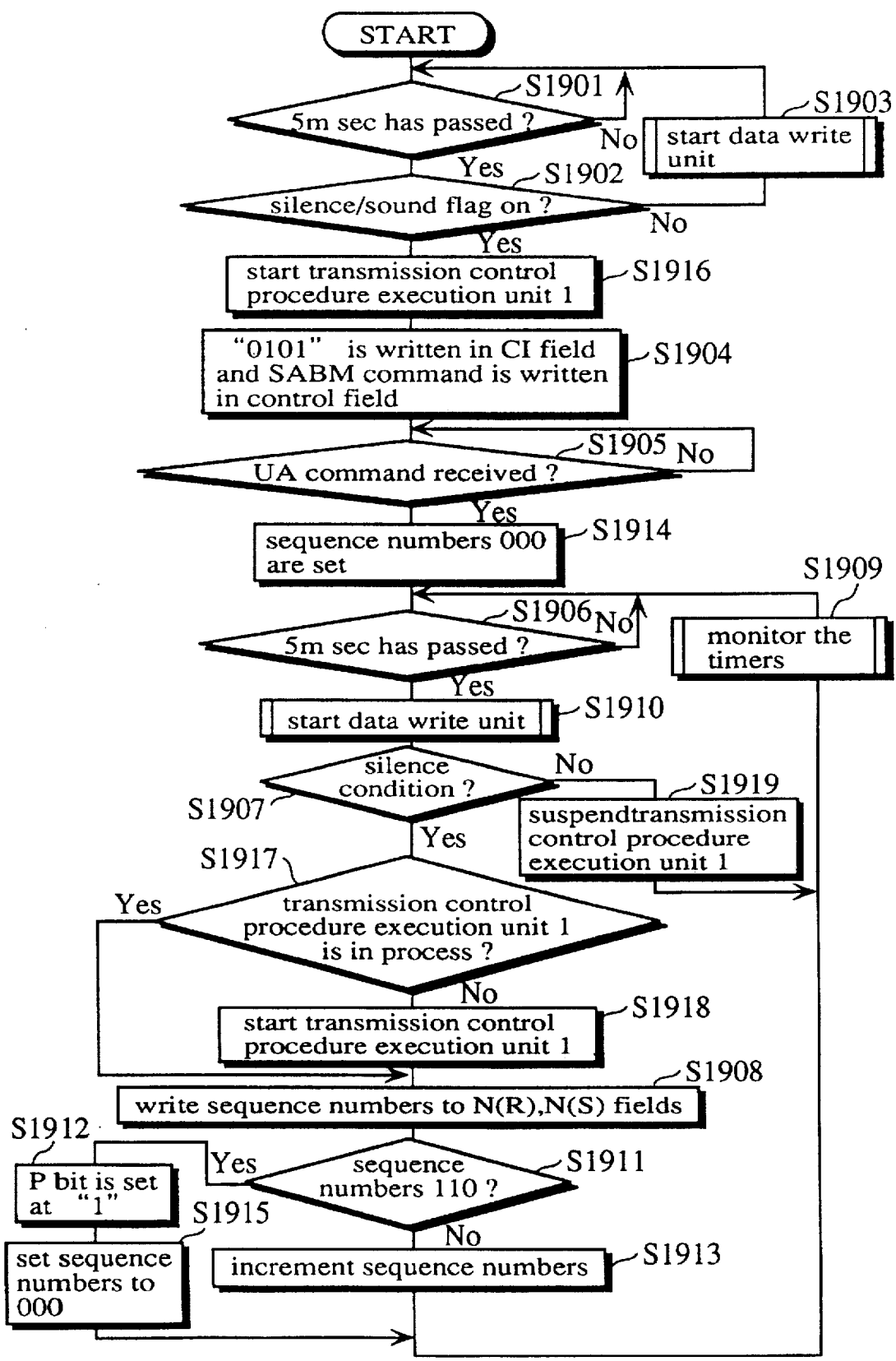
FIG. 19 shows the flowchart which depicts the process of the transmission process control unit 6 of the transmitter personal station 131 in the first embodiment.
Figure 20:
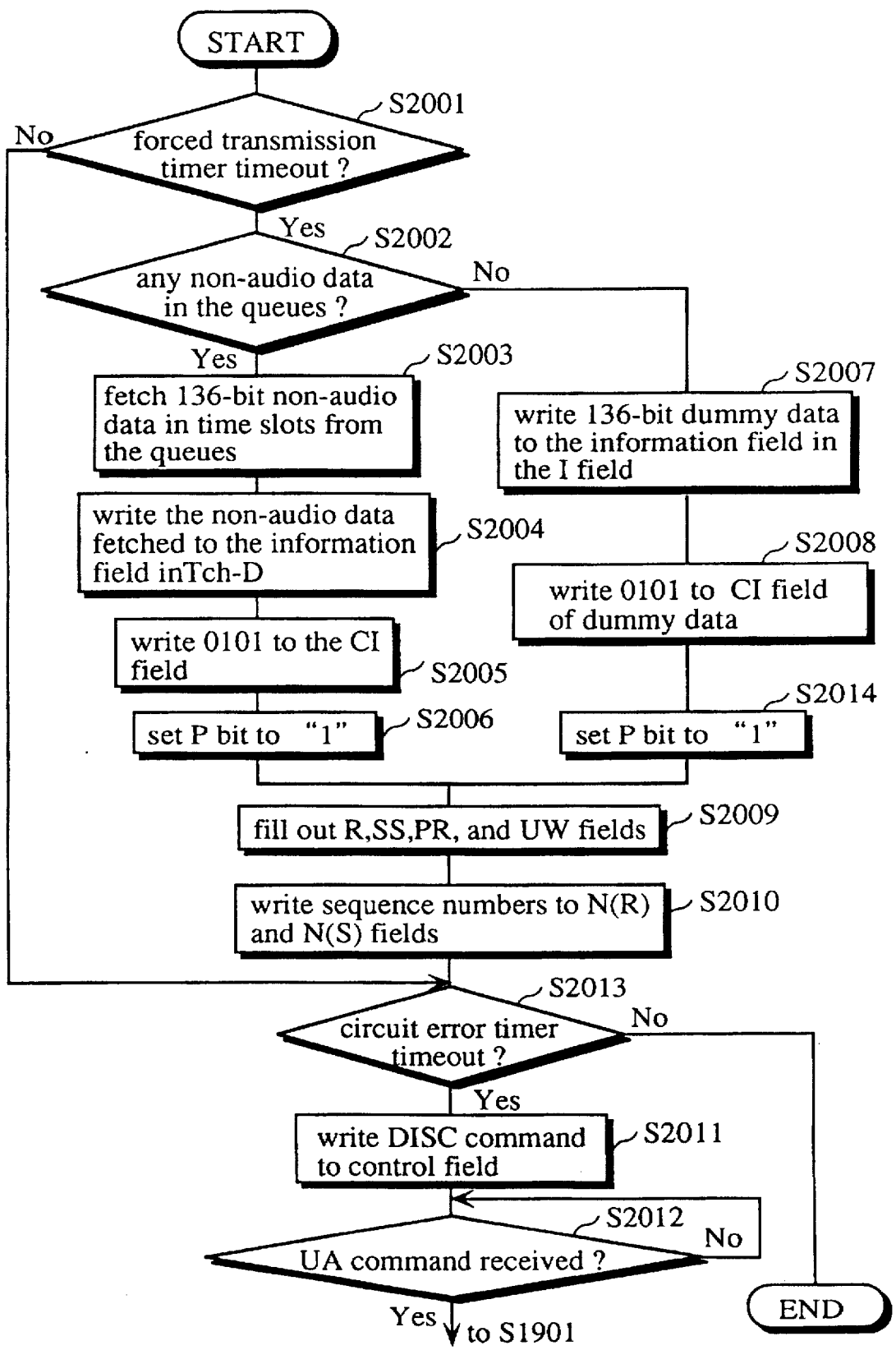
FIG. 20 shows the flowchart which depicts the monitoring operation of the circuit error timer 4 and the forced transmission timer 5 by the communication process control unit 6.
Figure 22:
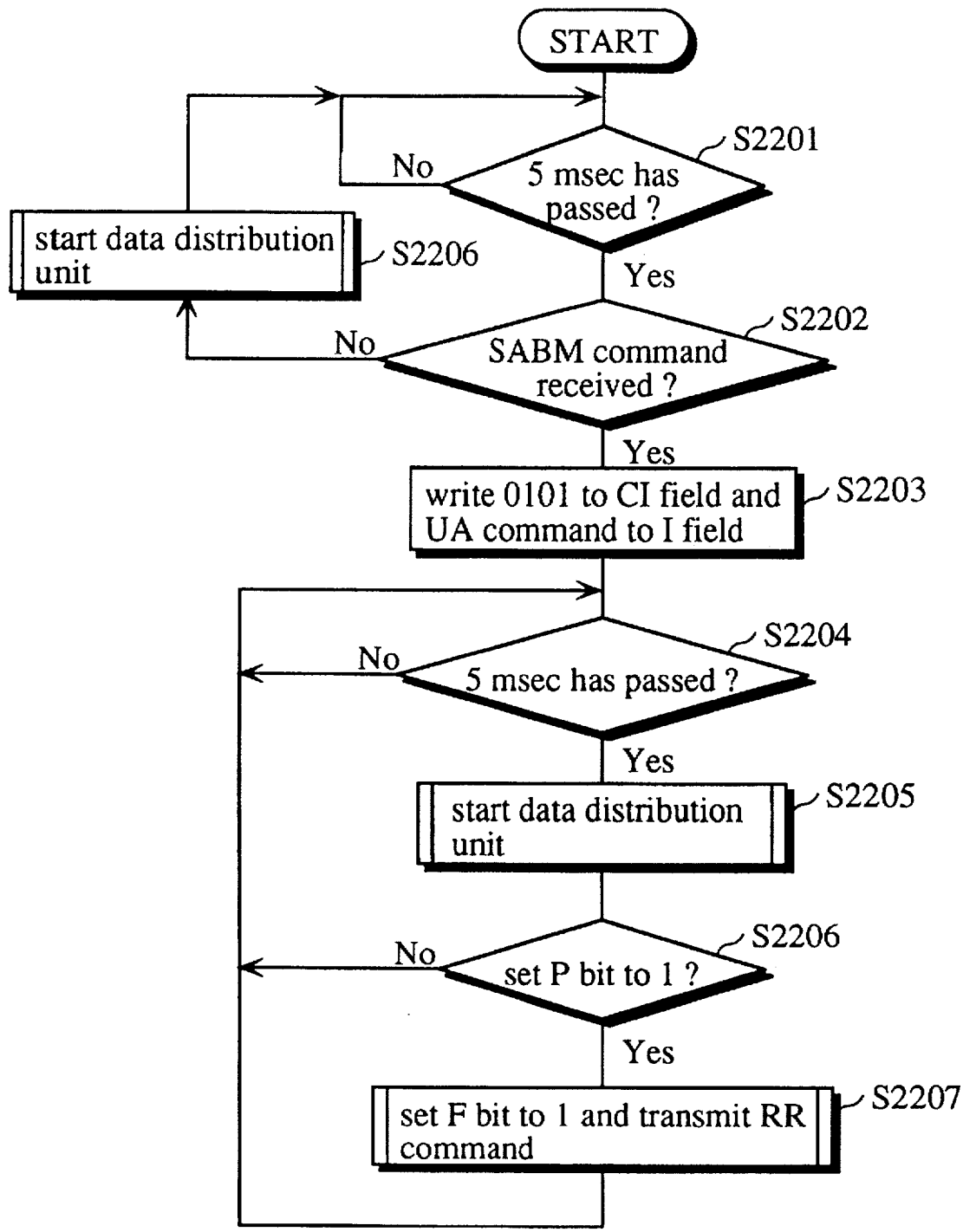
FIG. 22 shows a flowchart which depicts the process of the communication process control unit 6 in the receiver personal station 132 in the first embodiment.

The processes of the transmission control procedure execution unit 1, the data write unit 2, and the communication process control unit 6 are detailed hereinafter with reference to the flowcharts in FIGS. 19–23. FIGS. 19 and 20 show flowcharts which depict the processes of the communication process control unit 6 in the transmitter personal station 131. FIG. 21 shows the process of the data write unit 2 in the transmitter personal station 131. FIG. 22 shows a flowchart which depicts the communication process control unit 6 in the receiver personal station 132. FIG. 23 shows a flowchart which depicts the process of the data distribution unit 3 in the receiver personal station 132.

<Audio-data transmission in a sound condition>

At S1901 in the flowchart of FIG. 19, the communication process control unit 6 in the transmitter personal station 131 checks whether 5 msec has passed. If the time period has passed, the process proceeds to S1902, and otherwise, the checking operation is repeated.

At S1902, the communication process control unit 6 determines whether the communication is in a silence condition or a sound condition by referring to the sound/silence flag 12. If it is a silence condition, the process proceeds to S1916, and otherwise proceeds to S1903. In this case, the process proceeds to S1903, where the communication process control unit 6 starts the data write unit 2, and returns to S1901.

<The operation of the data write unit 2 in a sound condition>

At S2101 in the flowchart of FIG. 21, the data write unit 2 of the transmitter personal station 131 determines whether the communication is in a sound condition or a silence condition by referring to the sound/silence flag 12. If it is in a sound condition, the process proceeds to S2105, and otherwise proceeds to S2102. In this case, the process proceeds to S2105.

At S2105, the data write unit 2 fetches 160-bit audio data from the audio data process unit 10 in time slot units.

At S2106, the data write unit 2 writes the 160-bit audio data fetched to the I field.

At S2107, the data write unit 2 writes "0000" to the CI field.

At S2108, the data write unit 2 writes data to the R, SS, PR, and UW fields.

These steps S2105–S2107 are executed every time the data write unit 2 is started by the communication process control unit 6 at S1903 shown in FIG. 19, and time slots with audio data are transmitted sequentially.

<Transition from a sound condition to a silence condition>

In the flowchart of FIG. 19, when the communication is in a silence condition, the process proceeds from S1902 to S1916.

At S1916, the communication process control unit 6 makes the communication control procedure execution unit 1 control error detection, error correction, and data re-transmission.

At S1904, the communication process control unit 6 makes the data write unit 2 write "0101" to the CI field to designate the Tch-D, and write the SABM command to the control field.

At S1905, whether the transmitter personal station 131 has received the UA command is checked. If it has, the process proceeds to S1914, and otherwise repeat the checking operation. Since the transmitter personal station 131 has already received the UA command in this case, the process proceeds to S1914.

At S1914, sequence numbers "000" are set.

At S1906, the communication process control unit 6 checks whether 5 msec has passed. If the time period has passed, the process proceeds to S1910, and otherwise repeats the checking operation.

At S1910, the communication process control unit 6 starts the data write unit 2.

At S1907, the communication process control unit 6 refers to the sound/silence flag 12 to check whether the communication is in a silence condition or a sound condition. In this case, the communication is in a silence condition, so that the process proceeds to S1917.

At S1917, the communication process control unit 6 checks whether the communication control procedure execution unit 1 is in operation. If it is in operation, the process proceeds to S1908, and otherwise proceeds to S1918. In this case, the process proceeds to S1908.

At S1908, the communication process control unit 6 makes the data write unit 2 write sequence numbers to the fields for N(R) and N(S).

At S1911, whether the sequence numbers are "101" is checked. If so, the process proceeds to S1912, and otherwise proceeds to S1913. In this case, the process proceeds to S1913.

At S1913, the sequence numbers are incremented by one.

At S1909, the circuit error timer 4 and the forced transmission timer 5 are monitored.

When the data write unit 2 has been started seven times and non-audio data are written seven times at S1910, the sequence numbers become "101" and the process proceeds to S1911.

At S1911, the sequence numbers are determined as "110" in this case, and the process proceeds to S1912.

At S1912, P bit is set at "1", and as a result, the receiver personal station 132 is requested to transmit an RR command.

At S1915, the sequence numbers are set at "000", and the process proceeds to S1909.

<The operation of the data write unit 2 in a silence condition>

When the data write unit 2 is started by the communication process control unit 6 at S1910 shown in FIG. 19, the process of the data write unit 2 proceeds to S2101 in the flowchart of FIG. 21.

At S2101, the data write unit 2 determines the communication to be in a silence condition in this case, and the process proceeds to S2102.

At S2102, 136-bit non-audio data are fetched from the non-audio data holding unit 15 in time slot units.

At S2103, the 136-bit non-audio data fetched are written to the information field for the Tch-D.

At S2104, the data write unit 2 writes "0101" which indicate non-audio data to the CI field.

At S2108, the data write unit 2 writes data to the R, SS, PR, and UW fields. This is the end of the process. Every time the data write unit 2 is started by the communication process control unit 6, these steps 2102-S2104 are executed to transmit non-audio data.

If the communication is shifted from a silence condition to a sound condition, the process proceeds from S1907 to S1919.

At S1919, the operation of the communication control procedure execution unit 1 is suspended without releasing the data link, and the process returns to S1906 through S1909.

If the communication is shifted from a silence condition to a sound condition again, the process proceeds from S1907 to S1917. Since the operation of the communication control procedure execution unit 1 is in suspension in this case, the process proceeds to S1918.

At S1918, the communication control procedure execution unit 1 is re-started on the data link to transmit non-audio data in LAPDC.

<The operation of the communication process control unit 6 in the receiver personal station 132 in a sound condition>

At S2201 in the flowchart shown in FIG. 22, the communication process control unit 6 checks whether 5 msec has passed. If the time period has passed, the process proceeds to S2202, and otherwise repeats the checking operation.

At S2202, whether the receiver personal station 132 has received an SABM command is checked. The receiver personal station 132 has not received the SABM command, the process proceeds to S2206.

At S2206, the communication process control unit 6 starts the data distribution unit 3, and the process returns to S2201.

<The operation of the data distribution unit 3 of the receiver personal station 132 in a sound condition>

In the flowchart shown in FIG. 23, the data distribution unit 3 is started by the communication process control unit 6.

At S2301, the data distribution unit 3 checks whether the CI field carries "0000" for audio data or "0101" for non-audio data. If it carries "0000", the process proceeds to S2302, and otherwise proceeds to S2303. Since the communication is in a sound condition in this case, the process proceeds to S2302.

At S2302, the data distribution unit 3 fetches 160-bit data from the time slot and outputs the 160-bit data to the audio data process unit 10 in the receiver personal station 132. This is the end of the process.

<The operation of the communication process control unit 6 of the receiver personal station 132 when the communication is shifted from a sound condition to a silence condition>

In the flowchart of FIG. 22, since the transmitter personal station 131 has already transmitted the SABM command, the process proceeds from S2202 to S2203.

At S2203, the communication process control unit 6 makes the data write unit 2 write "0101" to the CI field to designate the Tch-D, and write the UA command to the I field.

At S2204, the communication process control unit 6 checks whether 5 msec has passed. If it has, the process proceeds to S2205, and otherwise repeats the checking operation.

At S2205, the communication process control unit 6 starts the data distribution unit 3.

At S2206, the communication process control unit 6 checks whether P bit is set at "1". If it is, the process proceeds to S2207, and otherwise returns to S2204. In this case, the process returns to S2204.

Thus, every time the steps 2204-2206 are executed, the data distribution unit 3 is started and non-audio data are transmitted to the electronic notebook 231.

It is assumed that after the repetition of the steps 2204-2206, the data distribution unit 3 has distributed non-audio data of the sixth time slot.

At S2206, the communication process control unit 6 detects that P bit is set at "1", and the process proceeds to S2207.

At S2207, an RR command is transmitted to the transmitter personal station 131 after setting F bit at "1", and the process returns to S2204.

<The operation of the data distribution unit 3 in the receiver personal station 132 when the communication is shifted from a sound condition to a silence condition>

After having been started by the communication process control unit 6 at S2205 shown in FIG. 22, the data distribution unit 3 starts the process shown in FIG. 23.

At S2301, it is determined that the CI field carries "0101" for non-audio data, and the process proceeds to S2303.

At S2303, the data distribution unit 3 fetches 136-bit data from the time slot and outputs the 136-bit data to the receiver personal station 132. This is the end of the process.

Thus, every time the steps S2301 and S2303 are executed, non-audio data are transmitted to the electronic notebook 232 of the receiver personal station 132.

<The operation of the circuit error timer 4 and the forced transmission timer 5>

The flowchart of FIG. 20 depicts the monitoring operations of the circuit error timer 4 and the forced transmission timer 5 by the communication process control unit 6. The monitoring operations correspond to S1909 shown in FIG. 19.

At S2001, the communication process control unit 6 checks whether the forced transmission timer 5 has timed out. If it has, the process proceeds to S2002, and otherwise proceeds to S2013. In this case, the process proceeds to S2013.

At S2013, the communication process control unit 6 checks whether the circuit error timer 4 has timed out. If it has, the process proceeds to S2011, and otherwise terminates the process and moves to S1906 in FIG. 19. In this case, the process proceeds to S1906.

<The timeout of the forced transmission timer 4 to shift the communication from a silence condition to a sound condition>

It is assumed that after a continuous non-audio data transmission, an audio data transmission has started in response to the resumption of the sound condition.

At S2001 of FIG. 20, since the communication process control unit 6 has judged the forced transmission timer 5 to have timed out, the process proceeds to S2002.

At S2002, the communication process control unit 6 determines whether the queues of the non-audio data holding unit 15 have any non-audio data. If there are any non-audio data, the process proceeds to S2003, and otherwise proceeds to S2007.

At S2003, the communication process control unit 6 fetches 136-bit non-audio data from the queues.

At S2004, the communication process control unit 6 makes the data write unit 2 write the 136-bit non-audio data to the information field in the I field.

At S2005, the data write unit 2 writes "0101" for non-audio data to the CI field.

At S2006, the communication process control unit 6 sets P bit at "1".

At S2009, the communication process control unit 6 writes data to the R, SS, PR, and UW fields.

At S2010, sequence numbers are written in the fields for N(R) and N(S).

At S2013, the communication process control unit 6 determines whether the circuit error timer 4 has timed out. If it has, the process terminates, and otherwise proceeds to S2011. In this case, the process terminates.

Through the execution of these steps S2003–2006 and S2009–2010, non-audio data accumulated in the queues are transmitted in units of 136 bits by setting P bit at "1" even in a sound condition.

Since the RR command has been transmitted by the receiver personal station 132 before the timeout of the forced transmission timer 5, the timeout is avoided. As a result, the data link is maintained while the communication is still in a sound condition.

Through the repetition of the steps 2003–2006 and S2009–2010 shown in FIG. 20, if all the non-audio data accumulated in the queues are transmitted, the process proceeds from S2002 to S2007.

At S2007, 136-bit dummy data are written to the information field in the I field.

At S2008, the data write unit 2 writes "0101" for non-audio data to the CI field.

At S2014, the communication process control unit 6 sets P bit at "1", and the process proceeds to S2009.

Thus, through the execution of the steps S2007–S2008, S2013, and S2009–2010, 136-bit dummy data with P bit are transmitted even if the queues are vacant.

Since the transmitter personal station 132 has received the RR command before the timeout of the circuit error timer 4, the timeout is avoided. As a result, the data link is maintained while the communication is still in a sound condition and there are no data left in the queues.

<The timeout of the circuit error timer 4 in the presence of a circuit error>

At S2013 of FIG. 20, the communication process control unit 6 determines that the circuit error timer 4 has timed out, and the process proceeds to S2011.

At S2011, the communication process control unit 6 makes the data write unit 2 write data in the DISC command in the control field.

At S2012, the communication process control unit 6 checks whether the transmitter personal station 131 has received the UA command. If it has, the process proceeds to S1901 shown in FIG. 19, and otherwise repeats the checking operation.

As described hereinbefore, the personal stations of the present embodiment monitor a silence condition and a sound condition at a time interval of 5 msec, and transmit audio data and non-audio data in a sound condition and a silence condition, respectively. This allows small amount of non-audio data such as drag data to be transmitted in a silence condition as short as 100 msec within a pause of users conversation.

<Embodiment 2>

As compared with the first embodiment where personal stations forcibly transmit data when a sound condition lasts for more than a certain time period, the personal stations in the present embodiment suspend the operation of the circuit error timer 4 in a sound condition.

The following description of each unit of the personal stations is focused on the features of the present embodiment which are different from the first embodiment.

It is assumed that when the transmitter personal station 131 and the receiver personal station 132 are transmitting non-audio data to each other in a silence condition, the users have resumed their conversation.

In response to the detection of a sound condition by the silence detection unit 17, the communication process control unit 6 suspends the counting operation of the circuit error timer 4, maintaining the count value.

If a lull happens in the conversation, and the silence detection unit 17 has detected a silence condition, the communication process control unit 6 resumes the non-audio data transmission. The communication process control unit 6 makes the circuit error timer 4 resume the counting operation from where it is suspended.

Figure 24:
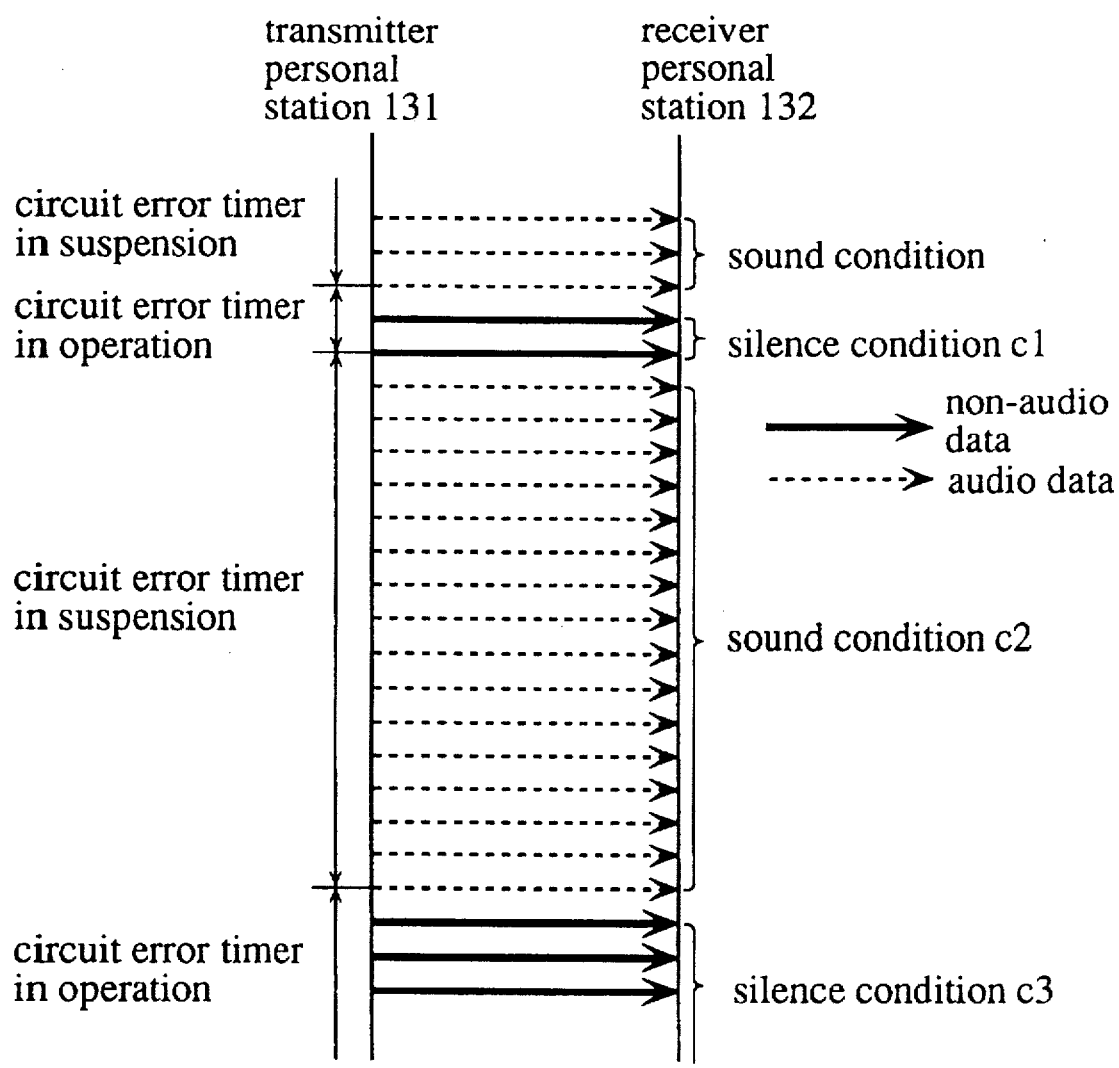
FIG. 24 shows the sequence of the counting operation of the forced transmission timer 5 in the second embodiment.

FIG. 24 shows the operation of the forcible data transmission. The arrows with full lines and those with broken lines indicate one unit of non-audio data transmission and audio data transmission, respectively.

It is assumed that the transmitter personal station 131 has already detected a silence condition, established a data link, and is transmitting non-audio data. After a silence condition c1, a sound condition c2 is exceeding the time-out of the circuit error timer 4. The silence detection unit 17 detects the sound condition c2, and the communication control unit 6 suspends the operation of the circuit error timer 4, while maintaining the count value. If a silence condition c3 occurs after the sound condition c2 lasts for a certain time period, the communication process control unit 6 resumes non-audio data transmission. The circuit error timer 4 re-starts the counting operation at where it was suspended.

As explained hereinbefore, when a sound condition lasts for more than a certain time period, the circuit error timer 4 does not release a data link. As a result, the efficiency of non-audio data transmission in a silence condition is increased.

<Embodiment 3>

In the present embodiment, a series of time slots to be transmitted in a unit time are divided into a former group and a latter group, and the time slots in the former group are assigned to audio data transmission and the time slots in the latter group are assigned to non-audio data transmission.

Furthermore, the ratio of the number of time slots in the former group to the number of time slots in the latter group is changed depending on the amount of audio data to be transmitted.

Figure 25:
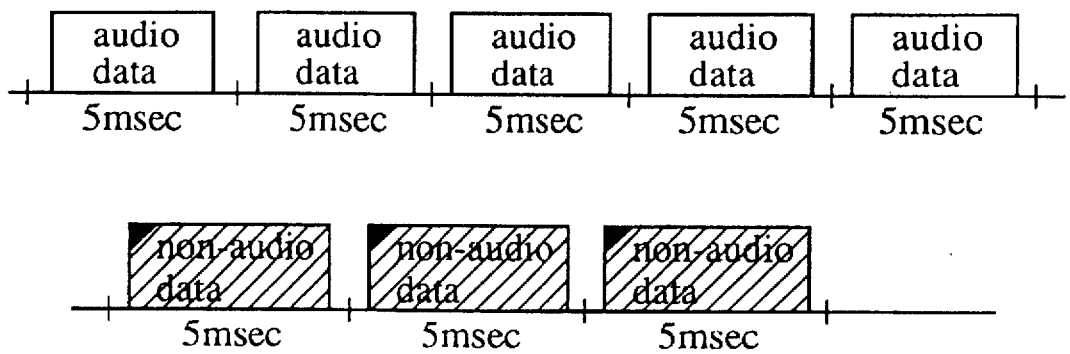
FIG. 25 shows three ratios of time slot assignment to audio data and non-audio data in the third embodiment.
Figure 25:
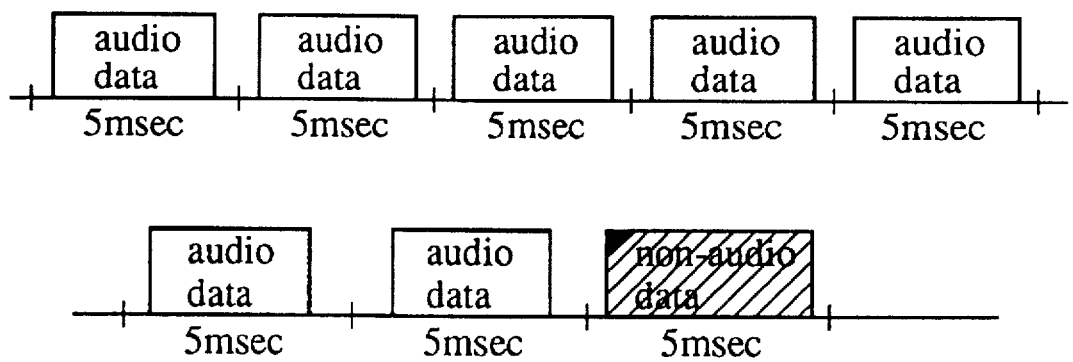
Figure 25:
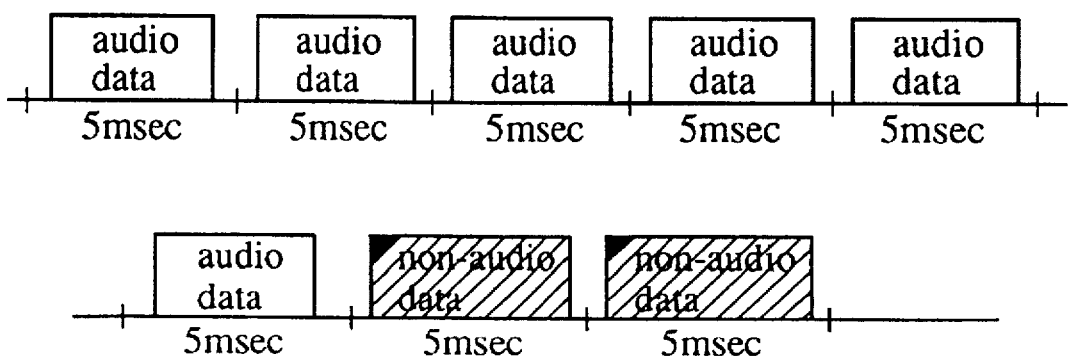

FIG. 25 shows three ratios of time slot assignment to audio data and non-audio data.

In the case of audio data: non-audio data=5:3, out of the total transmission time period of 8×5 msec=40 msec, a first 25 msec is assigned to audio data transmission, and the remaining 15 msec is assigned to non-audio data transmission.

In the same manner, in the case of audio data: non-audio data=7:1, a first 35 msec is assigned to audio data transmission, and the remaining 5 msec is assigned to non-audio data transmission.

In the case of audio data: non-audio data=6:2, a first 30 msec is assigned to audio data transmission, and the remaining 10 msec is assigned to non-audio data transmission.

Figure 26:
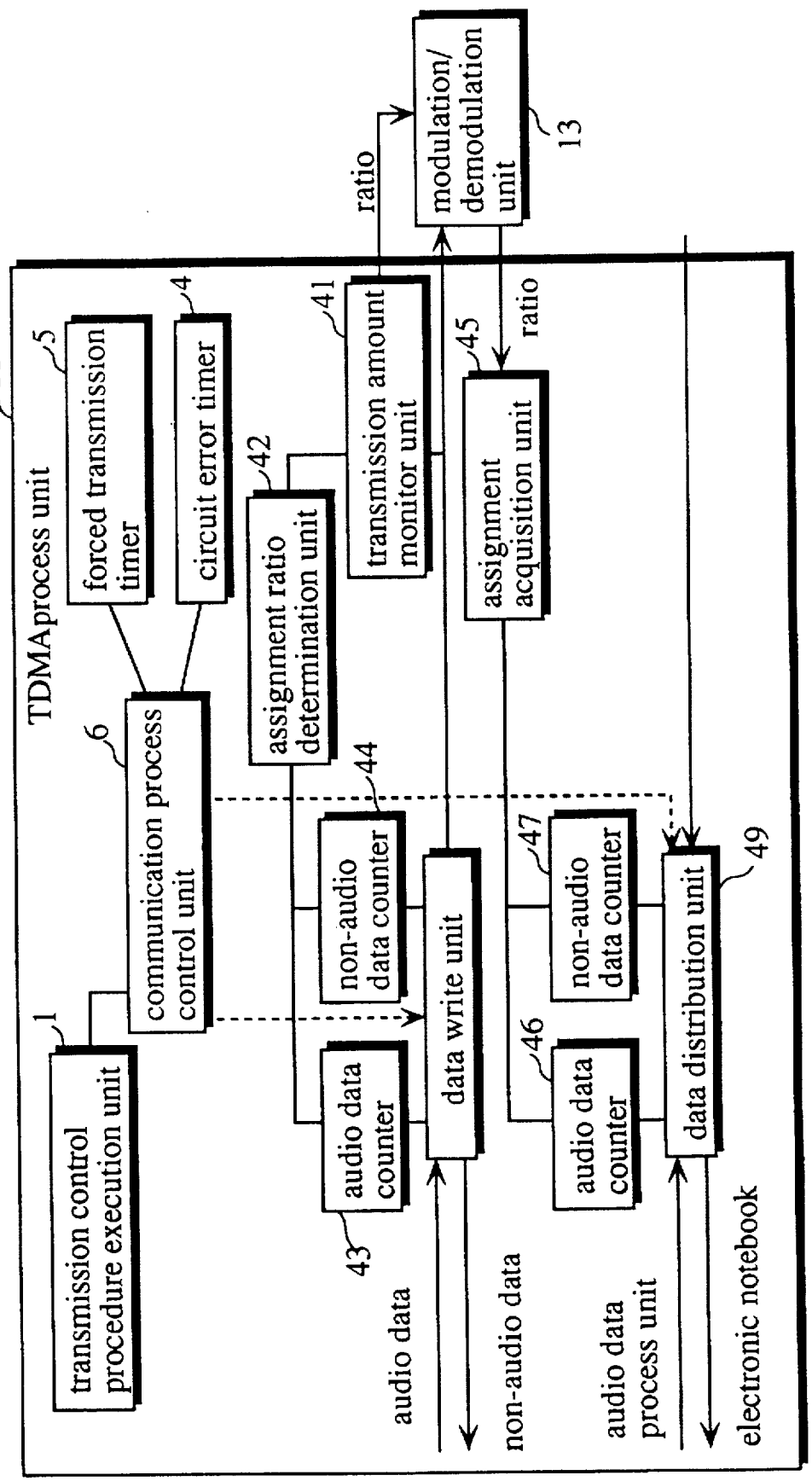
FIG. 26 shows the internal structure of the TDMA process unit 11 in the third embodiment.

FIG. 26 shows the internal structure of the silence detection unit 11 of the personal stations of the present embodiment.

The personal stations of the present embodiment are not provided with the silence detection unit 17, and provided with the data write unit 48 and the data distribution unit 49 instead of the data write unit 2 and the data distribution unit 3 of the first embodiment, and further provided with additional units: a transmission amount monitor unit 41, an assignment ratio determination unit 42, audio data counters 43 and 46, non-audio data counters 44 and 47, and an assignment ratio acquisition unit 45.

In FIG. 26, like components are labeled with like reference numerals with respect to the first embodiment, and the following description is focused on the features of the present embodiment, which are not in the first embodiment.

While the sound/silence flag 12 is operated by the silence detection unit 17 in the first embodiment, the audio data counter 43 and the non-audio counter 44 operate the sound/silence flag 12 in the present embodiment.

The transmission amount monitor unit 41 monitors the number of free time slots among the time slots to be transmitted by the modulation/demodulation unit 13 in a unit time. A free time slot refers to either a time slot which carries audio data which indicates a mute condition in its information transfer field or a time slot which carries no non-audio data in the information field.

The transmission amount monitor unit 41 calculates the number of free time slots immediately before the modulation/demodulation unit 13 starts to transmit a time slot, and outputs the number calculated every 8-time transmission of time slots.

The assignment ratio determination unit 42 determines an appropriate ratio of the number of time slots for the audio data to the number of time slots for the non-audio data, depending on the number of free time slots obtained by the transmission amount monitor unit 41. The assignment ratio determination unit 42 stores the table shown in FIG. 27 which shows the relationship between the numbers of free time slots and the assignment ratios.

When a time slot with final non-audio data is transmitted, the assignment ratio determination unit 42 writes the ratio determined to the information field of the time slot in addition to the final non-audio data, and informs the receiver personal station 132 of the radio determined.

Figure 28:
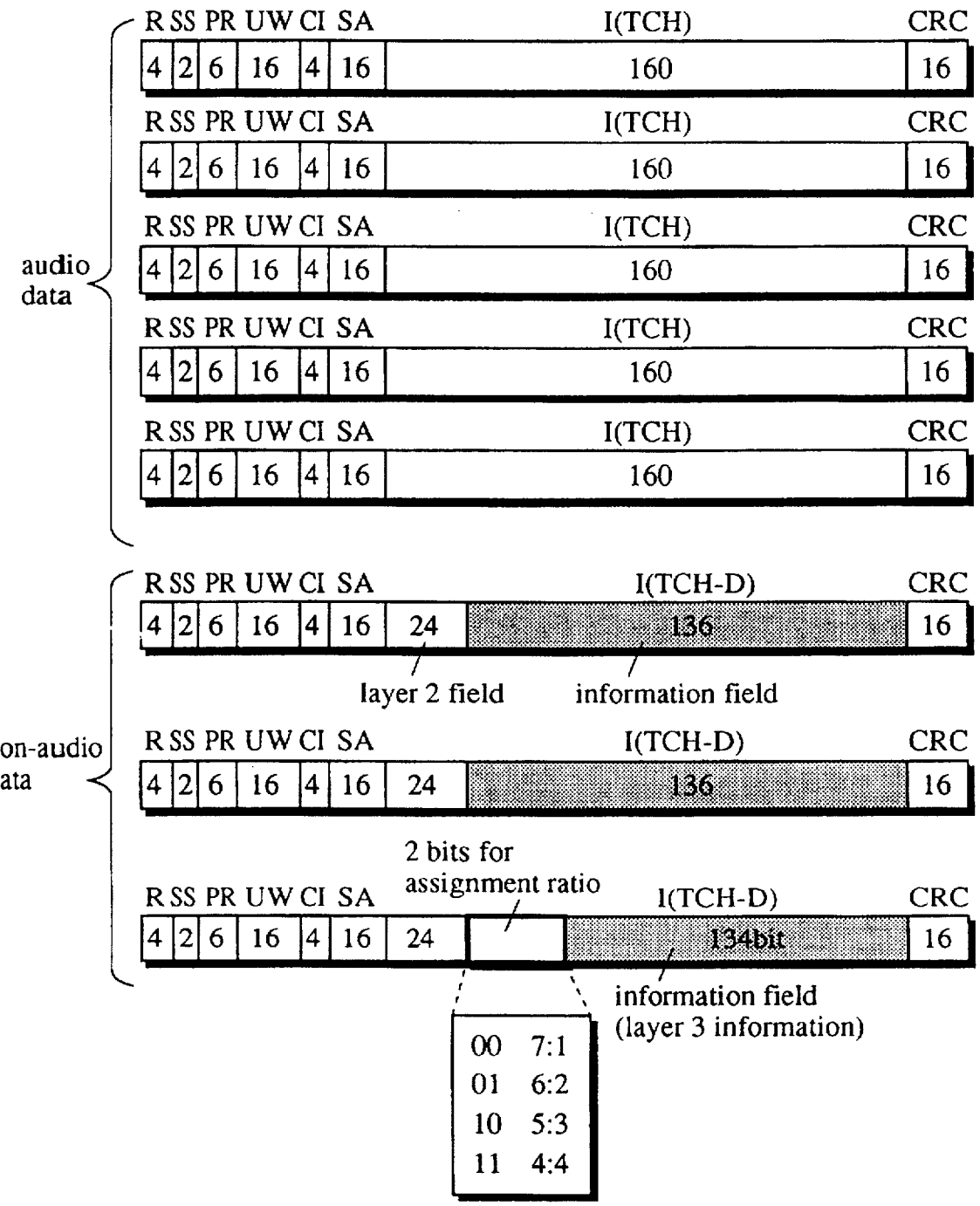
FIG. 28 shows the time slot format in the case of audio data:non-audio data=5:3.

The following is an explanation on which area in a time slot the assignment ratio is written to, with reference to FIG. 28 which shows the time slot format in the case of audio data:non-audio data=5:3. The top five time slot formats are for the traffic channel to transmit audio data, and the bottom three time slot formats are for the Tch-D to transmit non-audio data. In the time slot format at the bottom, the initial 2 bits in the information field are assigned for the assignment ratio. When the initial 2 bits are "00", "01", and "11", the assignment ratio is 7:1, 6:2, and 4:4, respectively. The assignment ratio may be determined by other parameters. For example, the amount of traffic may be obtained from the cell stations or the PHS connection devices 1007 and 1008 shown in FIG. 2, and the assignment ratio may be varied depending on the amount of traffic.

The audio data counter 43 counts up every time audio data are written in a time slot, and the upper limit of its count value is set on the number of the final time slot assigned to audio data. The upper limit is hereinafter referred to as the first upper limit. The audio data counter 43 sets the sound/silence flag 12 at off when it starts to count up.

The non-audio data counter 44 counts up every time non-audio data are written in a time slot, and the upper limit of its count value is set on the number corresponding to (the total number of time slots to be transmitted in a unit time–the number of the final time slot assigned to the audio data). The upper limit is hereinafter referred to as the second upper limit. The non-audio data counter 44 sets the sound/silence flag 12 at on when it starts to count up.

The assignment ratio acquisition unit 45 acquires the assignment ratio which has been written in the information field by the assignment ratio determination unit 42 of the other personal station, and divides the data in the time slots received in a unit time into audio data and non-audio data in accordance with the assignment ratio.

The audio data counter 46 counts up every time audio data are fetched from a time slot, and the first upper limit is set on the number corresponding to the assignment ratio that the assignment ratio acquisition unit 45 has obtained.

The non-audio data counter 47 counts up every time non-audio data are fetched from a time slot, and the second upper limit is set on the number corresponding to (the total number of time slots to be transmitted in a unit time–the number that the assignment ratio acquisition unit 45 has obtained).

Figure 29:
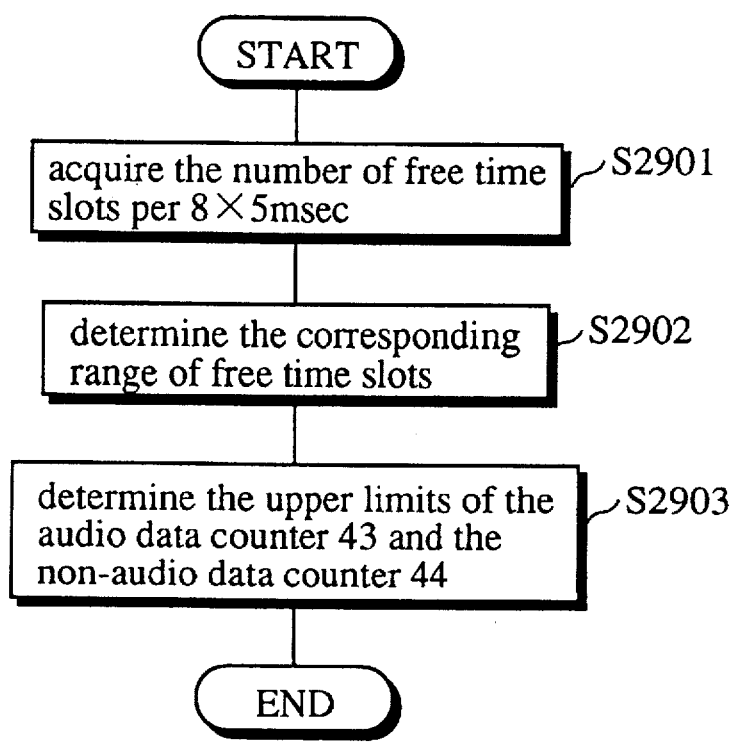
FIG. 29 shows a flowchart which depicts the process of the assignment ratio determination unit 42.

The following is an explanation on how the assignment ratio determination unit 42 determines the assignment ratio, with reference to the flowchart shown in FIG. 29.

At S2901, the assignment ratio determination unit 42 is started every 40 msec (8×5 msec) by the communication process control unit 6, and obtains free time slots in the time period from the transmission amount monitor unit 41.

At S2902, the assignment ratio determination unit 42 determines the appropriate assignment ratio from the number of the free time slots by referring to the table of FIG. 27. In this case, there are four free time slots, and the ratio is determined to be 5:3.

At S2903, the first upper limit and the second upper limit are determined. In this case, 5 is set as the first upper limit, and 3 is set as the second upper limit because the ratio is 5:3. This is the end of the process of the determination of the assignment ratio.

The operation of the data write unit 48 is described with reference to the flowchart of FIG. 30.

Figure 30:
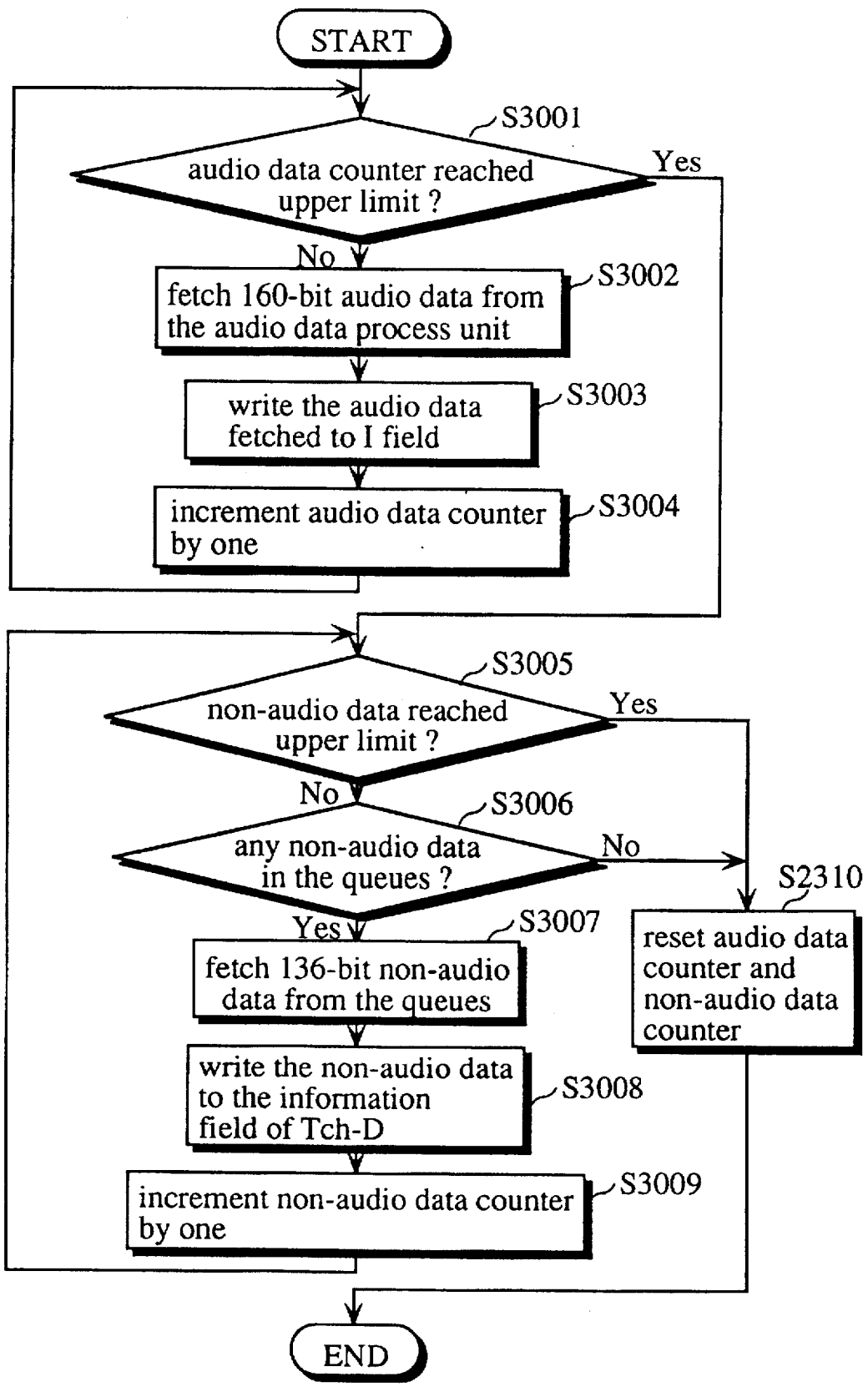
FIG. 30 shows a flowchart which depicts the process of the data write unit 48.

After the first upper limit and the second upper limit have been set at S2903 shown in FIG. 29, if the communication process control unit 6 starts the data write unit 48, the process proceeds from S2903 to the S3001 shown in FIG. 30.

At S3001, the data write unit 48 determines whether the value of the audio data counter 44 is equal to the first upper limit. If it is, the process proceeds to S3005, and otherwise proceeds to S3002. Since the counting operation has just started in this case, the process proceeds to S3002.

At S3002, the data write unit 48 fetches 160-bit audio data from the audio data process unit 10 in units of time slots.

At S3003, the data write unit 48 writes the 160-bit audio data in the I field.

At S3004, the value of the audio data counter 43 is incremented by one, and the process returns to S3001.

These steps S3002–S3004 are executed every time the data write unit 48 is started by the communication process control unit 6, and repeated until the value of the count reaches the first upper limit of 5.

If the value of the audio data counter 46 is judged to be equal to the first upper limit at S3001, the process proceeds to S3005.

At S3005, the data write unit 48 determines whether the value of the non-audio data counter 47 is equal to the second upper limit. If it is, the process proceeds to S3010, and otherwise proceeds to S3006. Since the counting operation has just started in this case, the process proceeds to S3006.

At S3006, the data write unit 48 determines whether any non-audio data are stored in the queues in the non-data holding unit 15. If they are, the process proceeds to S3007, and otherwise proceeds to S3010. In this case, the process proceeds to S3007.

At S3007, 136-bit non-audio data are fetched from the queues in units of time slots.

At S3008, the non-audio data fetched are written in the information field of Tch-D.

At S3009, the value of the non-audio counter 47 is incremented by one, and the process returns to S3005.

Every time the communication process control unit 6 starts the data write unit 48, a series of these steps S3006–S3009 is executed and non-audio data are written in the information field of Tch-D and transmitted.

When the data write unit 48 has judged the count value of the non-audio counter 44 to be equal to the second upper limit of 3 at S3005, the process proceeds to S3010.

At S3010, the audio data counter 43 and the non-audio data counter 47 are reset. This is the end of the process.

Since the third time slot includes the field assigned for the assignment ratio, the assignment ratio determination unit 42 writes the assignment ratio in this field.

When the steps S3005–S3009 have been executed three times, three time slots with non-audio data written therein by the data write unit 48 are transmitted.

The assignment ratio determination unit 42 determines the assignment ratio in the next unit time from the number of free time slots which has been obtained from the transmission amount monitor unit 41.

Through the repetition of these steps S3001–S3010, audio data and non-audio data are transmitted by dynamically changing the assignment ratio every unit time.

Figure 31:
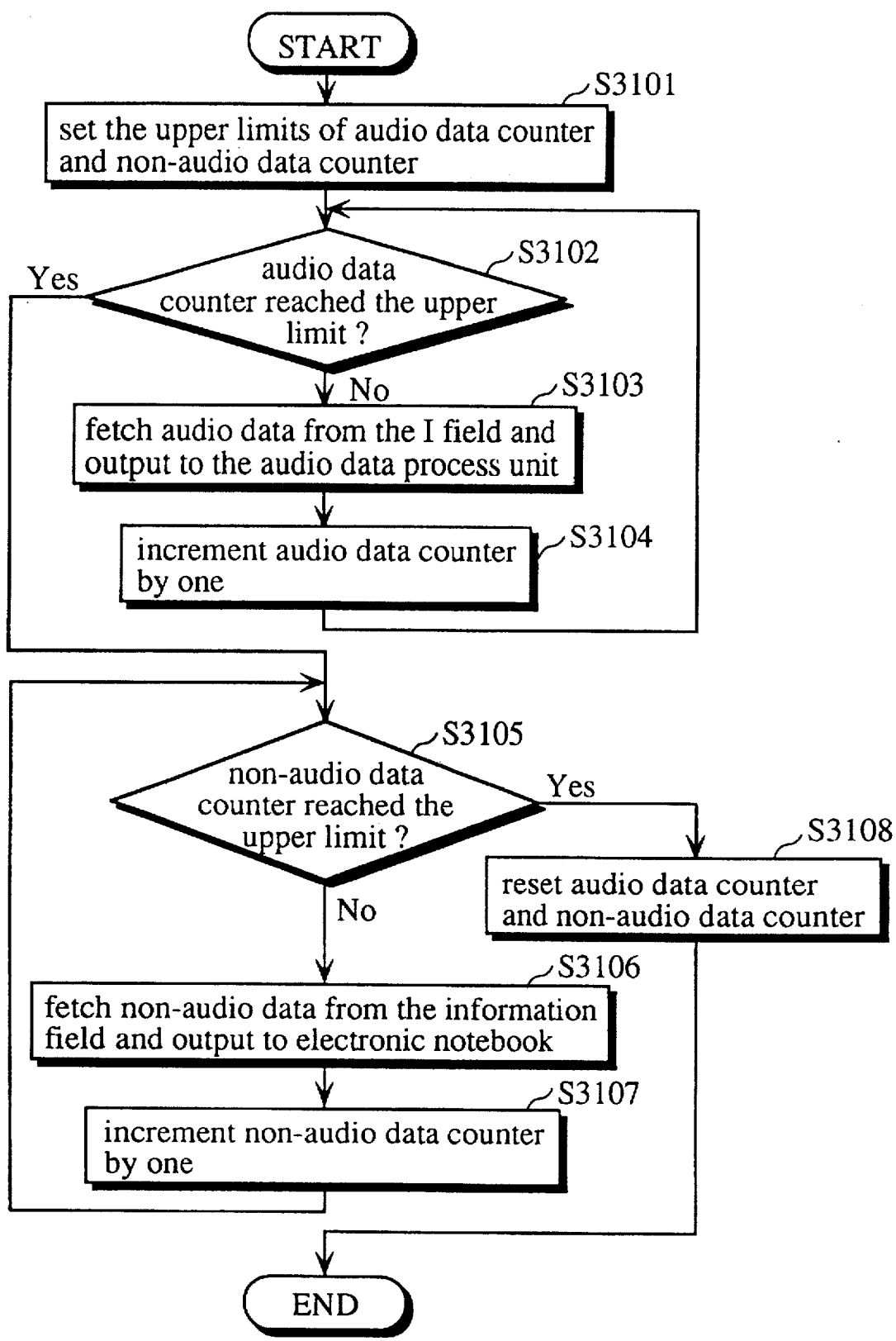
FIG. 31 shows a flowchart which depicts the process of the data distribution unit 49.

The following is a description on the operation of the receiver personal station 132 with reference to the flowchart shown in FIG. 31.

At S3101, when the receiver personal station 132 is receiving audio data and non-audio data, the assignment ratio acquisition unit 45 acquires an assignment ratio from the transmitter personal station 131, and sets the first upper limit and the second upper limit. In this case, the assignment ratio acquisition unit 4 has obtained the assignment ratio of 5:3.

At S3102, the data distribution unit 49 determines whether the count value of the audio data counter 46 is equal to the first upper limit of 5. If it is, the process proceeds to S3105, and otherwise proceeds to S3103. Since the counting operation has just started in this case, the process proceeds to S3103.

At S3103, audio data in the I field are fetched and outputted to the audio process unit 10.

At S3104, the counter value of the audio data counter 46 is incremented by one, and the process returns to S3102.

Thus, every time the steps S3101–S3104 are executed, the audio data counter 46 counts up.

When the count value of the audio data counter 46 is judged to be equal to the first upper limit of 5 at S3105 as a result of the repetition of the execution of the steps S3101–S3104, the process proceeds to S3105.

At S3105, whether the count value of the non-audio counter 47 is equal to the second upper limit of 3 is determined. If it is, the process proceeds to S3108 and otherwise proceeds to S3106. Since the counting operation has just started in this case, the process proceeds to S3106.

At S3106, non-audio data in the information field of the Tch-D are fetched and outputted to the electronic notebook 232.

At S3107, the count value of the non-audio data counter 47 is incremented by one, and the process returns to S3105.

Thus, every time the steps S3105–S3107 are executed, the non-audio counter 47 counts up.

When the count value of the non-audio data counter 47 is judged to be equal to the second upper limit of 3 at S3105, the process proceeds to S3108.

At S3108, the data distribution unit 49 resets the audio data counter 46 and the non-audio data counter 47.

Thus, the steps S3105–S3107 are executed, the assignment ratio acquisition unit 45 acquires an assignment ratio for the next unit time from the information field of the Tch-D, and sets the assignment ratio to the audio data counter 46 and the non-audio data counter 47.

As explained hereinbefore, in the present embodiment, the amount of non-audio data to be transmitted with audio data are changed in every unit time depending on the number of free time slots. As a result, non-audio data are transmitted in every unit time to the other personal station without fail although audio data are given priority in transmission.

Consequently, the real-time nature of audio communications are secured and both audio data and non-audio data are transmitted efficiently.

Since the monitoring of free time slots is executed every unit time of 40 msec, the system construction of the present embodiment is simpler than that of the first embodiment in which the monitoring is executed every 5 msec.

<Embodiment 4>

In the present embodiment, the receiver personal station 132 is selectively put in an audio data reception mode or a non-audio data reception mode. Audio data which have been received in the audio data reception mode are converted into audio signals and outputted through the speaker, while non-audio data which have been received in the non-audio data reception mode are outputted to the electronic notebook 232.

Figure 32:
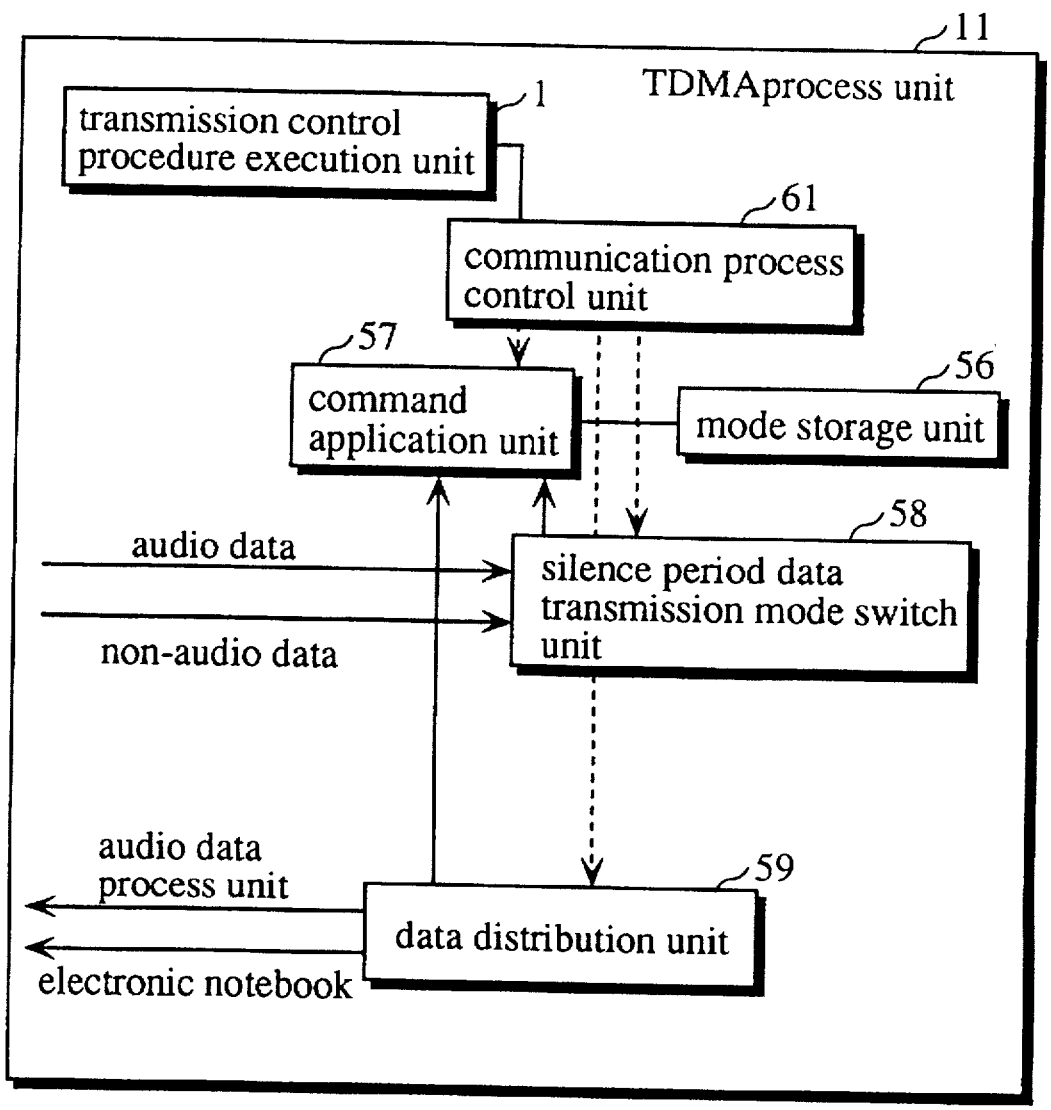
FIG. 32 shows the internal structure of the TDMA process unit 11 of the fourth embodiment.
Figure 33:
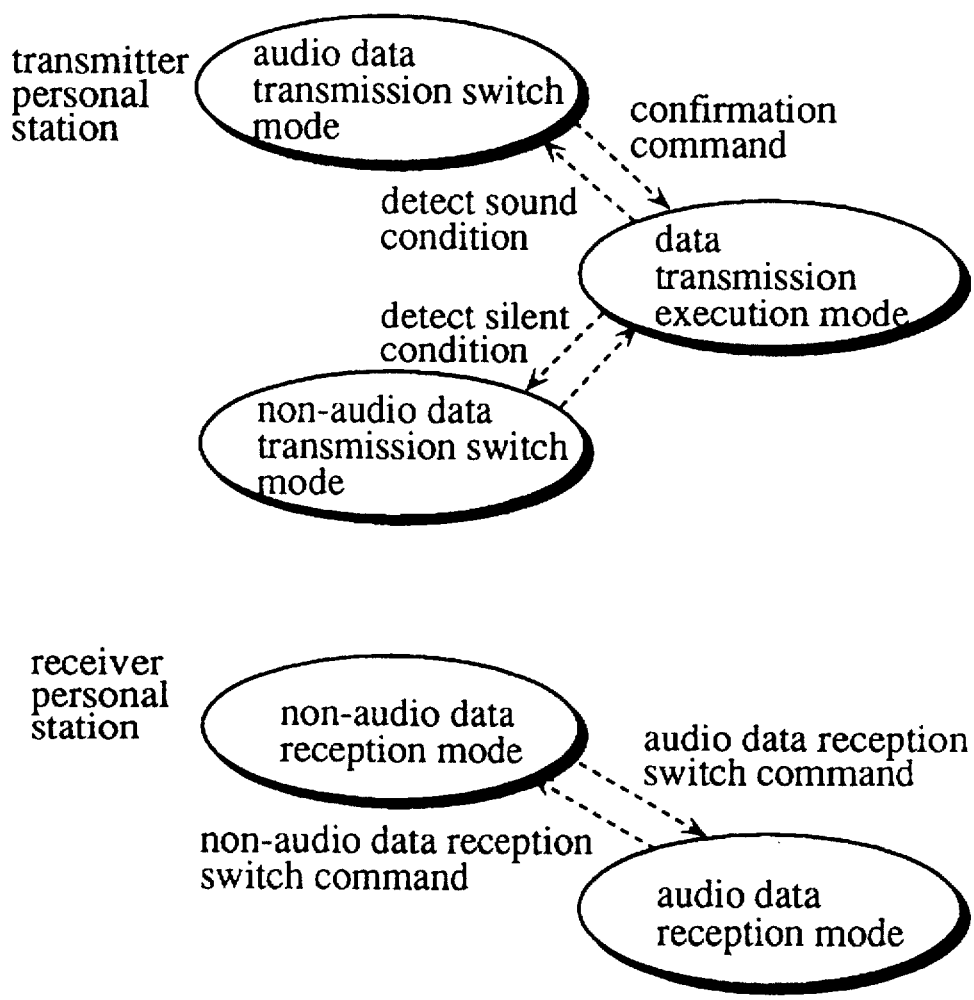
FIG. 33 shows the state transition of the transmitter personal station 131 and the receiver personal station 132 in the fourth embodiment.

Consequently, the TDMA process unit 11 of the present embodiment shown in FIG. 32 is provided with a mode storage unit 56, a command application unit 57, a silence period data transmission mode switch unit 58, and a data distribution unit 59 in place of the data write unit 2 and the data distribution unit 3 of the first embodiment. In FIG. 32, like components are labeled with like reference numerals with respect to the first embodiment, and the following description is focused on the features of the present embodiment, which are not in the first embodiment.

The mode storage unit 56 stores which mode the personal station is in.

In addition to the audio data reception mode and the non-audio data reception mode, the personal stations can be in an audio data transmission switch mode, a non-audio data transmission switch mode, and a data transmission execution mode.

In the non-audio data transmission switch mode, the personal station shifts from an audio data transmission to a non-audio data transmission. In the audio data transmission switch mode, the personal station shifts from a non-audio data transmission to an audio data transmission. In the data transmission execution mode, either an audio data transmission or a non-audio data transmission is executed.

The personal stations in the present embodiment are switched from one mode to another in audio data and non-audio data transmission.

Figure 34:
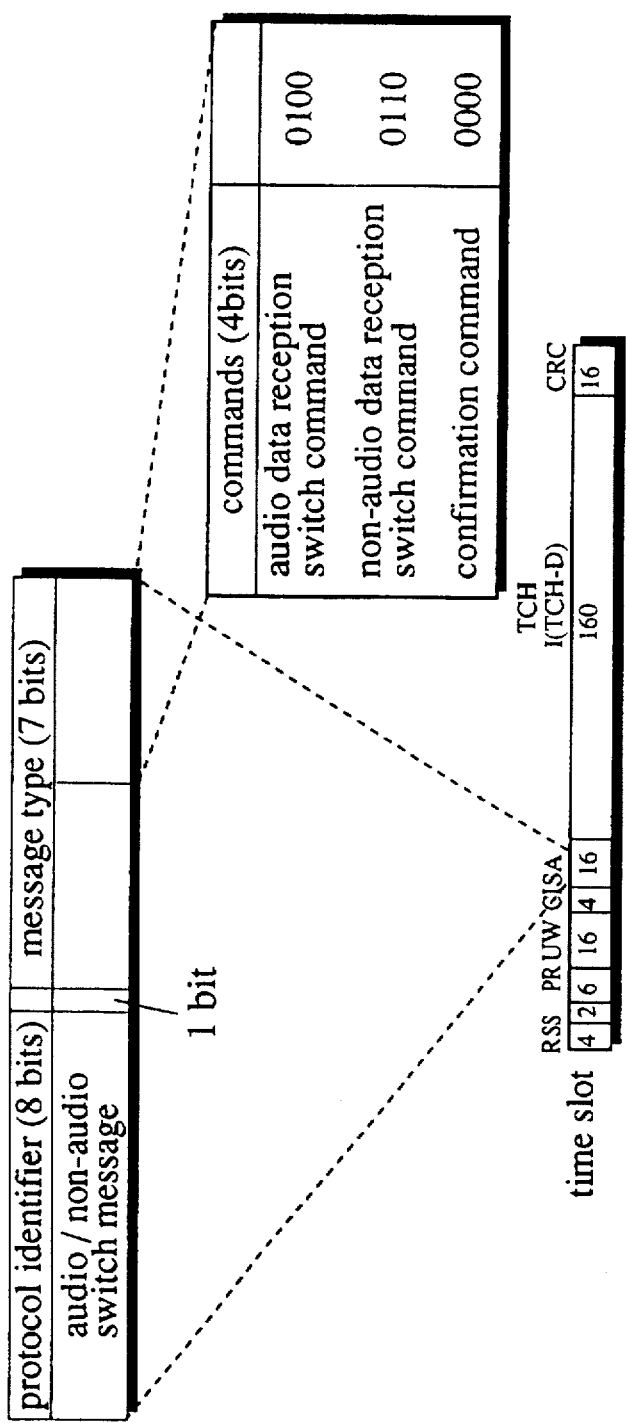
FIG. 34 shows a FACCH format in the fourth embodiment.

The following is an explanation of the commands to be used for mode transition with reference to the time slot format shown in FIG. 34.

The personal stations of the present embodiment transmit an audio data reception switch command 0100, a non-audio data reception switch command 0110, and a confirmation command 0000 by using part of the 16-bit SACCH field. The high order 8 bits of the 16-bit SACCH are assigned for a protocol identifier, and after a gap of 1 bit, the low order 7 bits are assigned for a message type. In the present embodiment, the protocol identifier indicates an audio/non-audio data switch message. "110" are set in the high order 3 bits of the message type, and either an audio data switch command or a non-audio data switch command is set in the low order 4 bits of the message type.

The audio data reception switch command puts a receiver personal station in the audio data reception mode.

The non-audio data reception switch command puts a receiver personal station in the non-audio data reception mode.

The confirmation command indicates a receipt of either the audio data reception switch command or the non-audio data reception switch command.

In non-audio data transmission of the present embodiment, no data link is established, and the UI command is provided on the control field as shown in FIG. 11 to transmit non-audio data. When a transmitter personal station transmits the UI command, the receiver personal station must transmit the UA command to the transmitter personal station to inform the safe receipt of the UI command.

The command application unit 57 switches among the audio data transmission switch mode, the non-audio transmission switch mode, and the data transmission execution mode, and generates the audio data reception switch command, the non-audio data reception switch command, and the confirmation command.

The silence period data transmission mode switch unit 58 fetches non-audio data from the queues in response to the detection of a silence condition by the silence detection unit 17, outputs them to the command application unit 57 to inform that a non-audio data transmission has been started, and sets the sound/silence flag 12 at on.

On the other hand, in response to the detection of a sound condition, the silence period data transmission mode switch unit 58 informs the command application unit 57 that an audio data transmission has been started, and sets the sound/silence flag 12 at off.

The data distribution unit 59 switches between the audio data reception mode and the non-audio data reception mode, and divides data into audio data and non-audio data.

Figure 35:
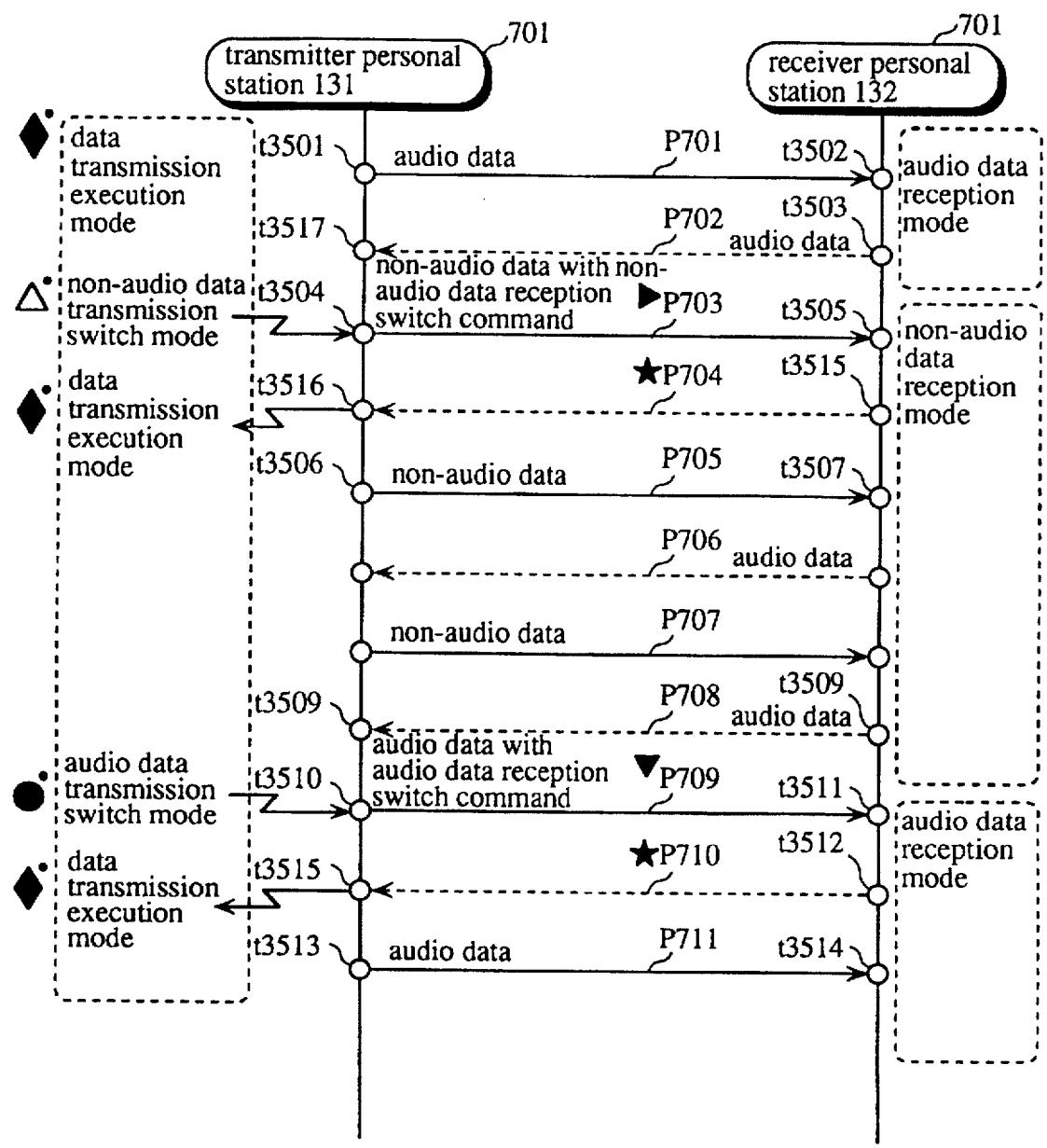
FIG. 35 shows the sequence of the transmission of audio data and non-audio data between the transmitter personal station 131 and the receiver personal station 132 in the fourth embodiment.

FIG. 35 shows a sequence of message transmission between the transmitter personal station 131 and the receiver personal station 132, and a mode transition.

At t3501, the transmitter personal station 131 transmits an audio data message P701 to the receiver personal station 132.

At t3502, the receiver personal station 132 receives the audio data message P701.

At t3503, the receiver personal station 132 transmits an audio data message P702 to the transmitter personal station 131.

At t3517, the transmitter personal station 131 receives the audio data message P702, and the silence detection unit 17 of the transmitter personal station 131 detects a silence condition.

Figure 37:
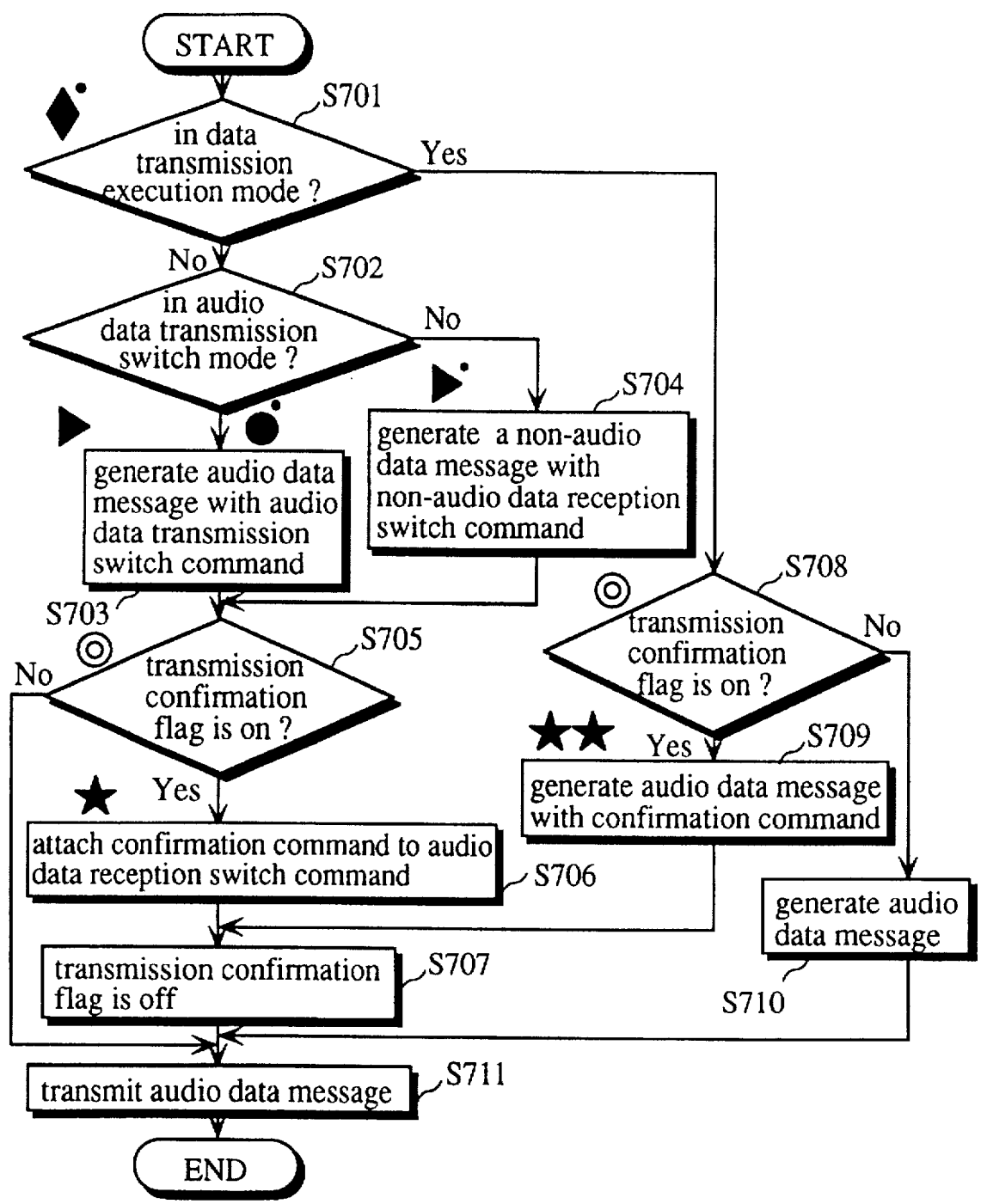
FIG. 37 shows a flowchart which depicts a process of the command application unit 57 in the fourth embodiment.
Figure 38:
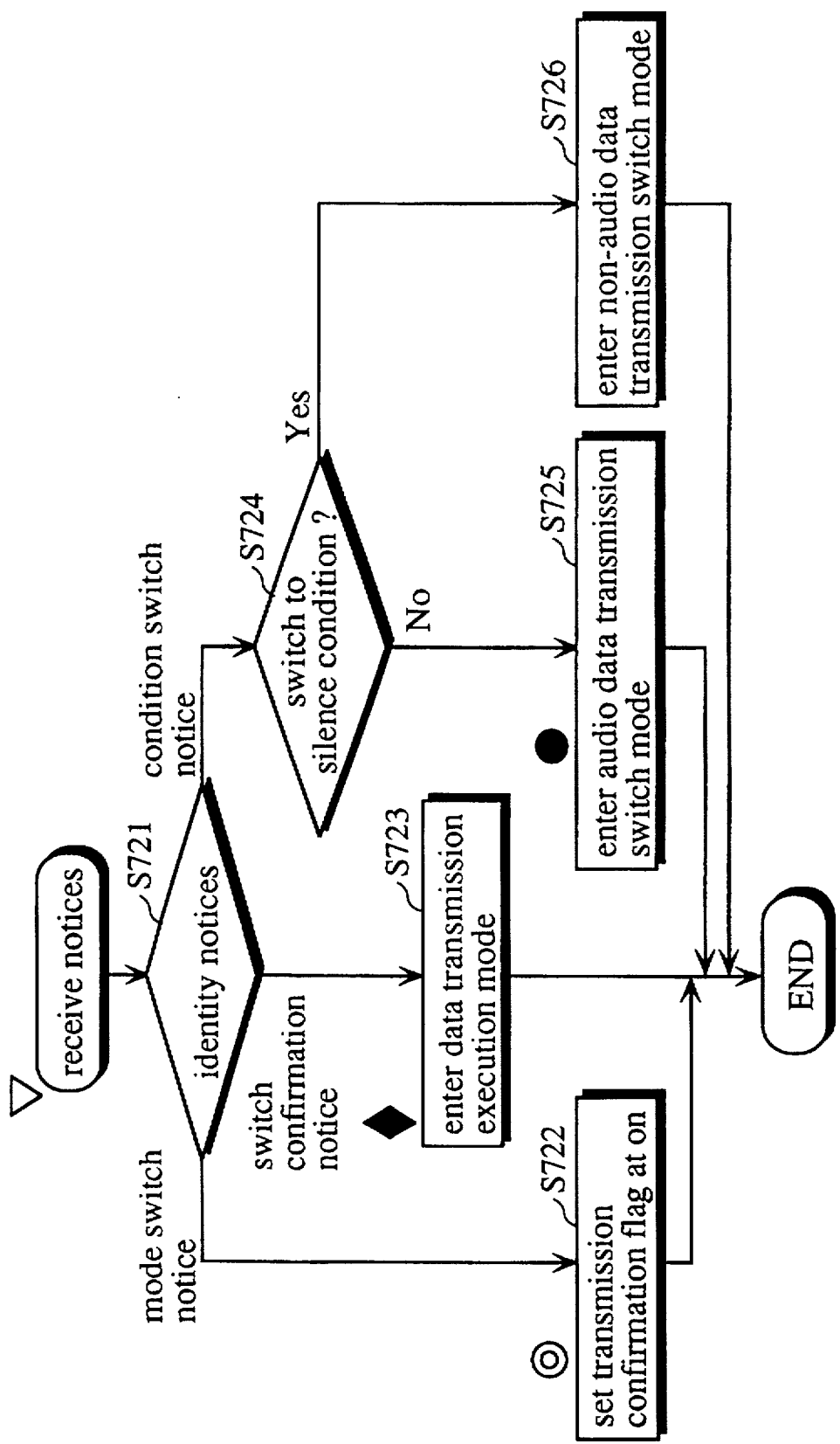
FIG. 38 shows a flowchart which depicts a process of the command application unit 57 in the fourth embodiment.
Figure 39:
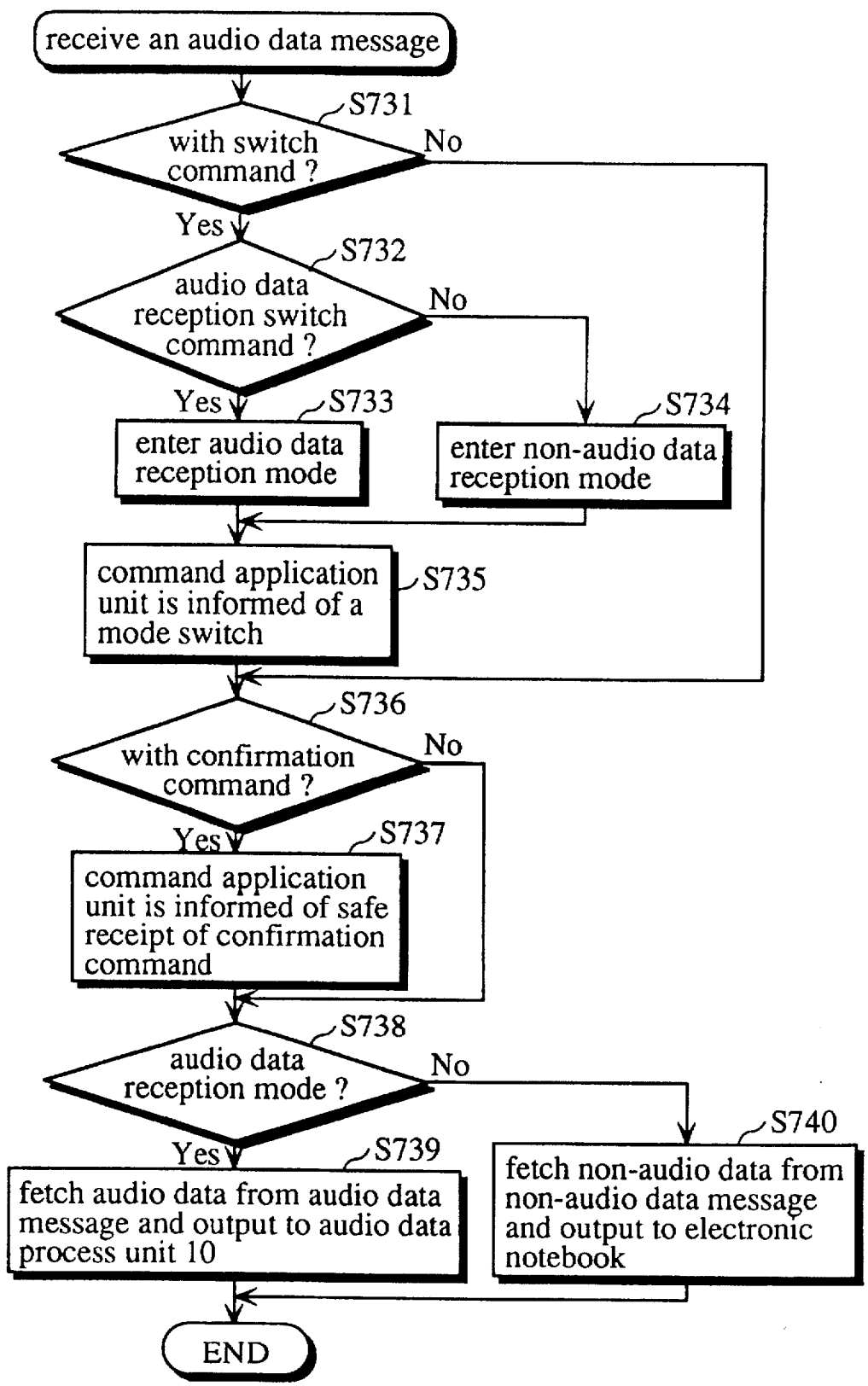
FIG. 39 shows the process of the data distribution unit 59 in the fourth embodiment.

At t3504, the silence period data transmission mode switch unit 58 and the command application unit 57 of the transmitter personal station 131 are informed of the detection of the silence condition and set the transmitter personal station 131 in the non-audio data transmission switch mode through the processes shown in the flowcharts of FIGS. 37–39. The transmitter personal station 131 transmits a non-audio data message P703 with the audio data reception switch command to the receiver personal station 132. As a result, the transmitter personal station 131 is put in a wait state for an audio data message P704 with the confirmation command.

At t3505, the receiver personal station 132 receives the non-audio data message P703 and enters the non-audio data reception mode.

At t3515, the receiver personal station 132 transmits the audio data message P704 with the confirmation command.

At t3516, the transmitter personal station 131 receives the audio data message P704 with the confirmation command and enters the data transmission execution mode.

At t3506, the transmitter personal station 131 transmits a non-audio data message P705 to the receiver personal station 132.

At t3510, the transmitter personal station 131 detects the transition from a silence condition to a sound condition, enters the audio data transmission switch mode, and transmits an audio data message P709 with the audio data reception switch command.

At t3511, the receiver personal station 132 receives the audio data message P709 with the audio data reception switch command, detects the audio data reception switch command therefrom, and enters the audio data reception mode.

At t3512, the receiver personal station 132 transmits an audio data message P710 with the confirmation command to the transmitter personal station 131.

At t3515, the transmitter personal station 131 receives the audio data message P710 with the confirmation command, detects the confirmation command therefrom, and enters the data transmission execution mode.

At t3513, the transmitter personal station 131 transmits an audio data message P711 to the receiver personal station 132.

In the flowcharts in FIGS. 36–39, the steps with ♦, ∆, and ● are executed in the data transmission execution mode, the non-audio data transmission switch mode, an the audio data transmission switch mode, respectively.

The steps with ★ are executed when the audio data message P704 and P710 with the confirmation command are transmitted. The steps with ▼ are executed when the audio data message P709 with the audio data reception switch command is transmitted. The steps with ▲ are executed when the non-audio data message P703 with the non-audio data reception switch command is transmitted.

The steps with ○ are executed when the audio data messages P702, P705, and P706 are transmitted. The steps with ⊙ are executed to operate a transmission confirmation flag. The steps with # are executed when the audio data messages P702, P705, and P706 are transmitted. The steps with * are executed when a mode switch confirmation is informed.

<The transmission of an audio data message from the transmitter personal station 131 to the receiver personal station 132>

The operation of the command application unit 57 of the transmitter personal station 131 is explained with reference to the flowchart shown in FIG. 37.

It is assumed that the user of the transmitter personal station 131 has started to speak and the silence detection unit 17 has detected a sound condition.

At S701, whether the transmitter personal station 131 is in the data transmission execution mode is determined. If it is, the process proceeds to S708 and otherwise proceeds to S702. In this case the process proceeds to S708.

At S708, whether the transmission confirmation flag is on is determined. If it is, the process proceeds to S709, and otherwise proceeds to S710. In this case, the process proceeds to S710.

At S710, an audio data message is generated.

At S711, the audio data message is transmitted to the receiver personal station 132.

Thus, every time the steps S701, S708, S710, and S711 are executed, audio data are transmitted to the receiver personal station 132 and the process returns to S701.

<The operation of the silence period data transmission mode switch unit 58 of the transmitter personal station 131 in the occurrence of a silence condition>

The operation of the silence period data transmission mode switch unit 58 is explained with reference to the flowchart shown in FIG. 36.

At S742, whether the communication is in the silence condition is determined. If it is, the process proceeds to S743, and otherwise terminates the process. In this case, the process proceeds to S743.

At S743, whether any non-audio data are stored in the queues in the non-audio data holding unit 15 is detected. If they are, the process proceeds to S744, and otherwise terminates the process. In this case, the process proceeds to S744.

At S744, the command application unit 57 is requested to switch to a non-audio data transmission.

At S745, non-audio data are fetched from the queues in the non-audio data holding unit 15.

At S746, the non-audio data fetched are outputted to the command application unit 57.

At S747, whether the communication is in a silence condition or in a sound condition is determined again. If it is, the process proceeds to S748, and otherwise proceeds to S749. In this case, the process proceeds to S748.

At S748, whether any non-audio data are stored in the queues in the non-audio data holding unit 15 is detected. If they are, the process returns to S745, and otherwise proceeds to S749.

At S749, the command application unit 57 is requested to switch to an audio data transmission.

<The transmission of a non-audio data message with the audio data reception switch command from the transmitter personal station 131 to the receiver personal station 132 (1)>

Figure 36:
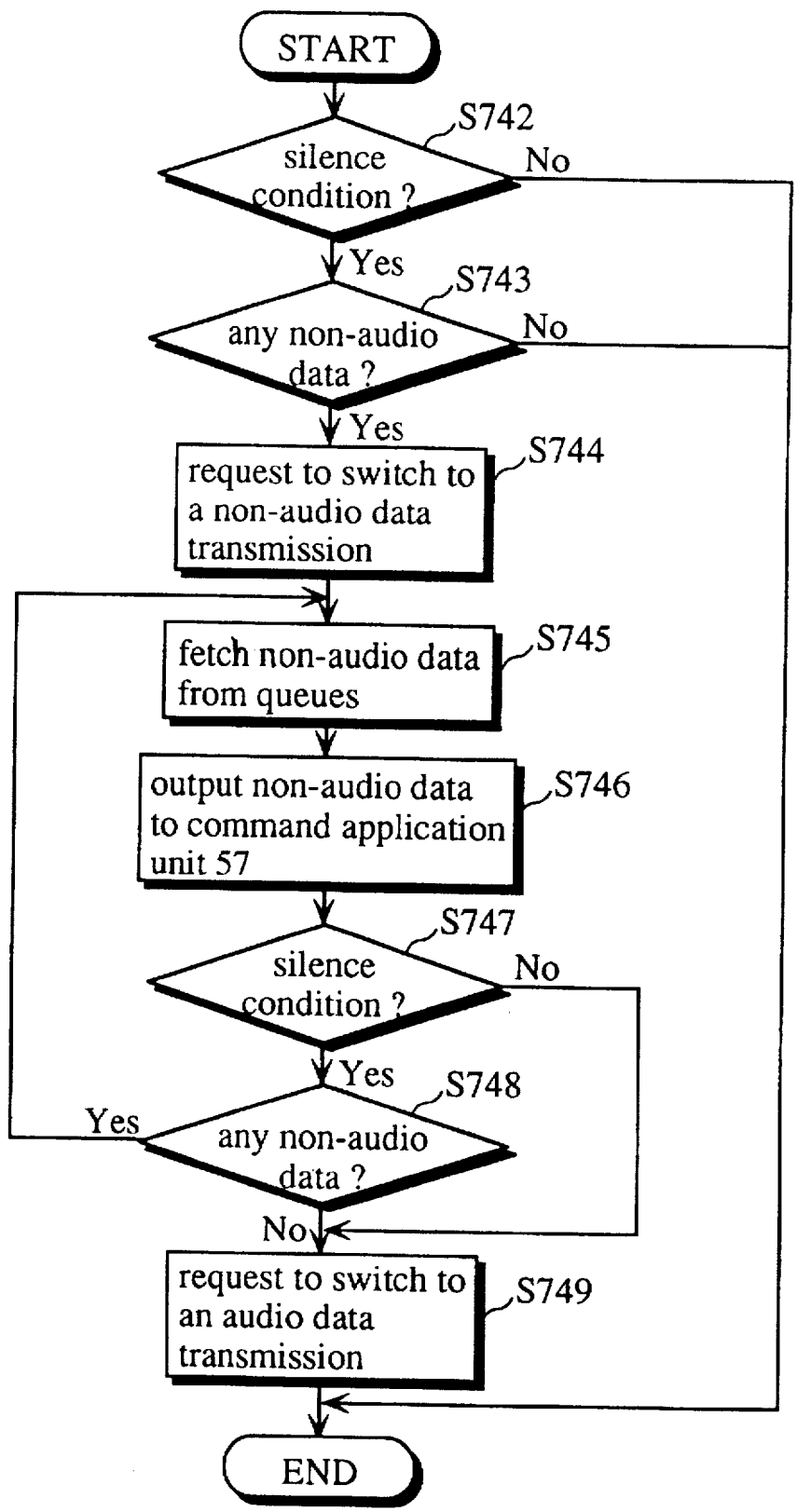
FIG. 36 shows a flowchart which depicts the process of the silence period data transmission mode switch unit 58 in the fourth embodiment.

When the command application unit 57 of the transmitter personal station 131 has received non-audio data reception switch command at S744 in FIG. 36, the command application unit 57 performs the process shown in FIG. 38.

At S721, the command application unit 57 identifies the notice received. If it is a notice from a silence condition to a sound condition from the silence period data transmission mode switch unit 58 to inform condition switch, the process proceeds to S724. If it is a switch confirmation notice, the process proceeds to S723, and if it is a mode switch notice, the process proceeds to S722. In this case, the process proceeds to S724.

At S724, whether the notice indicates a switch from a sound condition to a silence condition. If it is, the process proceeds to S726, and otherwise the process proceeds to S725. In this case, the process proceeds to S726.

At S726, the transmitter personal station 131 is put in the non-audio data transmission switch mode.

<The transmission of a non-audio data message with the audio data reception switch command from the transmitter personal station 131 to the receiver personal station 132 (2)>

The operation of the command application unit 57 after the transition to the non-audio data transmission switch mode is explained with reference to FIG. 37.

When the transmitter personal station 131 has been put in the non-audio data transmission switch mode at S726, the command application unit 57 performs the process shown in FIG. 37.

At S701, it has been determined that the transmitter personal station 131 is in the data transmission execution mode, and the process proceeds to S702.

At S702, whether the transmitter personal station 131 is in the audio data transmission switch mode is determined. If it is, the process proceeds to S703, and otherwise proceeds to S704. In this case, the process proceeds to S704.

At S704, the non-audio data reception switch command is assigned to non-audio data, thereby a non-audio data message with the non-audio data reception switch command is generated.

At S705, whether the transmission confirmation flag is on is determined. If it is, the process proceeds to S706, and otherwise proceeds to S711. In this case the process proceeds to S711.

At S711, the non-audio data message P703 with the non-audio data reception command is transmitted.

These steps S701, S702, S704, S705, and S711 are executed every time the command application unit 57 is informed of a silence detection at S721 shown in FIG. 38.

<The reception of a non-audio data message with the non-audio data reception switch command by the transmitter personal station 131 (1)>

The operation of the data distribution unit 59 of the receiver personal station 132 when it has received a non-audio data message with the non-audio data command is explained with reference to the flowchart shown in FIG. 39.

At S731, the data distribution unit 59 determines whether a message received is with a switch command. If it is, the process proceeds to S732, and otherwise proceeds to S736. In this case, the process proceeds to S732.

At S732, whether the switch command is the audio data reception switch command is determined. If it is, the process proceeds to S733, and otherwise proceeds to S734. In this case, the process proceeds to S734.

At S734, the receiver personal station 132 is put in the non-audio data reception mode.

At S735, the command application unit 57 is informed of a mode switch.

At S736, whether the message is with the confirmation command is determined. If it is, the process proceeds to S737, and otherwise proceeds to S738. In this case, the process proceeds to S738.

At S738, whether the receiver personal station 132 is in the audio data reception mode is determined. If it is, the process proceeds to S739, and otherwise proceeds to S740. In this case, the process proceeds to S740.

At S740, non-audio data are fetched from the message and transmitted to the electronic notebook 232 connected with the receiver personal station 132.

<The reception of a non-audio data message with the non-audio data reception switch command by the transmitter personal station 131 (2)>

When the receiver personal station 132 has been put in the non-audio data reception mode at S734 and has received a mode switch notice from the data distribution unit 59 at S735 shown in FIG. 39, the command application unit 57 performs the process of the flowchart in FIG. 38.

At S721, the mode switch notice is identified, and the process proceeds to S722.

At S722, the transmission confirmation flag is set at on.

<The reception of a non-audio data message with the non-audio data reception switch command by the transmitter personal station 131 (3)>

<The transmission of an audio data message with the confirmation command from the receiver personal station 132 to the transmitter personal station 131 (1)>

When the transmission confirmation flag is set at on at S722 in FIG. 38, the data application unit 57 of the receiver personal station 132 performs the process shown in FIG. 37.

At S701, it has been determined that although the receiver personal station 132 has entered the non-audio data reception mode, it is still in the data transmission execution mode because audio data are being transmitted from the receiver personal station 132 to the transmitter personal station 131 in this case. As a result, the process proceeds to S708.

At S708, it has been determined that the transmission confirmation flag is on in this case, and the process proceeds to S709.

At S709, a confirmation command is assigned to audio data, and as a result, an audio data message with the confirmation command is generated.

At S707, the transmission confirmation flag is set at off.

At S711, the audio data message with the confirmation command is transmitted to the transmitter personal station 131.

<The reception of an audio data message with the confirmation command by the transmitter personal station 131 (1)>

The process of the data distribution unit 59 of the transmitter personal station 131 when it has received an audio data message with the confirmation command is explained with reference to the flowchart shown in FIG. 39.

At S731, it has been determined that the message received does not include a switch command in this case, so that the process proceeds to S736.

At S736, it has been determined that the message includes a confirmation command in this case, so that the process proceeds to S737.

At S737, the command application unit 57 receives a notice which indicates the safe receipt of the confirmation command by the receiver personal station 132.

At S738, whether the transmitter personal station 131 is in the audio data reception mode is determined. If it is, the process proceeds to S739, and otherwise proceeds to S740. In this case, the process proceeds to S739 because audio data are being transmitted from the receiver personal station 132 to the transmitter personal station 131.

<The reception of an audio data message with the confirmation command by the transmitter personal station 131 (2)>

When the command application unit 57 of the transmitter personal station 131 has received a switch confirmation notice at S737 in FIG. 39, the process shown in FIG. 38 is executed as follows.

At S721, the notice is identified as the switch confirmation notice, and the process proceeds to S723.

At S723, the transmitter personal station 131 enters the data transmission execution mode.

<The operation of the silence period data transmission mode switch unit 58 of the transmitter personal station 131 in the occurrence of a sound condition>

It is assumed that a silence condition has been detected and the silence period data transmission mode switch unit 58 is at S742 shown in FIG. 36.

At S742, the silence detection unit 17 has already detected a sound condition, so that the process is terminated.

<The transmission of an audio data message with the audio data reception switch command from the transmitter personal station 131 to the receiver personal station 132 (1)>

<The mode switch operation of the command application unit 57 in response to the notice of the occurrence of a sound condition>

At S721, the command application unit 57 identifies the notice received from the silence period data transmission mode switch unit 58 as a mode switch notice, and the process proceeds to S724.

At S724, whether the mode switch notice indicates a switch from a sound condition to a silence condition is determined. If it is, the process proceeds to S726, and otherwise the process proceeds to S725. In this case, the process proceeds to S725.

At S725, the transmitter personal station 131 is put in the audio data transmission switch mode.

Thus, through the steps S721, S724, and S725, the transmitter personal station 131 is put in the audio transmission switch mode.

<The transmission of an audio data message with the audio data reception switch command from the transmitter personal station 131 to the receiver personal station 132 (2)>

The operation of the command application unit 57 after the transmitter personal station 131 has entered the audio data transmission switch mode is explained with reference to FIG. 37.

At S701, it has been determined that the transmitter personal station 131 is in the data transmission execution mode in this case, so that the process proceeds to S702.

At S702, it has been determined that the transmitter personal station 131 is in the audio data reception mode in this case, so that the process proceeds to S703.

At S703, the audio data transmission switch command is assigned to audio data, and as a result, an audio data message with the audio data transmission switch command is generated.

At S705, it has been determined that the transmission confirmation flag is off in this case, and the process proceeds to S711 where the audio data message with the audio data reception switch command is transmitted to the modulation/demodulation unit 13 and the RF/IF unit 14 of the transmitter personal station 131.

<The reception of an audio data message with the audio data reception switch command (1)>

The operation of the data distribution unit 59 of the receiver personal station 132 in response to the reception of an audio data message with the audio data reception switch command is explained with reference to FIG. 39.

At S731, it has been determined that the audio data message is assigned a switch command in this case, and the process proceeds to S732.

At S732, it has been determined that the switch command is an audio data reception switch command in this case, and the process proceeds to S733.

At S733, the receiver personal station 132 is put in the audio data reception mode. The process proceeds to S735, S736, S738, and S739.

At S739, audio data are fetched from the audio data message and outputted to the audio data process unit 10.

<The reception of an audio data message with the audio data reception switch command (2)>

The operation of the command application unit 57 after the transmitter personal station 131 has entered the audio data reception mode is explained with reference to FIG. 38.

At S721, the notice is identified as a mode switch notice in this case, and the process proceeds to S722.

<The reception of an audio data message with the audio data reception switch command (3) and the transmission of an audio data message with the confirmation command (1)>

The operation of the command application unit 57 after the transmission confirmation flag is set at on at S722 in FIG. 38 is explained with reference to FIG. 37.

At S701, it has been determined that the transmitter personal station 131 is not in the data transmission execution mode, and the process proceeds to S702.

At S702, it has been determined that the transmitter personal station 131 is in the audio data transmission switch mode in this case, and the process proceeds to S703.

At S703, an audio data reception switch command is assigned to audio data, and as a result, an audio data message with the audio data reception switch command is generated.

At S705, it has been determined that the transmission confirmation flag is on in this case, and the process proceeds to S706.

At S706, the confirmation command is attached to the audio data reception switch command in the audio data message, and the process proceeds to S707 and S711.

<The reception of an audio data message with the confirmation command (1)>

The process of the data distribution unit 59 of the transmitter personal station 131 is explained with reference to FIG. 39.

At S731, it has been determined that the audio data message does not include a switch command in this case, and the process proceeds to S736.

At S736, it has been determined that the audio data message includes the confirmation command in this case, and the process proceeds to S738.

At S738, it has been determined that the transmitter personal station 131 is in the audio data reception mode because audio data are being transmitted from the receiver personal station 132 to the transmitter personal station 131. As a result, the process proceeds to S739.

The following modifications (a)–(h) may be applied to the embodiments 1–4.

(a) In the first embodiment, from which queue in the non-audio data holding unit 15 non-audio data are fetched is determined in accordance with the amount of data accumulated in the queues. However, it may be determined in accordance with the priority level assigned to different data such as map data, still picture data, and fax data.

(b) The priority level for data transmission may be assigned depending on the destination of data to be transmitted. For example, data to be transmitted to a manager, a section chief, and colleagues may be assigned first, second, and third priority levels, respectively, and non-audio data may be transmitted in order of descending priority when a silence condition has been detected.

Figure 40:
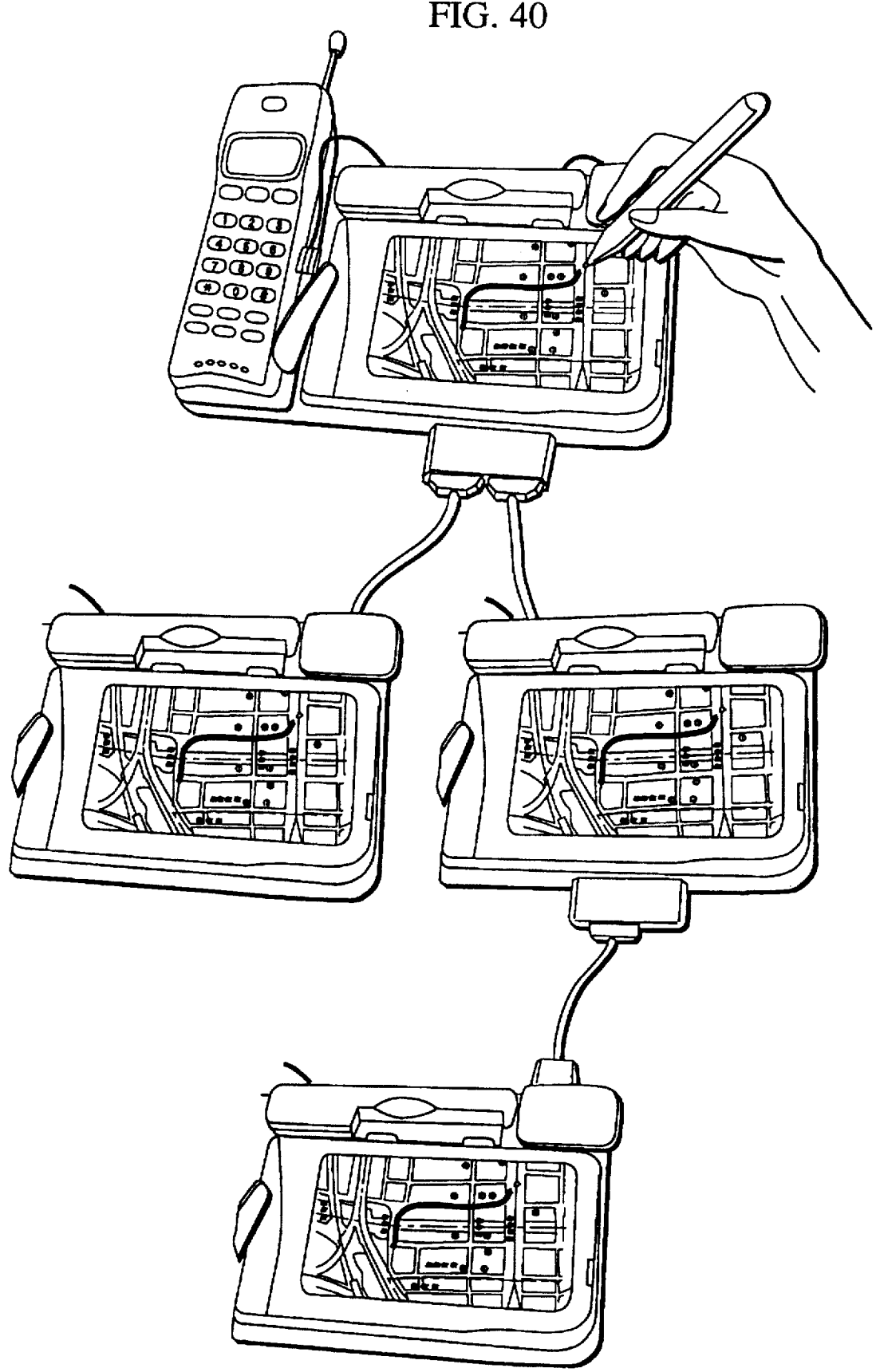
FIG. 40 shows an example of connecting several electronic notebooks to the personal stations of the present invention.

(c) Interface cards may be attached to the ROM card slot 105 shown in the first embodiment, to connect it with several electronic notebooks as shown in FIG. 40. The queues in the non-audio data holding unit 15 may be assigned to the electronic notebooks, and the transmission of the non-audio data may be started from a queue with the largest amount of data.

(d) The transmission amount monitor unit 41 monitors free time slots and changes the assignment ratio dynamically in the third embodiment; however, the assignment ratio may be determined based on the transmission amount monitored by cell stations for public use. In addition, the unit time of the assignment may be longer or shorter than 8×5 msec.

(e) Besides the electronic notebooks which are used in the embodiments 1–4, other data processors such as laptop or desktop personal computers or workstations may be connected with the personal stations.

In addition, the PCMCIA-compliant card slot provided in the electronic notebook may be connected to a printer or a disk to apply to a radio information system.

(f) Besides the map data and the drag data which are used in the embodiments 1–4, picture data standardized by ITU-T, H2.61 may be applied to realize a videophone.

(g) Besides PHS, any radio communication system based on the TDMA/TDD system may be applied to the present invention.

For example, audio data and non-audio data may be transmitted by means of Personal Access Communication Service (PACS) of Personal Communication Service (PCS) in U.S.A. In PACS, the same number of time slots as PHS are used. Each time slot is 312.5 μsec and each frame is 2.5 msec. A primary mode and a secondary mode are used to distinguish audio data transmission and non-audio data transmission. The fourth embodiment provided with the audio data reception mode, the non-audio data reception mode, and the data transmission execution mode has achieved a construction similar to the PACS on the personal stations in PHS. Consequently, communication devices capable of transmitting audio data in a sound condition and non-audio data in a silence condition on PCS can be constructed based on the construction of the fourth embodiment.

(h) In the third embodiment the RR command is requested at 8:1 modulo basis; however, it may be requested every time non-audio data is transmitted.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A radio communication system for transmitting audio data and non-audio data between a transmitter personal station and a receiver personal station, the audio data and the non-audio data being transmitted on time slots which have been time-division multiplexed, each of the transmitter personal station and the receiver personal station comprising:

a transmission/reception means for transmitting and receiving the time slots to and from other personal station, each of the time slots including a data field in which one of the audio data and the non-audio data are written, a control field in which control information is written, and an identifier field in which one of a first identifier for the audio data and a second identifier for the non-audio data is written;

an audio data conversion means provided with a microphone for receiving speech through the microphone and converting the speech into audio data;

a non-audio data holding means provided with an input terminal connected with an output terminal of a data processor, said non-audio data holding means receiving non-audio data from the data processor, and holding the non-audio data received;

an audio data amount detection means for detecting whether an amount of audio data to be produced per unit time by said audio data conversion means is lower or higher than a predetermined threshold;

a write means for, when the amount of the audio data has been detected to be lower than the threshold, fetching a predetermined amount of non-audio data from said non-audio data holding means, writing the non-audio data fetched to the data field of a first time slot, further writing the second identifier to the identifier field of the first time slot, and making said transmission/reception means transmit the first time slot to the other personal station, and when the amount of the audio data has been determined to be higher than the threshold, writing the audio data produced in said audio data conversion means to the data field of a second time slot, further writing the first identifier to the identifier field of the second time slot, and making said transmission/reception means transmit the second time slot to the other personal station;

a speech restoration means provided with a speaker for restoring speech from audio data;

an identifier detection means for detecting whether the identifier field of a third time slot that said transmission/reception means has received from the other personal station has the first identifier or the second identifier; and a distribution means provided with an output terminal connected with an input terminal of the data processor for, when said identifier detection means has detected that the identifier field of the third time slot has the first identifier, fetching audio data from the data field of the third time slot, and outputting the audio data fetched to said speech restoration means, and when said identifier detection means has detected that the identifier field of the third time slot has the second identifier, fetching non-audio data from the data field of the third time slot, and outputting the non-audio data fetched to the data processor.

2. The radio communication system of claim 1, wherein said audio data conversion means comprises:

an A/D conversion unit for converting the speech received through the microphone into a digital value, and said audio data amount detection means comprises:

a calculation unit for calculating a digital value produced in said A/D conversion unit in the unit time, the unit time corresponding to a transmission cycle of time slots; and a silence condition determination unit for determining whether the digital value is higher or lower than the threshold, the value higher than the threshold indicating that communications between the transmitter personal station and the receiver personal station are in a sound condition and the value lower than the threshold indicating that the communications are in a silence condition.

3. The radio communication system of claim 2 is a Personal Handy Phone System, wherein the identifier field is a CI field defined in Personal Handy Phone System standards.

4. The radio communication system of claim 2, wherein said audio data amount detection means further comprises:

a flag holding means for holding a flag, the flag being on when the communications are in the silence condition and being off when the communications are in the sound condition; and a flag setting means for setting the flag at on when said silence condition determination unit has determined the value to be lower than the threshold, and setting the flag at off when said silence condition determination unit has determined the value to be higher than the threshold;

said write means comprises:

a flag detection unit for detecting whether the flag is on or off at a predetermined time interval;

a non-audio data write unit for fetching the predetermined amount of non-audio data from said non-audio data holding means, writing the non-audio data fetched to the data field of a fourth time slot, and further writing the second identifier to the identifier field of the fourth time slot when the flag is on; and an audio data write unit for writing the audio data which have been produced in said audio data conversion means to the data field of a fifth time slot and writing the first identifier to the identifier field of the fifth time slot.

5. The radio communication system of claim 4, wherein each of the transmitter personal station and the receiver personal station further comprises:

a transmission control procedure application means for applying a transmission control procedure when the flag has been set at on, and suspending the transmission control procedure when the flag has been set at off, the transmission control procedure including a transmission error detection and correction control and a time slot re-transmission control.

6. The radio communication system of claim 5, wherein each of the transmitter personal station and the receiver personal station further comprises:

a data link request means for, when the flag has been set at on, writing a request for establishing a data link to the control field of a sixth time slot, and making said transmission/reception means transmit the sixth time slot to the other personal station;

a data link request acknowledgement means for, when said transmission/reception means has received a request for establishing a data link from the other personal station, writing a first command for indicating an acknowledgement of establishing a data link to the control field of a seventh time slot, and making said transmission/reception means transmit the seventh time slot to the other personal station;

a data link establishment means for detecting whether the first command for indicating an acknowledgement of establishing a data link is written in the control field of a time slot received by said transmission/reception means, and if the first command is written, establishing a data link with the other personal station; and said transmission control procedure application means making said transmission/reception means transmit an eighth time slot based on the transmission control procedure to the other personal station if a data link has been established, and making said transmission/ reception means receive a ninth time slot based on the transmission control procedure if the first command for indicating an acknowledgement of establishing a data link has been received from the other personal station.

7. The radio communication system of claim 6, wherein said transmission control procedure application means comprises:

an error detection/correction unit for, when a data link has been established, and data has been received from the other personal station, applying the transmission error detection and correction control to the data, and detecting whether the data has been successfully received and restored; and a successful data reception report means for, when said error detection/correction unit has detected a successful receipt of the data, writing a second command for reporting a successful data reception to the control field of a tenth time slot and making said transmission/ reception means transmit the tenth time slot to the other personal station;

a continuation means for making said transmission/ reception means continue to transmit time slots to the other personal station based on the transmission control procedure, if the second command for reporting a successful data reception has been received from the other personal station;

a radio circuit timer for setting a first time-out, which indicates a transmission impossible condition due to poor radio conditions, starting a counting operation when a time slot whose data field has non-audio data has been transmitted to the other personal station, and resetting the counting operation when a time slot whose control field has the second command for reporting a successful data reception has been received from the other personal station; and a data link disconnection unit for making said transmission/reception means disconnect a data link when the radio circuit timer has been timed out.

8. The radio communication system of claim 7, wherein said transmission control procedure application means comprises:

a forced transmission timer for setting a second time-out which is shorter than the first time-out, starting a counting operation when a time slot whose data field has non-audio data has been transmitted to the other personal station, and resetting the counting operation when a time slot whose control field has the second command for reporting a successful data reception has been received from the other personal station;

a data link maintenance unit for, when said forced transmission timer has timed out while the flag is off, suspending a writing operation of said audio data write unit for a time slot period, making said non-audio data write unit fetch non-audio data from said non-audio data holding means, write the non-audio data fetched to the date field of an eleventh time slot, and write the second identifier to the identifier field of the eleventh time slot, and making said transmission/reception means transmit the eleventh time slot to the other personal station.

9. The radio communication system of claim 8, wherein said write means further comprises:

a non-audio data remainder detection unit for detecting whether any non-audio data are left in said non-audio data holding means, if said forced transmission timer times out while the flag is off; and if said non-audio data remainder detection unit has detected that no non-audio data are left in said non-audio data holding means, said data link maintenance unit suspends an audio data transmission for one time slot period, making said non-audio data write unit write dummy data to the data field of a twelfth time slot and the second identifier to the identifier field of the twelfth time slot, and making said transmission/reception means transmit the twelfth time slot to the other personal station.

10. The radio communication system of claim 7, wherein said transmission control procedure application means further comprises:

a count suspension timer for setting a second time-out which is shorter than the first time-out, starting a counting operation when a time slot whose data field has non-audio data has been transmitted to the other personal station, and resetting the counting operation when a time slot whose control field has the second command for reporting a successful data reception has been received from the other personal station; and said write means suspends the counting operation of said radio circuit timer, if said count suspension timer times out while the flag is off.

11. The radio communication system of claim 6, wherein the control field includes a command field in which a command is written and a number field in which sequence numbers of non-audio data are written, said transmission control procedure application means further comprises:

a sequence number write unit for, when non-audio data are written in the data field of the eighth time slot, writing sequence numbers to the number field of the eighth time slot;

a sequence number/non-audio data storage unit for storing the sequence numbers written in association with corresponding non-audio data as transmission reservation;

a sequence number fetch unit for fetching sequence numbers from the number field when a time slot has been received from the other personal station;

an error detection/correction unit for, when a data link has been established, and data has been received from the other personal station, applying the transmission error detection and correction control to the data, and detecting whether the data has been successfully received and restored;

a re-transmission request unit for writing the sequence numbers fetched to the number field of a thirteenth time slot, writing a third command for reporting an unsuccessful data reception to the command field of the thirteenth time slot, and making said transmission/reception means transmit the thirteenth time slot to the other personal station;

a third command detection unit for detecting whether a fourteenth time slot received from the other personal station includes the third command for reporting an unsuccessful data reception;

a re-transmission unit for, when said third command detection unit has detected a presence of the third command, fetching the sequence numbers from the control field of the fourteenth time slot received by said transmission/reception means, further fetching non-audio data corresponding to the sequence numbers from said sequence number/non-audio data storage unit, making said non-audio data write unit write the non-audio data fetched to the data field of a thirteenth time slot, and making said transmission/reception means transmit the thirteenth time slot to the other personal station.

12. The radio communication system of claim 11, wherein the command field is where the second command is written, and the command field includes a confirmation command request field where a confirmation request bit is written;

said sequence number write means comprises:

an incrementor for incrementing sequence numbers every time non-audio data are written in the data field of a time slot;

a write unit for writing incremented sequence numbers to the number field of the time slot whose data field has non-audio data;

said transmission control procedure application means further comprises:

a request bit setting unit for, when sequence numbers incremented are equal to a predetermined value, setting the confirmation request bit, and resetting the sequence numbers;

a second command write unit for detecting whether a sixteenth time slot received from the other personal station includes the confirmation request bit, writing sequence numbers fetched by said sequence number fetch unit to the number field of a seventeenth time slot if the confirmation request bit has been detected to be set on the sixteenth time slot, and writing the second command to the information field of the eighteenth time slot, and making said transmission/reception means transmit the seventeenth time slot to the other personal station.

13. The radio communication system of claim 12, wherein said transmission control procedure application means further comprises:

a radio circuit timer for setting a first time-out, which indicates a transmission impossible condition due to poor radio conditions, starting a counting operation when a time slot whose confirmation command request field has the confirmation request has been transmitted to the other personal station, and resetting the counting operation when a time slot whose control field has the second command for reporting a successful data reception has been received from the other personal station; and a data link disconnection unit for making said transmission/reception means disconnect a data link when the radio circuit timer has been timed out.

14. The radio communication system of claim 12, wherein said transmission control procedure application means further comprises:

a forced transmission timer for setting a second timeout which is shorter than the first time-out, starting a counting operation when a time slot whose confirmation command request field has the confirmation request bit has been transmitted to the other personal station, and resetting the counting operation when a time slot whose control field has the second command for reporting a successful data reception has been received from the other personal station;; and said write means further comprises:

a data link maintenance unit for, when said forced transmission timer has timed out while the flag is off, suspending a writing operation of said audio data write unit for a time slot period, making said non-audio data write unit fetch non-audio data from said non-audio data holding means, write the non-audio data fetched to the data field of an eighteenth time slot, and write the second identifier to the identifier field of the eighteenth time slot, and making said transmission/reception means transmit the eighteenth time slot to the other personal station.

15. The radio communication system of claim 14, wherein said write means further comprises:

a non-audio data remainder detection unit for detecting whether any non-audio data are left in said non-audio data holding means, if said forced transmission timer times out while the flag is off; and if said non-audio data remainder detection unit has detected that no non-audio data are left in said non-audio data holding means, said data link maintenance unit suspends an audio data transmission for one time slot period, making said non-audio data write unit write dummy data to the data field of a nineteenth time slot and the second identifier to the identifier field of the nineteenth time slot, and making said transmission/reception means transmit the nineteenth time slot to the other personal station.

16. The radio communication system of claim 13, wherein said transmission control procedure application means further comprises:

a count suspension timer for setting a second time-out which is shorter than the first time-out, starting a counting operation when a time slot whose data field has non-audio data has been transmitted to the other personal station, and resetting the counting operation when a time slot whose control field has the second command for reporting a successful data reception has been received from the other personal station; and said write means suspends the counting operation of said radio circuit timer, if said count suspension timer times out while the flag is off.

17. The radio communication system of claim 6, wherein the transmission control procedure complies with High-level Data Link Control Procedure;

the request for establishing a data link is a Set Ascynchronous Balanced Mode command in the High-level Data Link Control Procedure; and the first command for indicating an acknowledgement of establishing a data link is an Unnumbered Acknowledgement in the High-level Data Link Control Procedure.

18. The radio communication system of claim 4, wherein the non-audio data to be outputted from the data processor are classified into a plurality of types, and the plurality of types are discriminated from each other by data type information attached to a head of each type of non-audio data, said non-audio data holding means comprises:

a plurality of queues each corresponding to a respective one of the plurality of types of the non-audio data; and a non-audio data storage unit for detecting a type of non-audio data which have been received from the data processor, determining a queue corresponding to the type of non-audio data detected, and storing the non-audio data in the queue determined;

said write means further comprises:

a queue selection unit for comparing non-audio data stored in the plurality of queues, selecting a queue which has a largest amount of non-audio data when the digital value which has been calculated by said calculation unit is lower than the threshold; and wherein said non-audio data write unit fetches the predetermined amount of non-audio data from the queue selected by said queue selection unit, writes the non-audio data fetched to the data field of a twentieth time slot, further writes the second identifier to the identifier field of the twentieth time slot, and makes said transmission/reception means transmit the twentieth time slot.

19. The radio communication system of claim 4, wherein the non-audio data to be received from the data processor are classified into a plurality of types, and assigned a plurality of priority levels, and each of the plurality of types and each of the priority levels are discriminated from each other by data type information attached to a head of each non-audio data, said non-audio data holding means comprises:

a plurality of queues each corresponding to a respective one of the plurality of types of the non-audio data; and a non-audio data storage unit for detecting a type of non-audio data which have been received from the data processor, determining a queue corresponding to the type of non-audio data detected, and storing the non-audio data in the queue determined;

said write means further comprises:

a queue selection unit for comparing the priority levels and selecting a queue that is assigned a highest priority level;

wherein said non-audio data write unit fetches the predetermined amount of non-audio data from the queue selected by said queue selection unit, writes the non-audio data fetched to the data field of a twenty-first time slot, further writes the second identifier to the identifier field of the twenty-first time slot, and makes said transmission/reception means transmit the twenty-first time slot.

20. A radio communication system for transmitting audio data and non-audio data between a transmitter personal station and a receiver personal station, the time slots being divided into a first group and a second group which follows the first group, the first group being assigned to the audio data and the second group being assigned to the non-audio data, a ratio of a number of time slots in the first group to a number of time slots in the second group being changed depending on an amount of the audio data to be transmitted, the audio data and the non-audio data being transmitted on time slots which have been time-division multiplexed, each of the transmitter personal station and the receiver personal station comprising:

a transmission/reception means for transmitting and receiving time slots in a unit time to and from other personal station, each of the time slots including a data field in which audio data and non-audio data are written, and a control field in which control information is written;

an audio data conversion means provided with a microphone for receiving speech through the microphone and converting the speech into audio data;

a non-audio data holding means provided with an input terminal connected with an output terminal of a data processor, said non-audio data holding means receiving non-audio data from the data processor, and holding the non-audio data received;

a free time slot counting means for monitoring time slots to be transmitted by said transmission/reception means in the unit time, and counting as free time slots a number of time slots whose data fields include data of less than a predetermined amount of threshold;

an assignment information determination means for determining an assignment information which indicates a number of a final time slot in the first group, based on the number of time slots counted in said free time slot counting means;

an assignment information report means for writing the assignment information to the control field of a first time slot and making said transmission/reception means transmit the first time slot to the other personal station;

an assigning means for assigning the time slots in the first group to the audio data and the time slots in the second group to the non-audio data;

an assignment information acquisition means for acquiring the assignment information from the control field of a time slot received by said transmission/reception means;

a speech restoration means provided with a speaker for restoring speech from audio data;

a distribution means provided with an output terminal connected with an input terminal of a data processor for fetching audio data from the data fields of the time slots in the first group, fetching non-audio data from the data fields of the time slots in the second group, and outputting the audio data fetched to said speech restoration means and the non-audio data fetched to the data processor.

21. The radio communication system of claim 20, wherein said assigning means comprises:

an audio data transmission counter for counting up every time audio data are written to the data field of a time slot, a first upper limit of said audio data transmission counter being set on a number of a final time slot in the first group;

a non-audio data transmission counter for counting up every time non-audio data are written to the data field of a time slot, a second upper limit of said non-audio data transmission counter being set on a number to be obtained by subtracting the number of the final time slot from an entire number of the time slots in the first group and the second group;

an audio data write unit for writing the audio data which have been produced in said audio data conversion means to the data field of a second time slot, and making said transmission/reception means transmit the second time slot;

an audio data write suspension unit for, when said audio data counter transmission counter has reached the first upper limit, suspending a writing operation of said audio data write unit, and when said non-audio data has reached the second upper limit, resuming the writing operation; and a non-audio data write unit for, when said audio data transmission counter has reached the first upper limit, fetching a predetermined amount of non-audio data from the queues in said non-audio data holding means, writing the non-audio data fetched to the data field of a third time slot, making said transmission/reception means transmit the third time slot to the other personal station, and when said non-audio transmission counter has reached the second upper limit, suspending a writing operation of said non-audio data write unit; and said distribution means comprises:

an audio data reception counter for counting up every time audio data are fetched, a third upper limit of said audio data reception counter being set on the number indicated in the assignment information that said acquisition means has obtained;

a non-audio data reception counter for counting up every time non-audio data are fetched, a fourth upper limit of said non-audio data reception counter being set on a number that is obtained by subtracting the number of the final time slot in the first group from an entire number of the time slots in the first group and the second group;

an audio data fetch unit for fetching audio data from the data field of a time slot received by said transmission/reception means, and outputting the audio data fetched to said speech restoration means;

a fetch suspension unit for, when said audio data reception counter has reached the third upper limit, suspending a fetching operation of said audio data fetch unit, and when said non-audio data reception counter h as reached the fourth upper limit, resuming the fetching operation of said audio data fetch unit;

a non-audio data fetch unit for, when said audio data reception counter has reached the third upper limit, fetching audio data from the data field of a time slot received from the other personal station and making said transmission/reception means transmit the audio data fetched to the data processor, and when said non-audio data reception counter has reached the fourth upper limit, suspending the fetching operation of said non-audio data fetch unit.

22. The radio communication system of claim 21, wherein said assignment information determination means comprises:

an upper limit setting unit for setting the first upper limit of said audio data transmission counter higher and the second upper limit of said non-audio data transmission counter lower when the free time slots monitored by said free time slots counting means include relatively a large amount of audio data, and setting the first upper limit of said audio data transmission counter lower and the second upper limit of said non-audio data transmission counter higher when the free time slots include relatively a small amount of audio data, wherein said distribution means further comprises:

an upper limit determination unit for determining the first upper limit and the second upper limit, based on the assignment information that said assignment information acquisition means has obtained.

23. A radio communication system for transmitting audio data and non-audio data between a transmitter personal station and a receiver personal station, the transmitter personal station informing the receiver personal station of an occurrence of a silence condition in communications before transmitting non-audio data to the receiver personal station, or informing the receiver personal station of an occurrence of a sound condition in communications before transmitting audio data to the receiver personal station, the audio data and the non-audio data being transmitted on time slots which have been time-division multiplexed, each of the transmitter personal station and the receiver personal station comprising:

a transmission/reception means for transmitting and receiving time slots in a unit time to and from other personal station, each of the time slots including a data field in which audio data and non-audio data are written, and a control field in which control information is written;

an audio data conversion means provided with a microphone for receiving speech through the microphone and converting the speech into audio data;

a non-audio data holding means provided with an input terminal connected with an output terminal of a data processor, said non-audio data holding means receiving non-audio data from the data processor, and holding the non-audio data received;

an audio data amount detection means for detecting whether an amount of audio data to be produced per unit time by said audio data conversion means is lower or higher than a predetermined threshold;

a switch command write means for, when the amount of audio data to be produced by said audio data conversion means has been detected to be lower than a predetermined threshold, fetching a predetermined amount of non-audio data from said non-audio data holding means, writing the non-audio data fetched to the data field of a first time slot, further writing a non-audio data transmission switch command which indicates that audio data transmission has been switched to non-audio data transmission to the control field of the first time slot, and making said transmission/reception means transmit the first time slot, and when the amount of audio data to be produced by said audio data conversion means has been detected to be higher than a predetermined threshold, writing the audio data obtained from said audio data conversion means to the data field of a second time slot, further writing an audio data transmission command which indicates that non-audio data transmission is switched to audio data transmission to the control field of the second time slot, and making said transmission/reception means transmit the second time slot;

a transmission/reception control means for making said switch command write means write one of audio data and non-audio data, when a time slot whose data field includes an acknowledgement command which indicates that a reception of non-audio data has been acknowledged has been received from the other personal station;

a speech restoration means provided with a speaker for restoring speech from audio data;

the flag being on when the communications are in the silence condition and being off when the communications are in the sound condition; and a flag storage means for storing a flag, which indicates a non-audio data reception mode for receiving non-audio data when it is on, and indicates an audio data reception mode for receiving audio data when it is off;

a flag setting means for detecting whether the control field of a third time slot received from the other personal station includes a non-audio data transmission switch command or an audio data transmission switch command, and setting the flag at on when the control field of the third time slot includes the non-audio data transmission switch command and setting the flag at off when the control field of the third time slot includes the audio data transmission switch command;

a confirmation command application means for writing a non-audio data reception acknowledgement command which indicates that a reception of non-audio data has been acknowledged to the control field of a fourth time slot, and making said transmission/reception means transmit the fourth time slot in response to the non-audio data reception mode, and for writing an audio data reception acknowledgement command which indicates that a reception of audio data has been acknowledged to the control field of a fifth time slot, and making said transmission/reception means transmit the fifth time slot in response to the audio data reception mode; and a distribution means provided with an output terminal connected with an input terminal of the data processor for, in the audio data reception mode, fetching audio data from the data field of a time slot received by said transmission/reception means and outputting the audio data fetched to said speech restoration means, and in the non-audio data reception mode, fetching non-audio data from the data field of a time slot received from the other personal station and outputting the non-audio data fetched to the data processor.

* * * * *